(12) United States Patent
Kim et al.

(10) Patent No.: US 12,379,153 B2
(45) Date of Patent: Aug. 5, 2025

(54) VACUUM ADIABATIC BODY AND REFRIGERATOR

(71) Applicant: LG ELECTRONICS INC., Seoul (KR)

(72) Inventors: Daewoong Kim, Seoul (KR); Wonyeong Jung, Seoul (KR); Wookjin Yang, Seoul (KR); Jangseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 485 days.

(21) Appl. No.: 17/312,528

(22) PCT Filed: Dec. 9, 2019

(86) PCT No.: PCT/KR2019/017327
§ 371 (c)(1),
(2) Date: Jun. 10, 2021

(87) PCT Pub. No.: WO2020/122531
PCT Pub. Date: Jun. 18, 2020

(65) Prior Publication Data
US 2021/0333043 A1 Oct. 28, 2021

(30) Foreign Application Priority Data
Dec. 12, 2018 (KR) .................. 10-2018-0160236

(51) Int. Cl.
*F25D 23/02* (2006.01)
*F25D 23/06* (2006.01)

(52) U.S. Cl.
CPC .......... *F25D 23/065* (2013.01); *F25D 23/02* (2013.01); *F25D 23/063* (2013.01); *F25D 2201/14* (2013.01)

(58) Field of Classification Search
CPC ...... F25D 23/065; F25D 23/069; F25D 23/02; F25D 23/063; F25D 23/006; F25D 23/062; F25D 23/067; F25D 2201/14
See application file for complete search history.

(56) References Cited

U.S. PATENT DOCUMENTS

| | | | |
|---|---|---|---|
| 8,899,068 B2 * | 12/2014 | Jung | ..................... F25D 23/02 62/440 |
| 8,944,541 B2 | 2/2015 | Allard et al. | |

(Continued)

FOREIGN PATENT DOCUMENTS

| | | |
|---|---|---|
| CN | 105627657 | 6/2016 |
| CN | 107110593 | 8/2017 |

(Continued)

OTHER PUBLICATIONS

KR20050078124 English Translation (Year: 2005).*

(Continued)

*Primary Examiner* — Frantz F Jules
*Assistant Examiner* — Devon Moore
(74) *Attorney, Agent, or Firm* — KED & ASSOCIATES, LLP

(57) ABSTRACT

A vacuum adiabatic body includes a first plate member, a second plate member, a sealing part which seals between the first plate member and the second plate member, a conductive resistance sheet which connects the first plate member and the second plate member to each other so as to reduce a heat transfer amount between the first plate member and the second plate member, and at least one reinforcing frame which is installed on at least one of the first plate member and the second plate member to reinforce strength, in which the reinforcement frame includes at least one of at least one of a pair of front frames extending at left and right end portions of the opening in a vertical direction, and at least one of a pair of upper and lower frames of a machine (Continued)

chamber extending in the third space in the vertical direction.

17 Claims, 36 Drawing Sheets

(56) References Cited

U.S. PATENT DOCUMENTS

| | | | | |
|---|---|---|---|---|
| 9,696,083 | B2 * | 7/2017 | Kim | F25D 23/065 |
| 9,702,615 | B1 * | 7/2017 | Chartrand | F25D 23/02 |
| 2004/0226956 | A1 | 11/2004 | Brooks | |
| 2013/0257256 | A1 * | 10/2013 | Allard | F25D 23/065 |
| | | | | 29/525.01 |
| 2015/0030800 | A1 | 1/2015 | Jung et al. | |
| 2016/0109172 | A1 * | 4/2016 | Kim | F25D 23/065 |
| 2017/0370632 | A1 | 12/2017 | Jeong et al. | |
| 2018/0216872 | A1 | 8/2018 | Jung et al. | |
| 2018/0224052 | A1 | 8/2018 | Jung et al. | |
| 2019/0316831 | A1 | 10/2019 | Jung et al. | |
| 2021/0207878 | A1 * | 7/2021 | Deka | F25D 23/085 |

FOREIGN PATENT DOCUMENTS

| | | | |
|---|---|---|---|
| CN | 107850381 | 3/2018 | |
| EP | 2 447 639 | 5/2012 | |
| EP | 3 193 110 | 7/2017 | |
| JP | 2013-119966 | 6/2013 | |
| KR | 200221577 Y1 * | 5/2001 | F25D 23/006 |
| KR | 10-0343719 | 7/2002 | |
| KR | 20-0328246 | 9/2003 | |
| KR | 10-2005-0078124 | 8/2005 | |
| KR | 10-2015-0012712 | 2/2015 | |
| KR | 10-2017-0016187 | 2/2017 | |
| KR | 10-2019-0070753 | 6/2019 | |
| MX | 2011011133 | 4/2012 | |
| WO | WO 2011/016697 | 2/2011 | |
| WO | WO-2013084656 A1 * | 6/2013 | F25D 23/063 |
| WO | WO-2016060389 A1 * | 4/2016 | F16L 59/065 |
| WO | WO 2017/023073 | 2/2017 | |
| WO | WO 2017/023089 | 2/2017 | |
| WO | WO 2017/023094 | 2/2017 | |
| WO | WO 2017/023100 | 2/2017 | |
| WO | WO-2018022009 A1 * | 2/2018 | F25D 23/064 |
| WO | WO 2018/143691 | 8/2018 | |

OTHER PUBLICATIONS

WO-2016060389-A1 English Translation (Year: 2016).*
KR-200221577-Y1 English Translation (Year: 2001).*
WO-2013084656-A1 English Translation (Year: 2013).*
Chinese Office Action dated Oct. 21, 2022 issued in Application No. 201980082444.5.
Extended European Search Report dated Jul. 29, 2022 issued in Application No. 19897499.0.
International Search Report dated Mar. 24, 2020 issued in Application No. PCT/KR2019/017327.
Written Opinion dated Mar. 24, 2020 issued in Application No. PCT/KR2019/017327.

* cited by examiner

[Fig. 1]
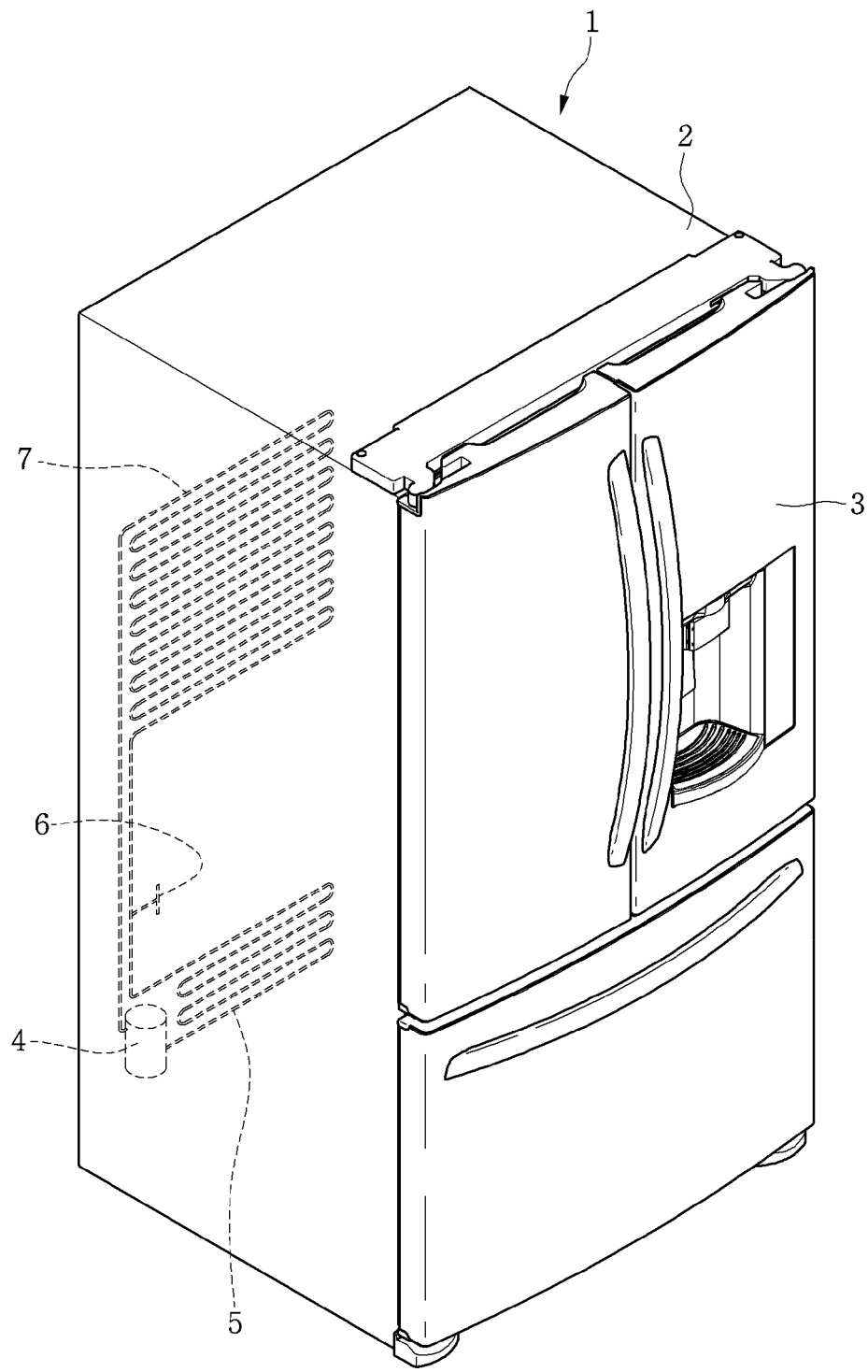

[Fig. 2]
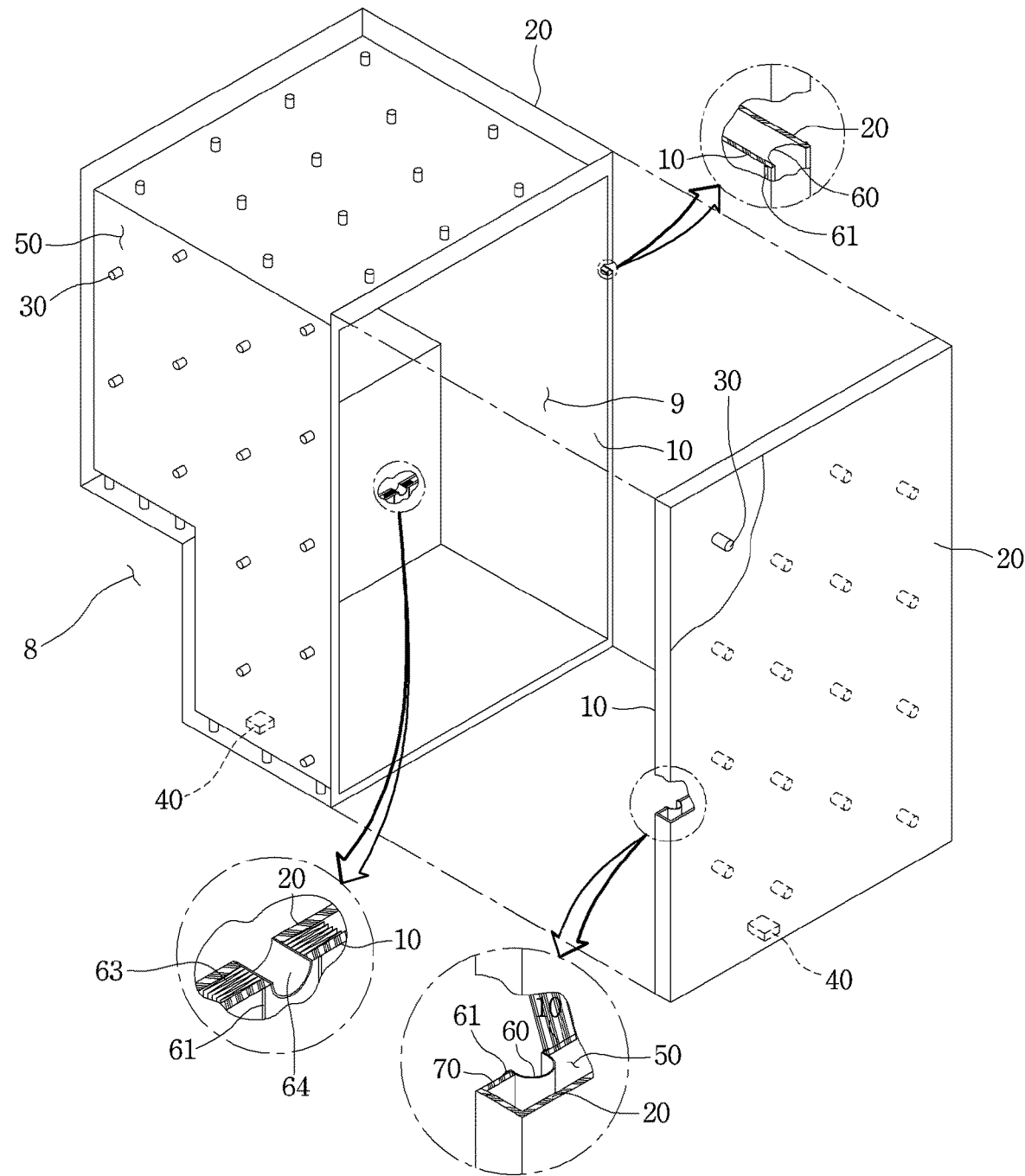

[Fig. 3]
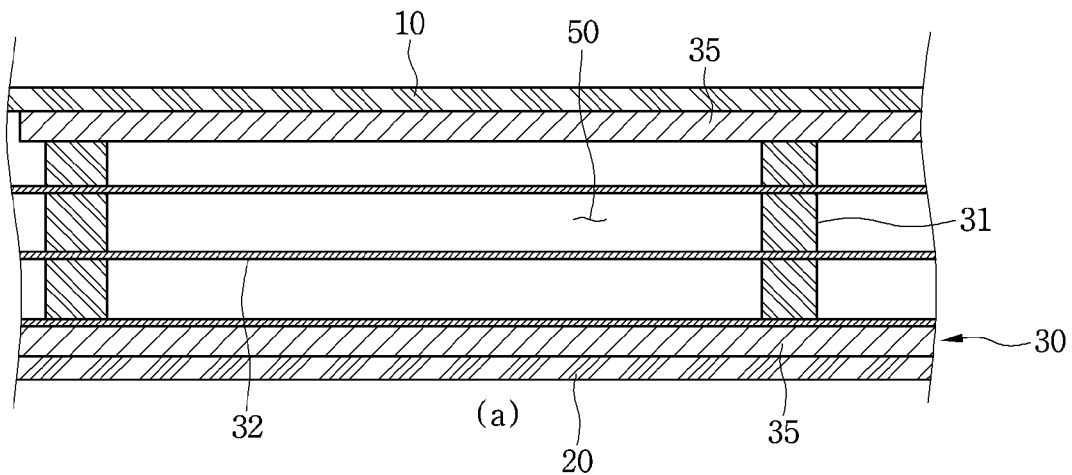
(a)
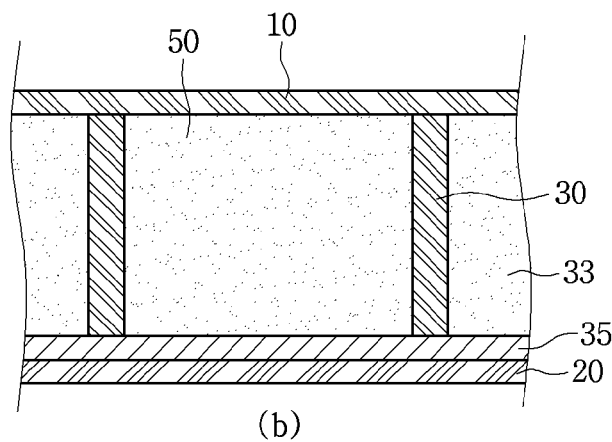
(b)
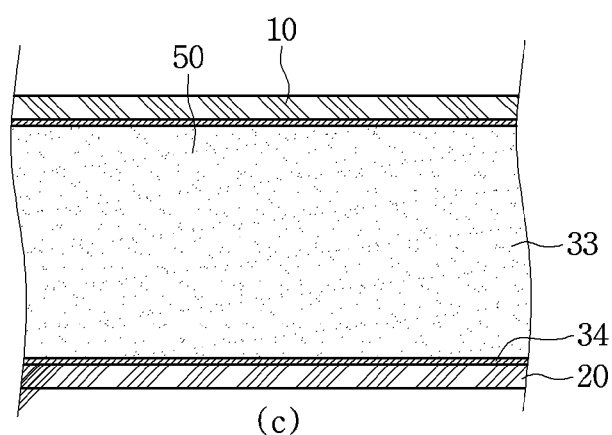
(c)

[Fig. 4]
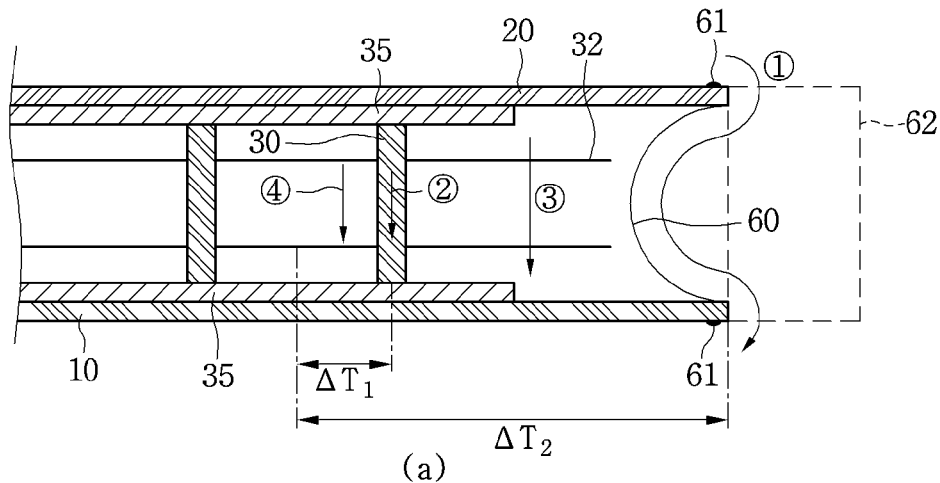
(a)
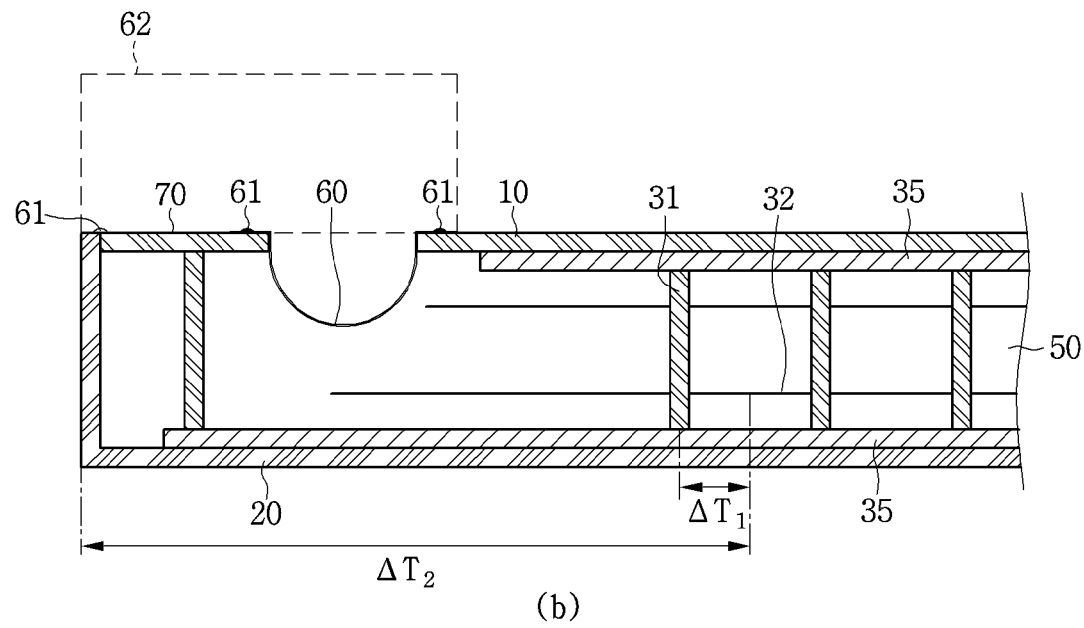
(b)
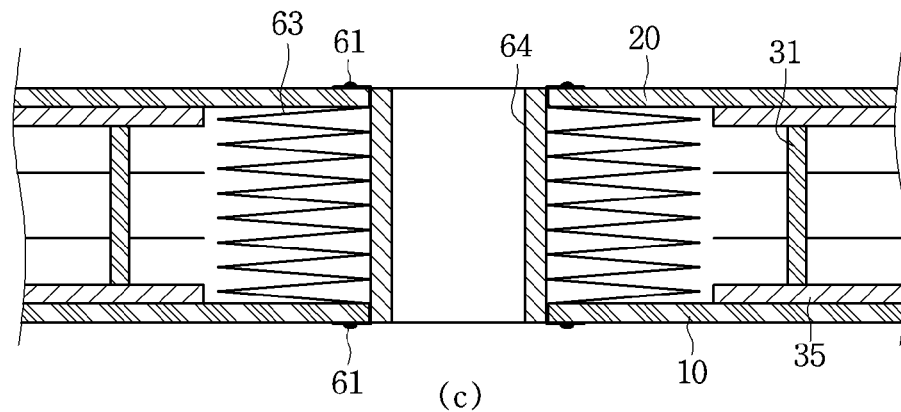
(c)

[Fig. 5]
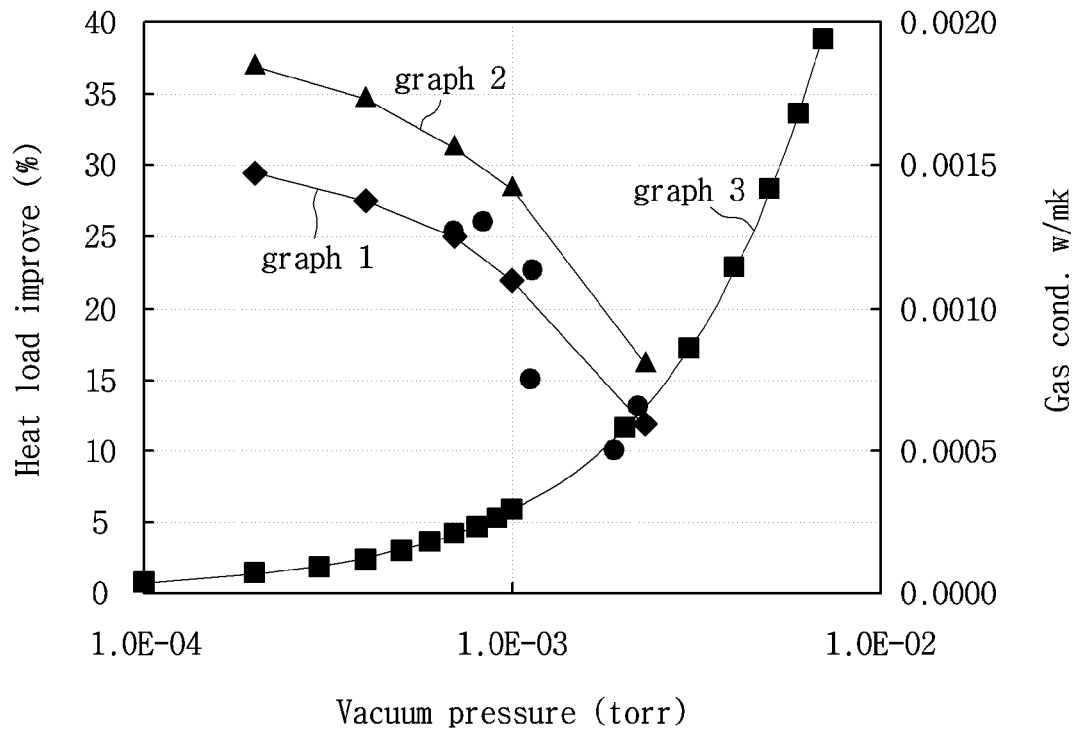
[Fig. 6]
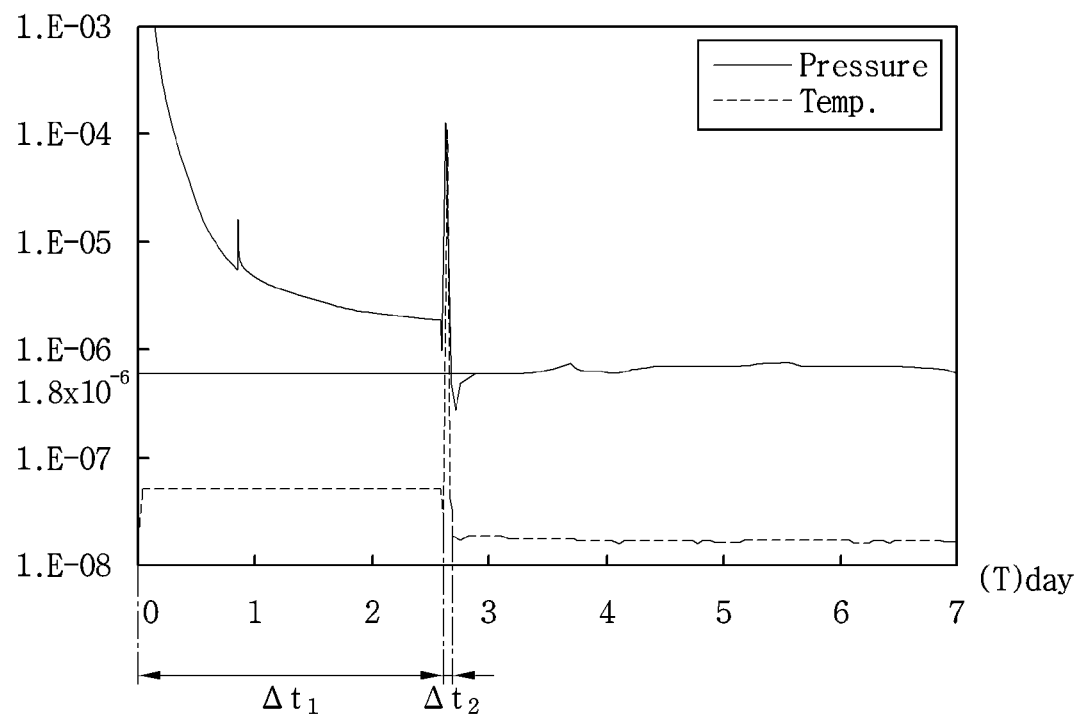

[Fig. 7]
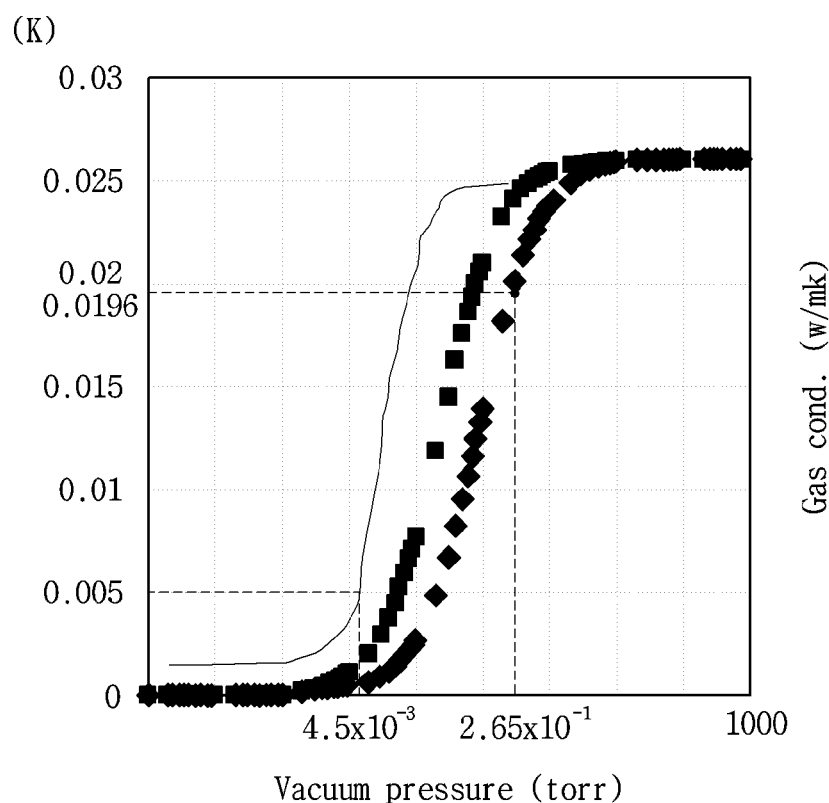
[Fig. 8]
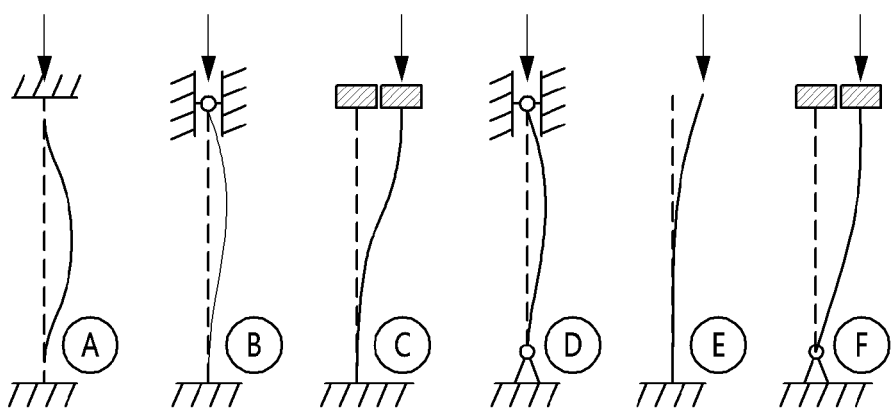

[Fig. 9]
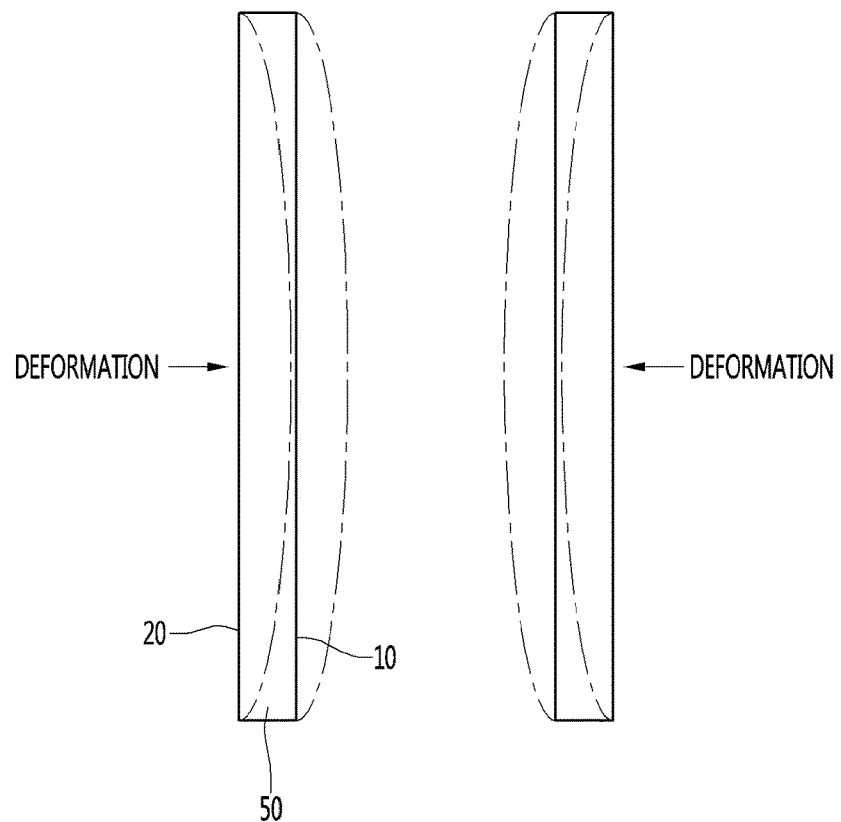
[Fig. 10]
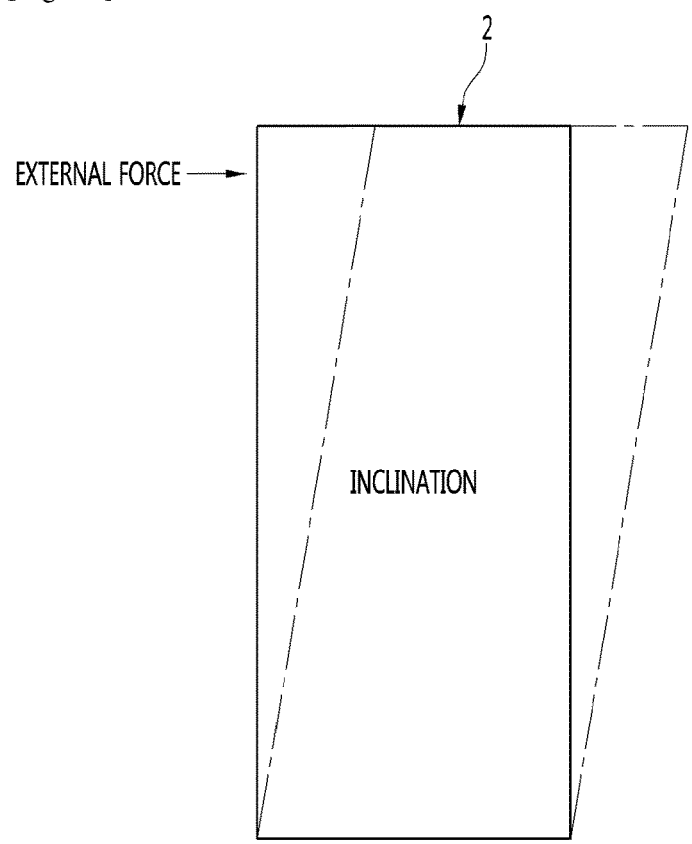

[Fig. 11]
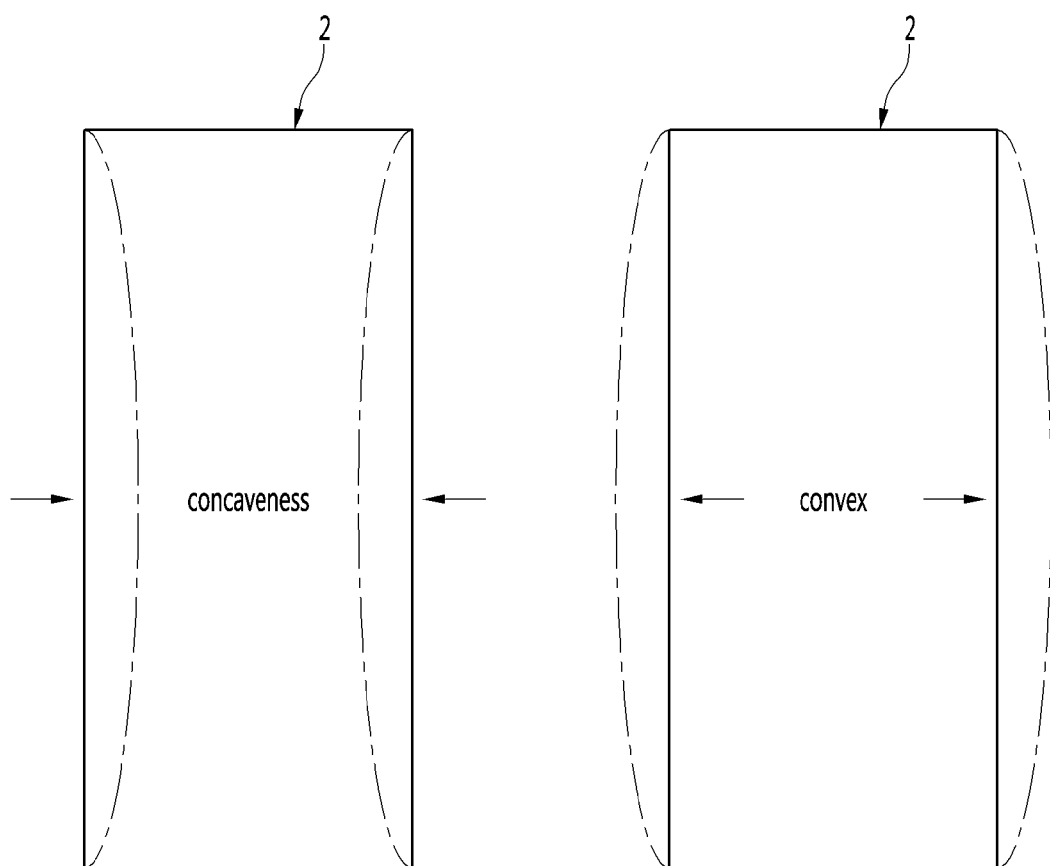

[Fig. 12]
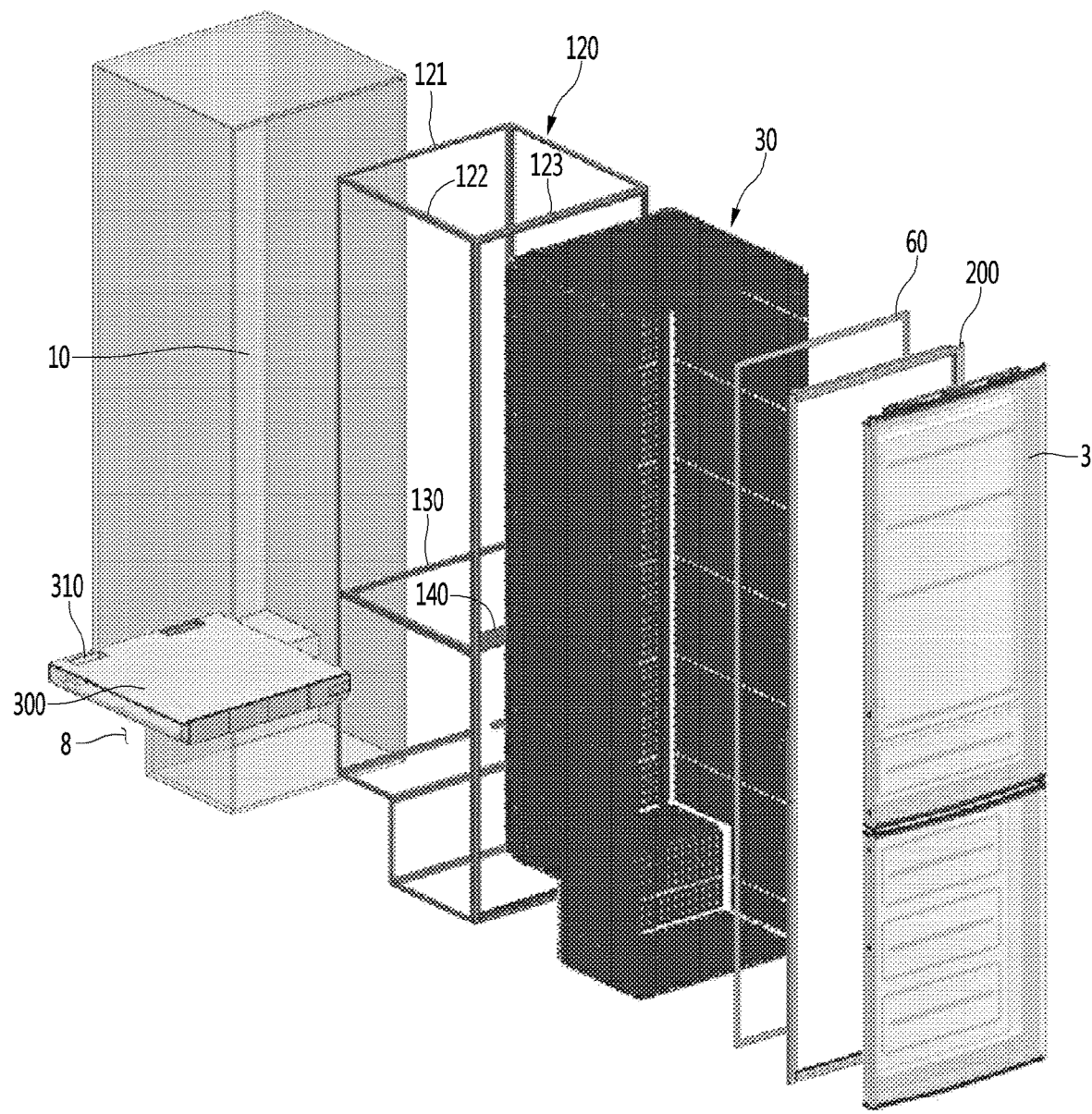

[Fig. 13]
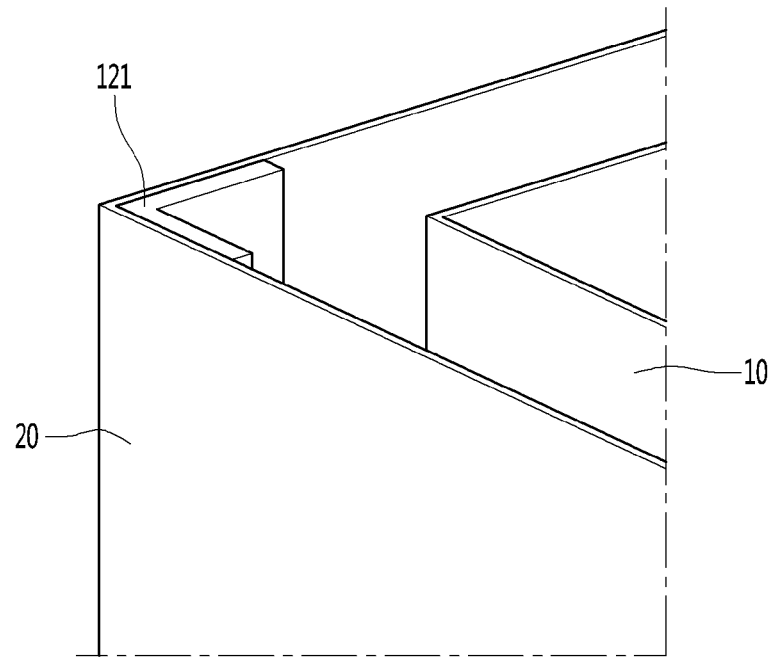
[Fig. 14]
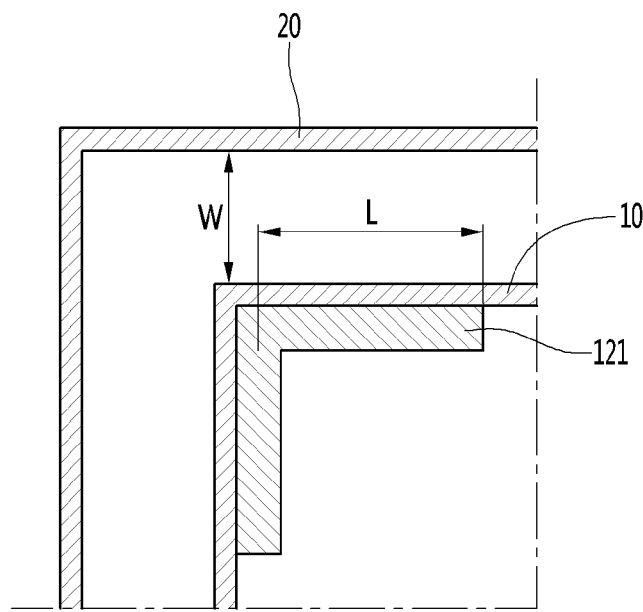

[Fig. 15]
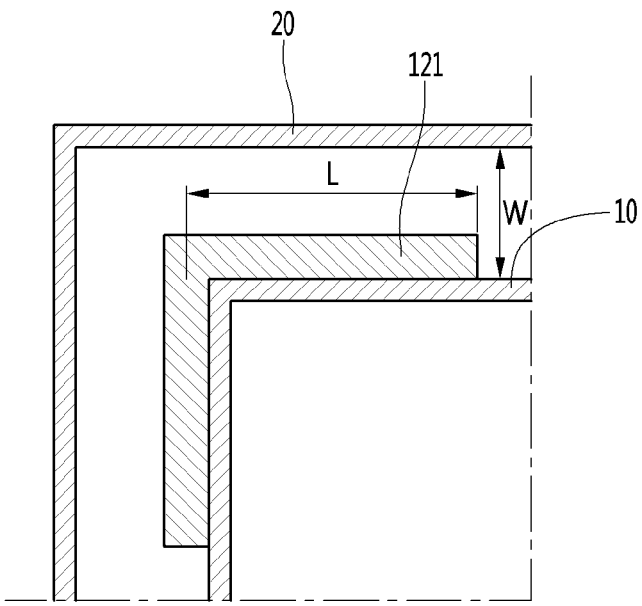
[Fig. 16]
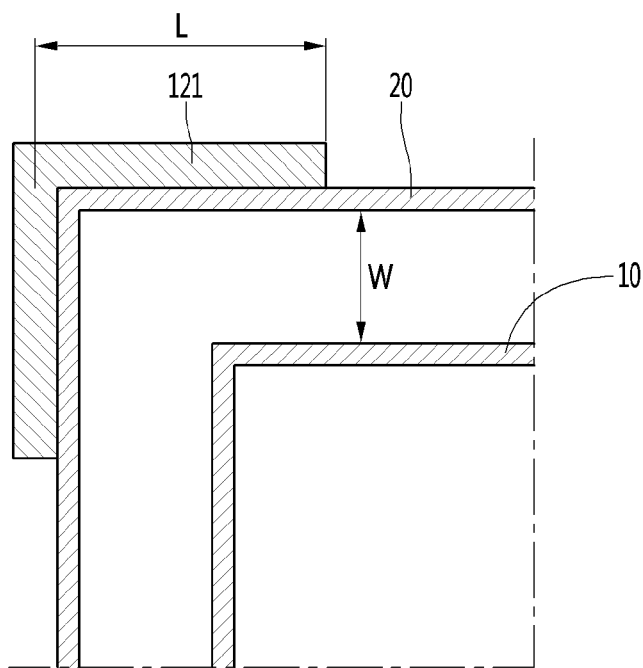

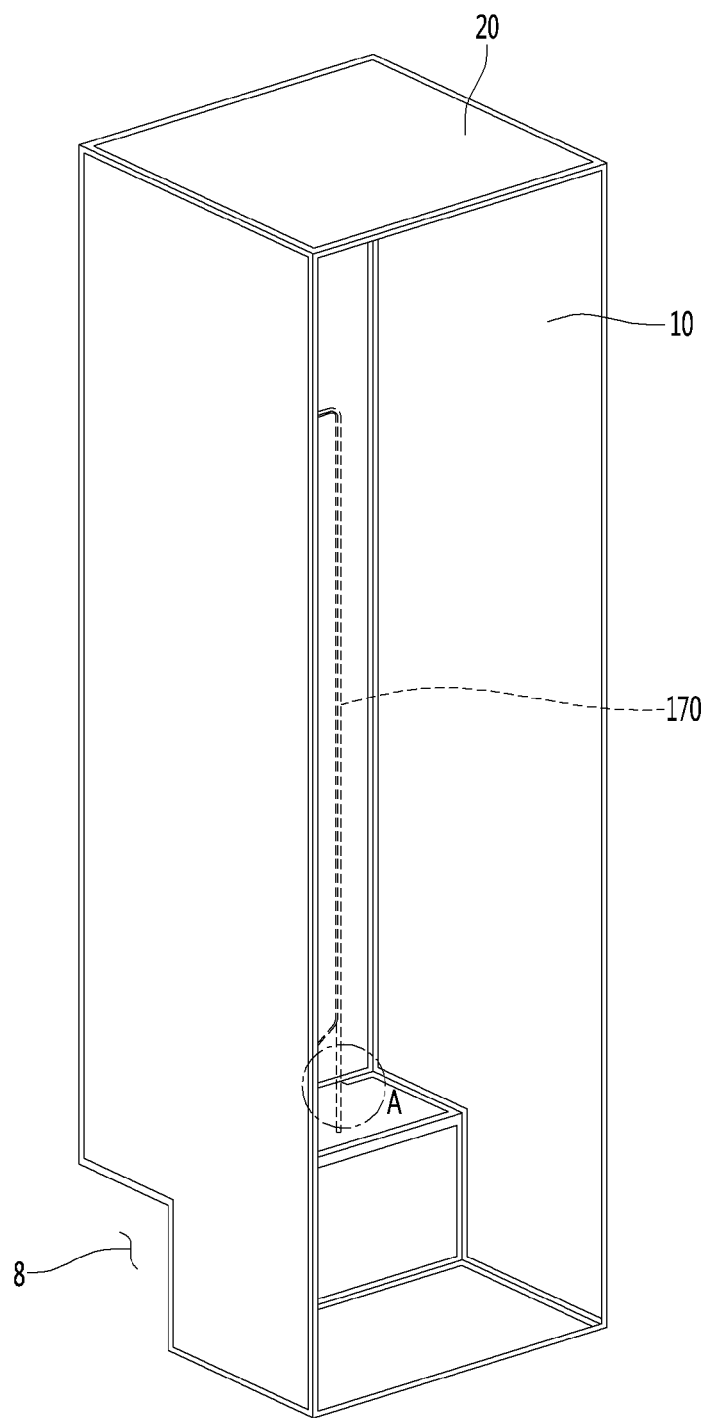
[Fig. 17]

[Fig. 18]
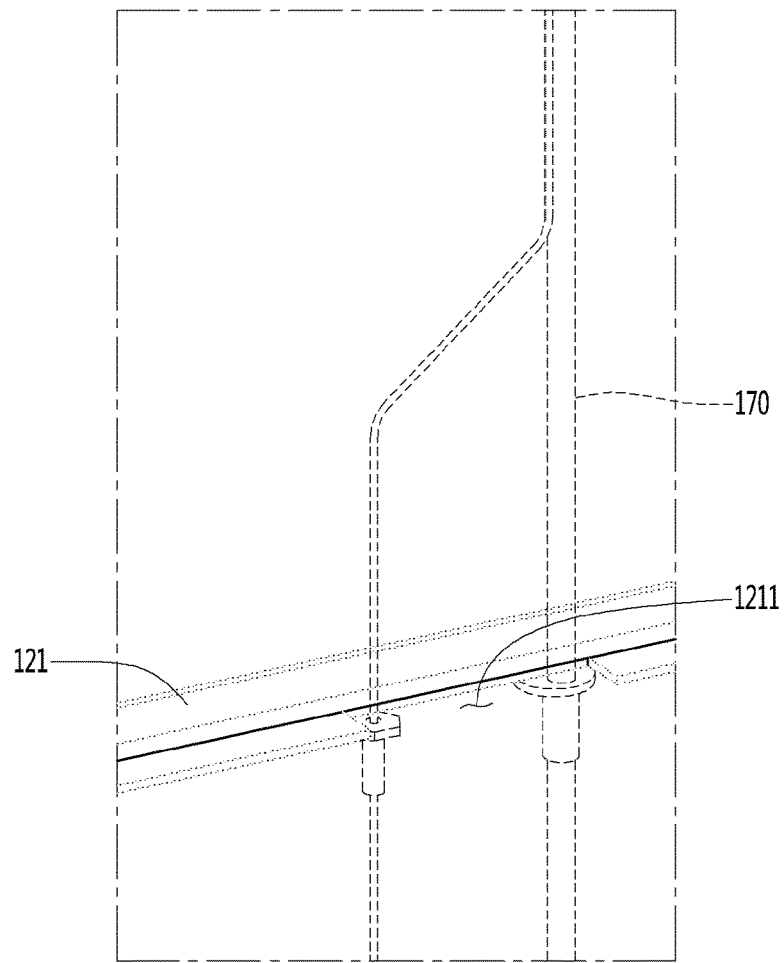
[Fig. 19]
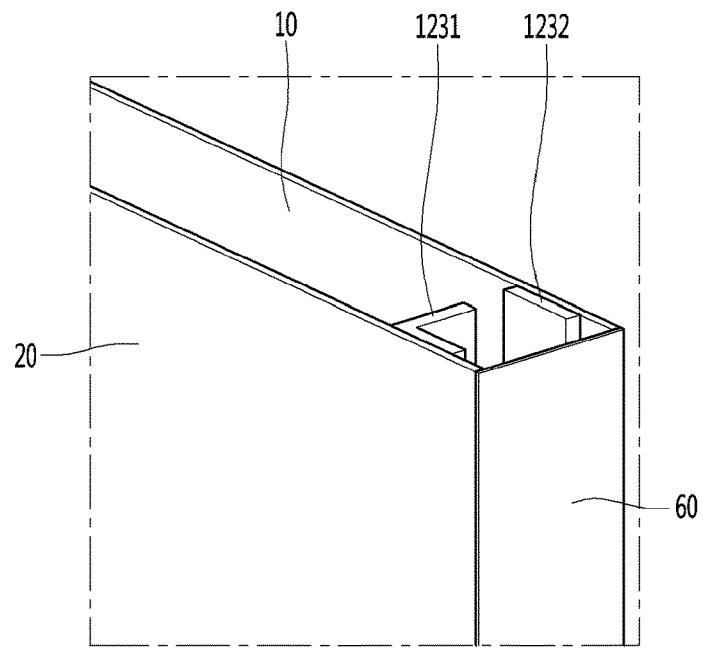

[Fig. 20]
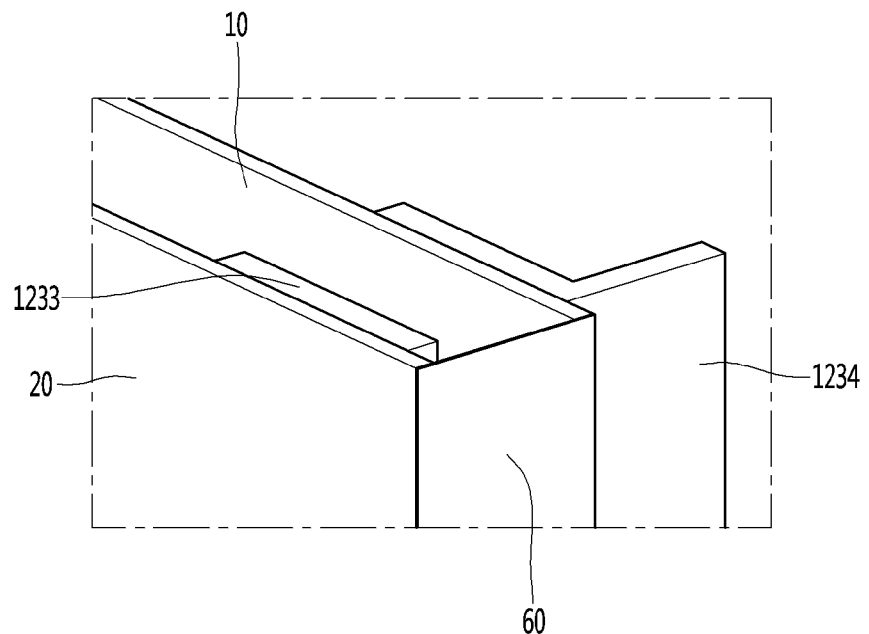
[Fig. 21]
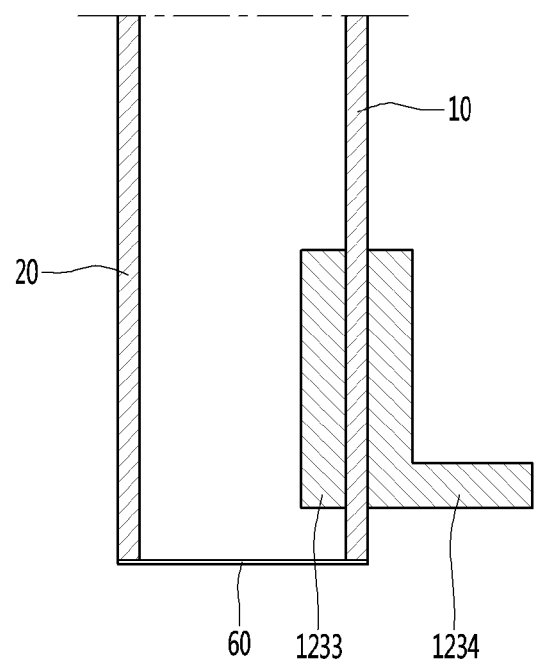

[Fig. 22]
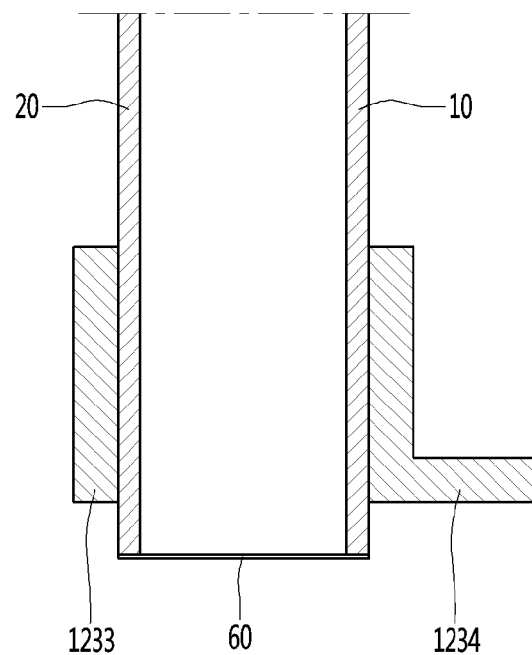
[Fig. 23]
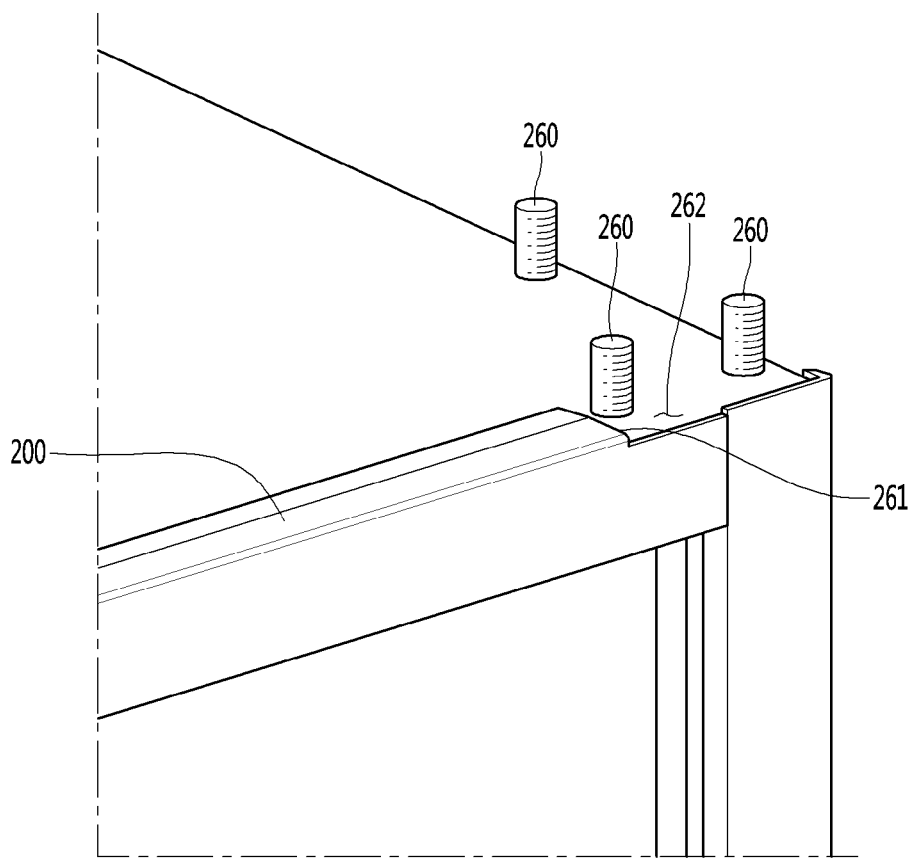

[Fig. 24]
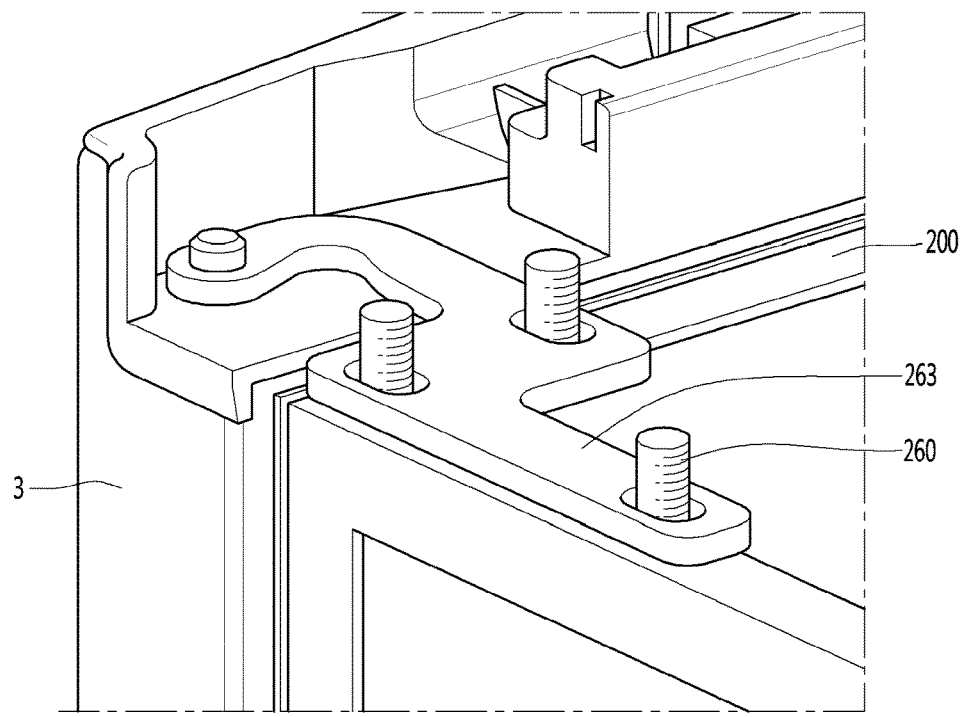
[Fig. 25]
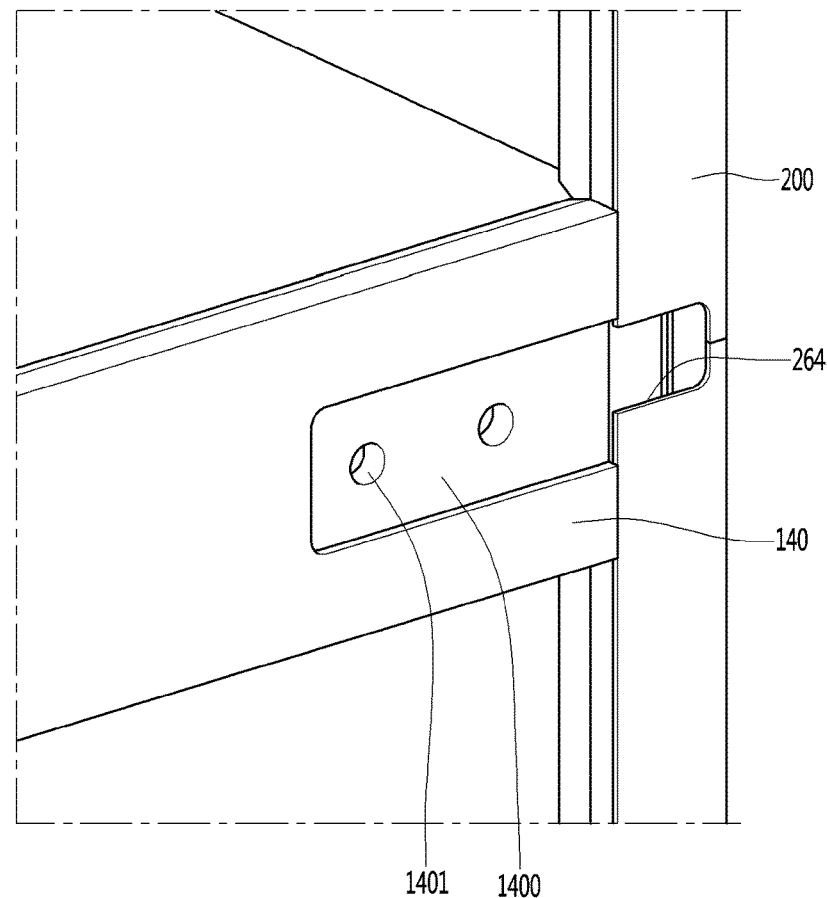

[Fig. 26]
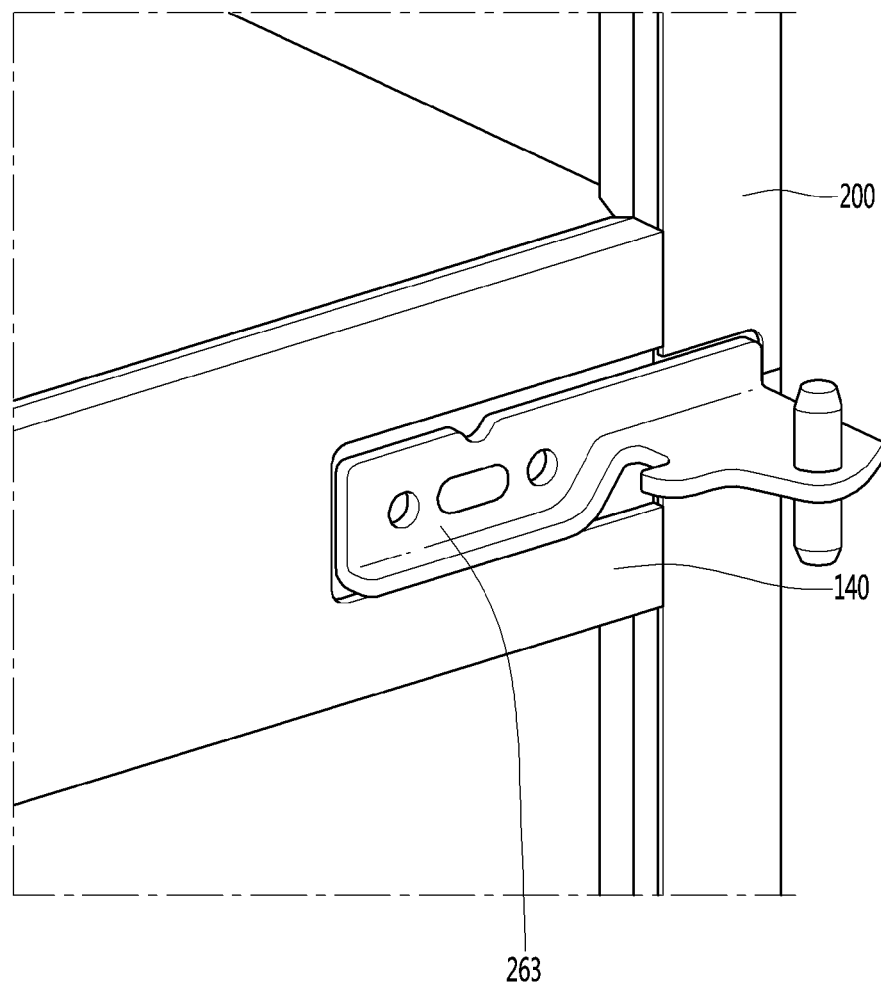

[Fig. 27]
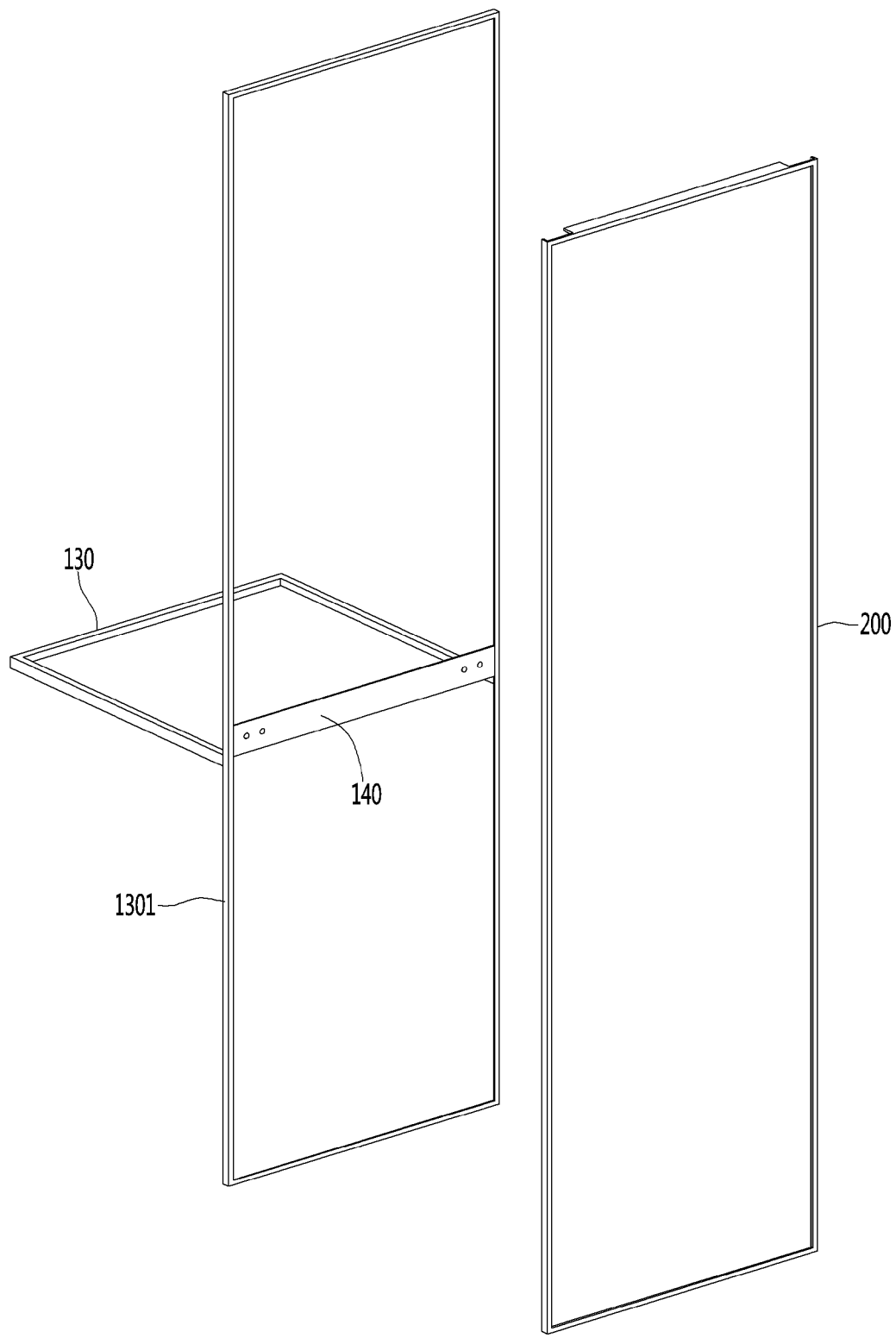

[Fig. 28]
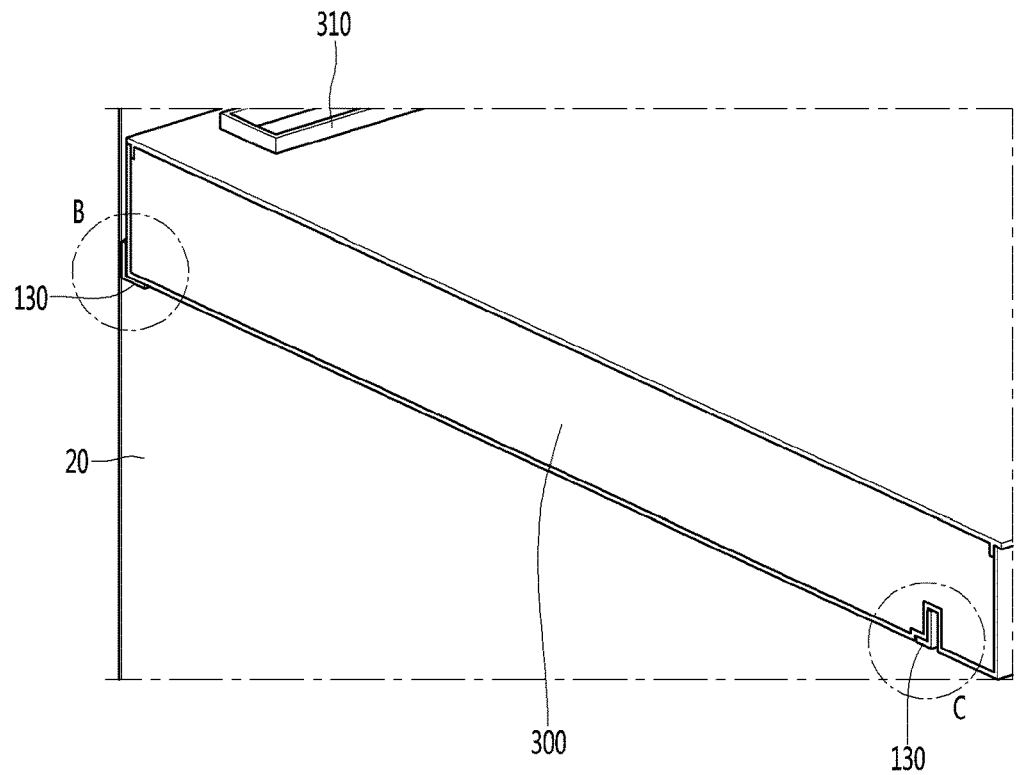
[Fig. 29]
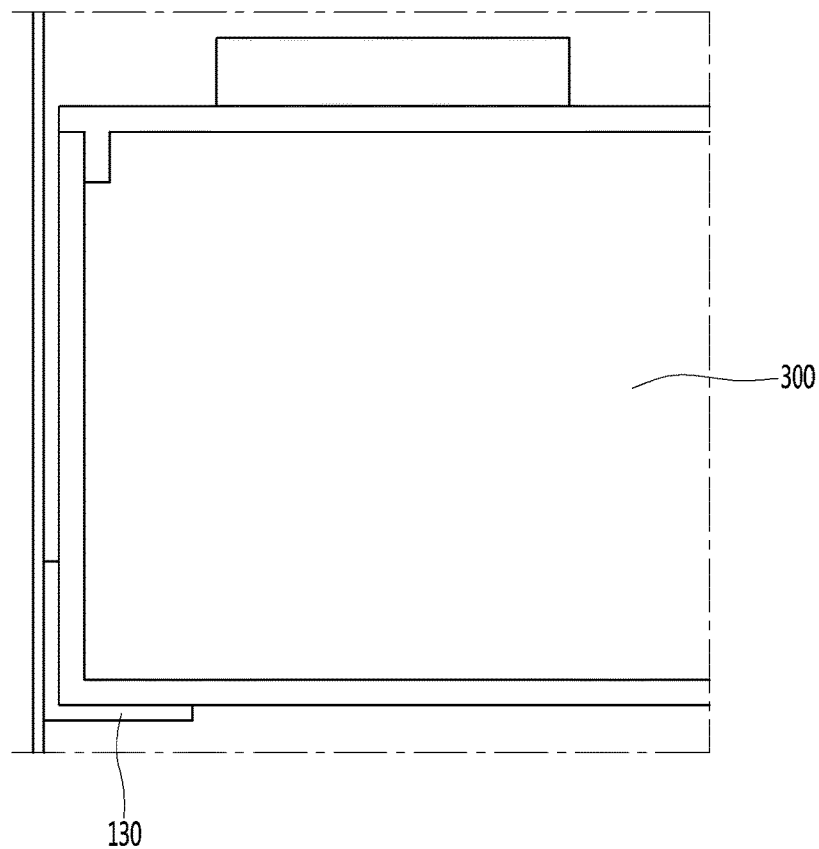

[Fig. 30]
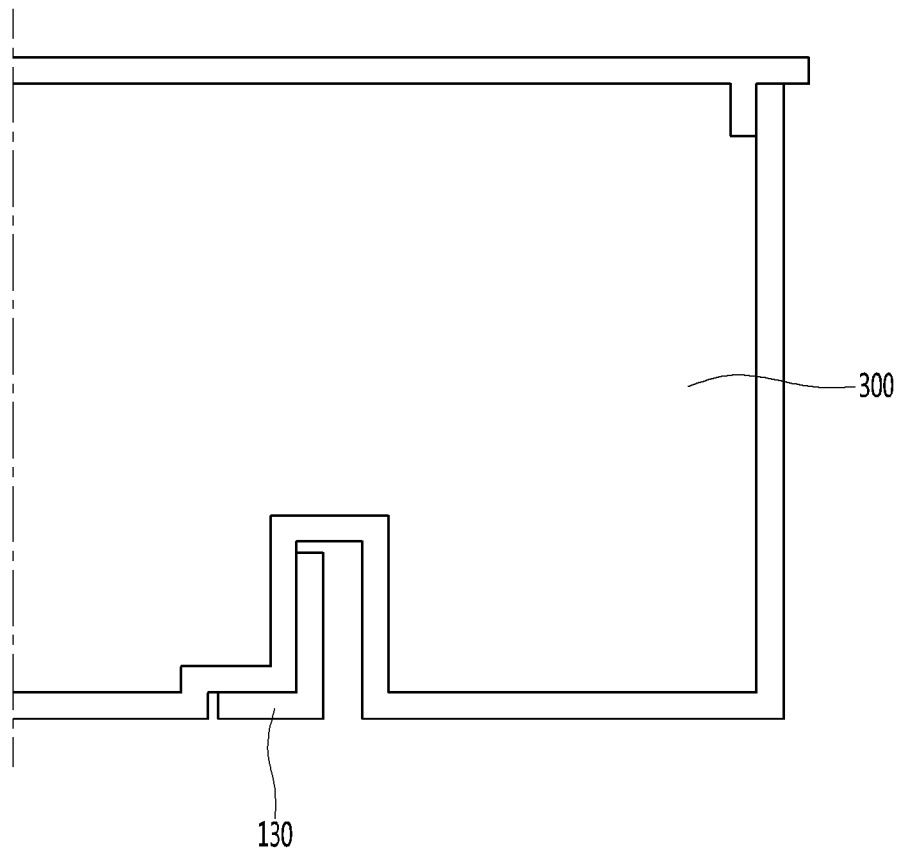
[Fig. 31]
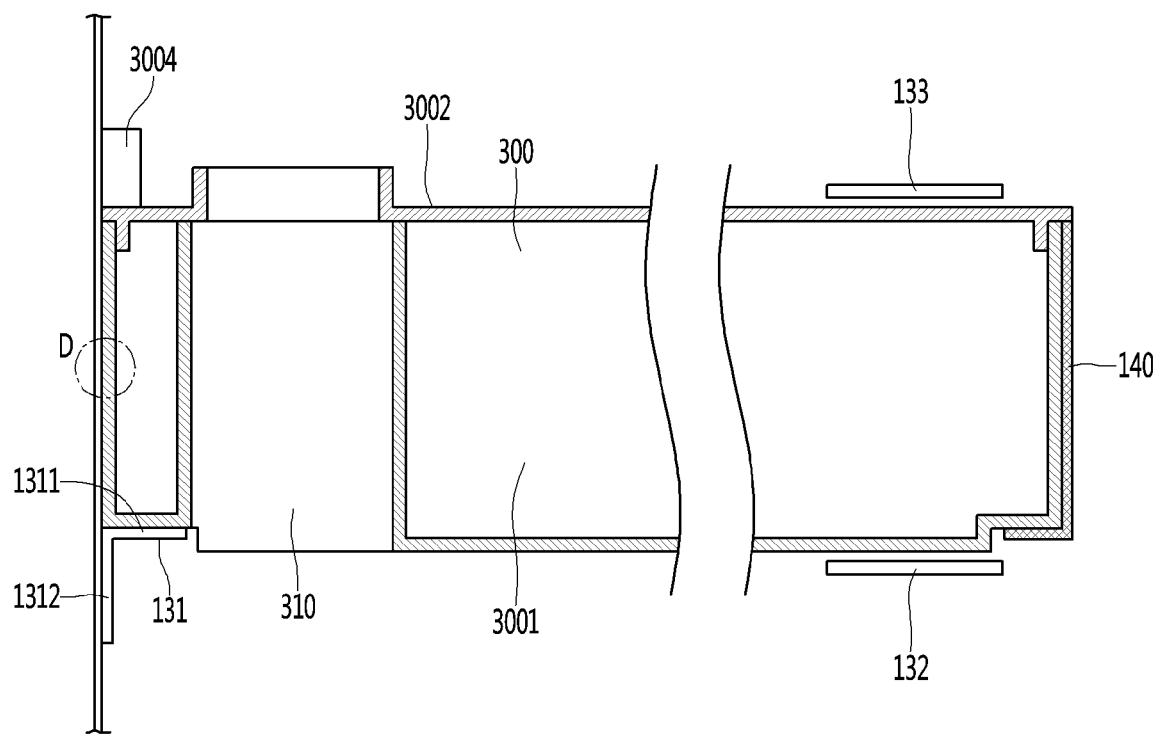

[Fig. 32]
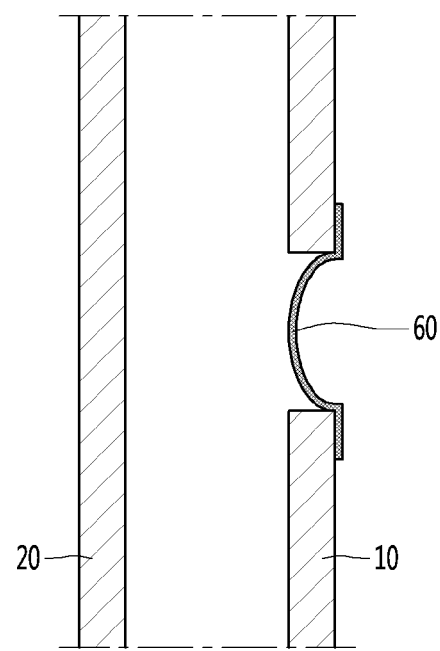

[Fig. 33]
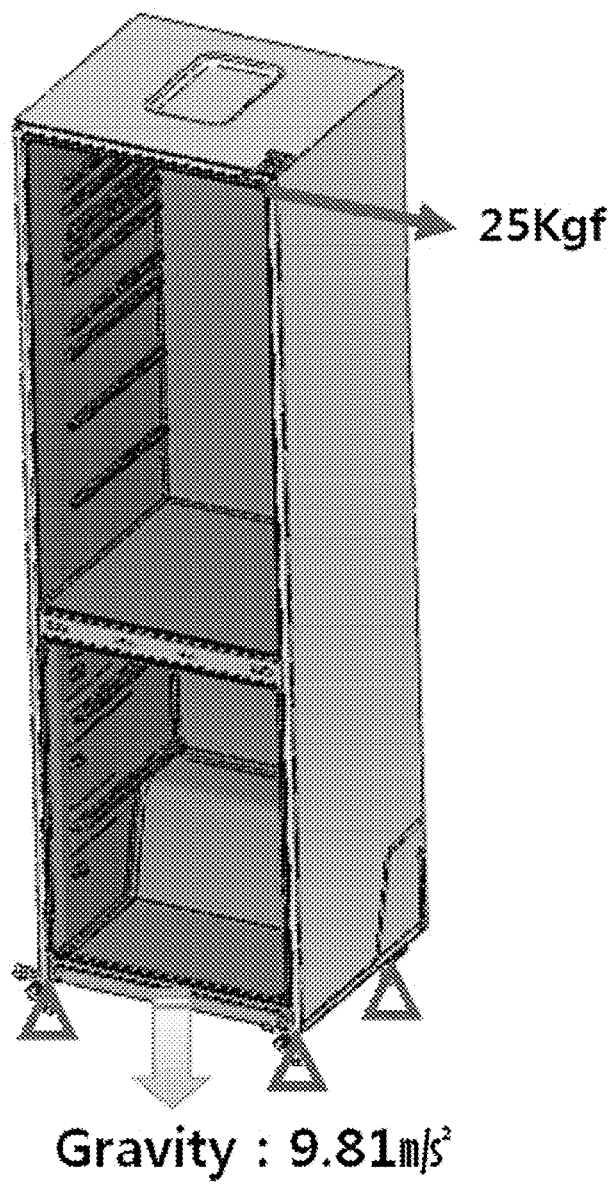

[Fig. 34]
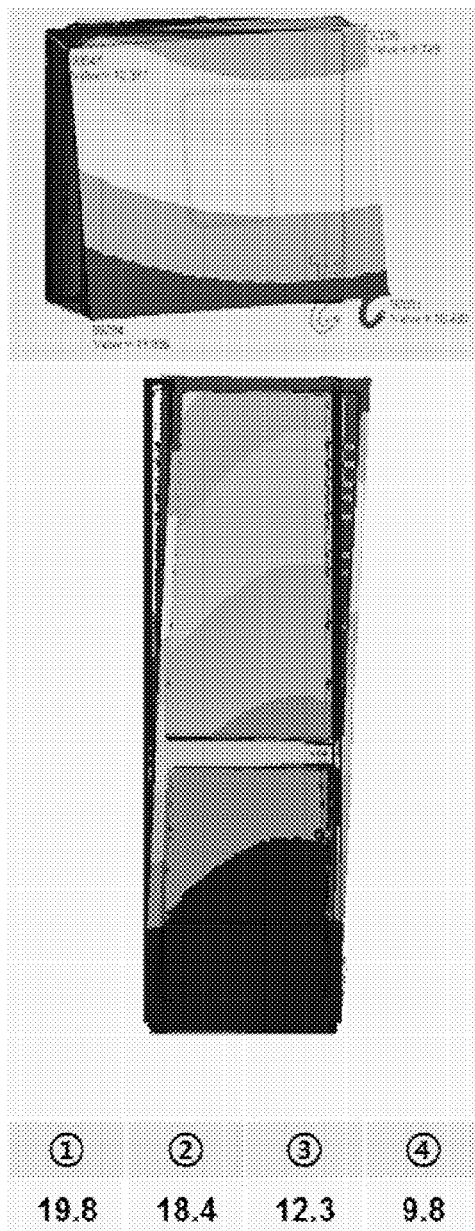

[Fig. 35]
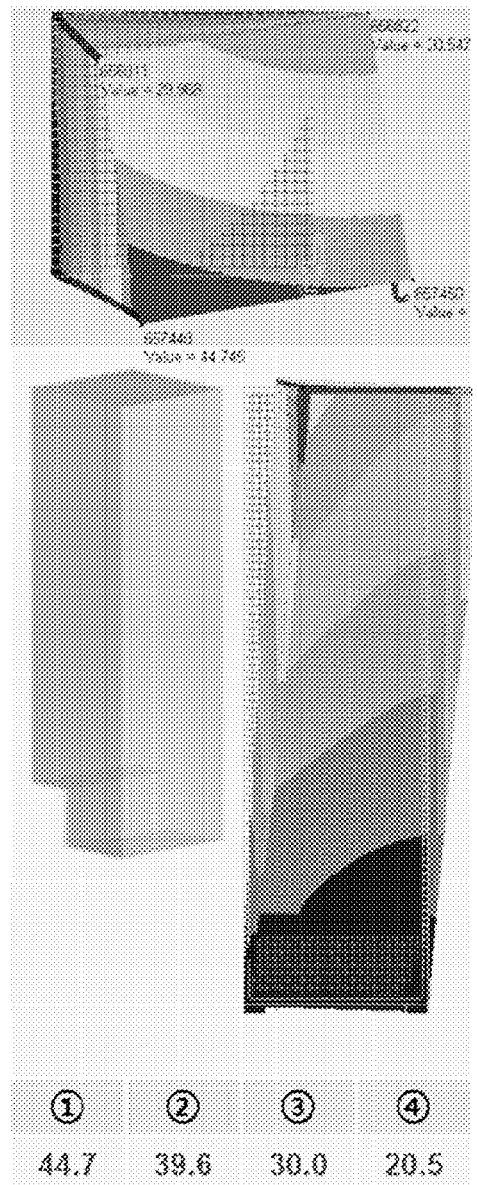

[Fig. 36]
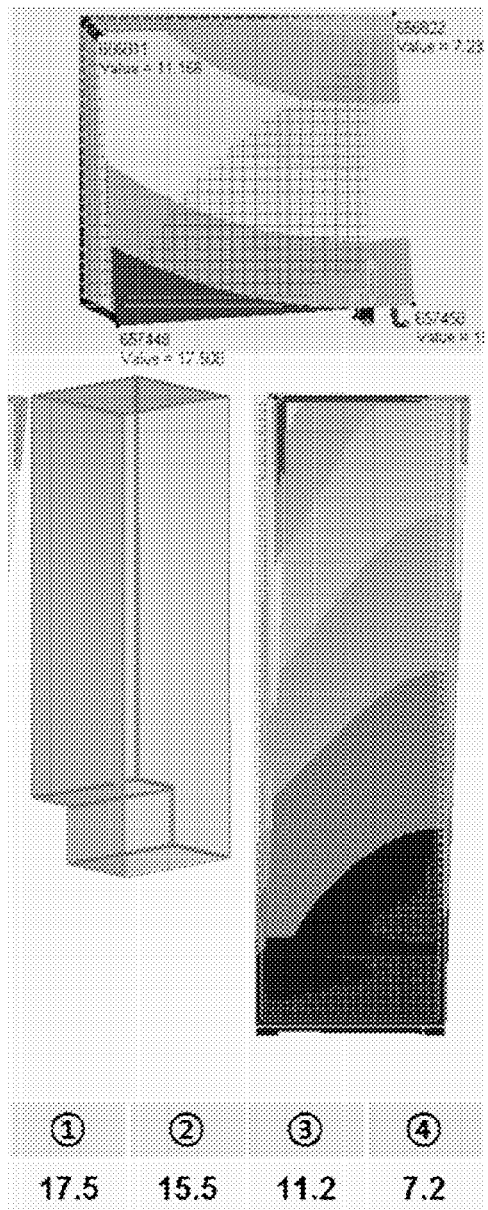

[Fig. 37]
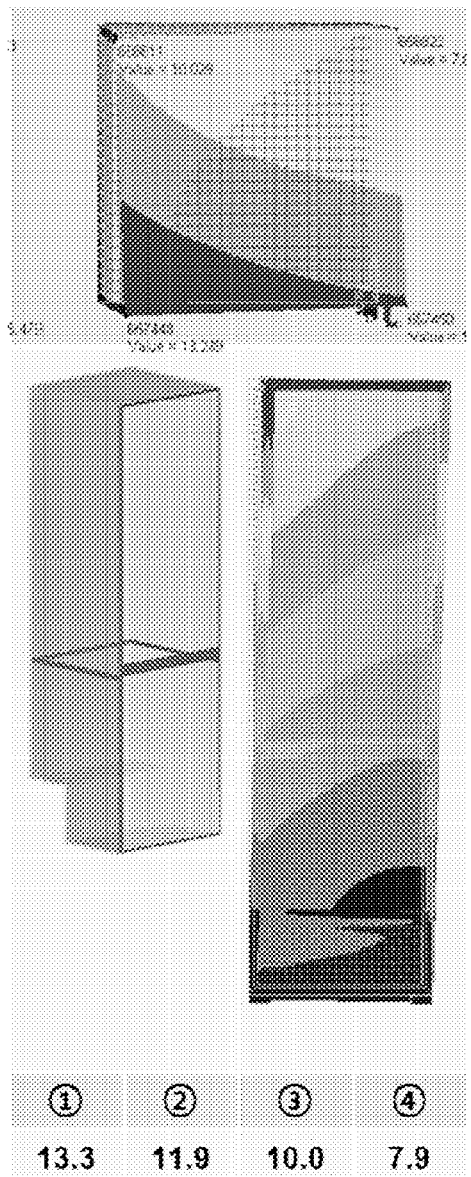

[Fig. 38]
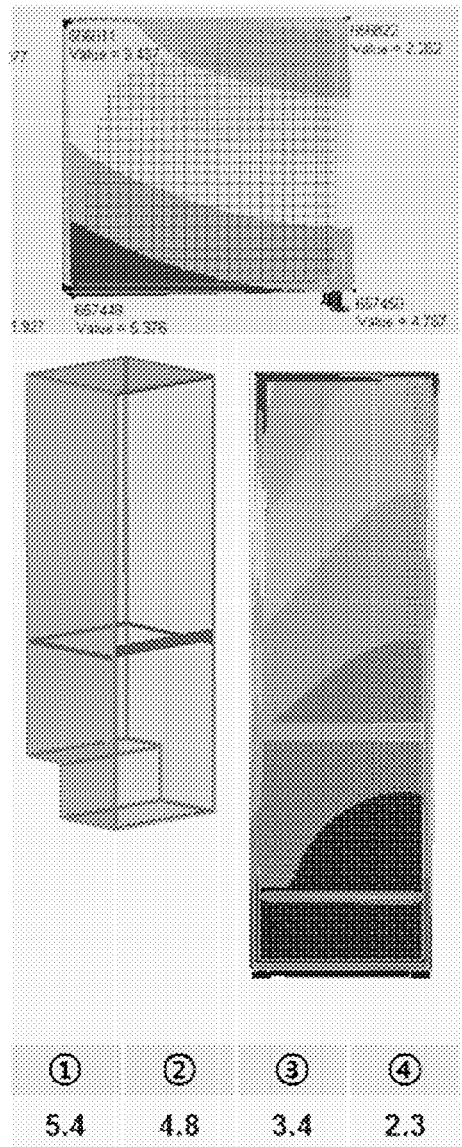

[Fig. 39]
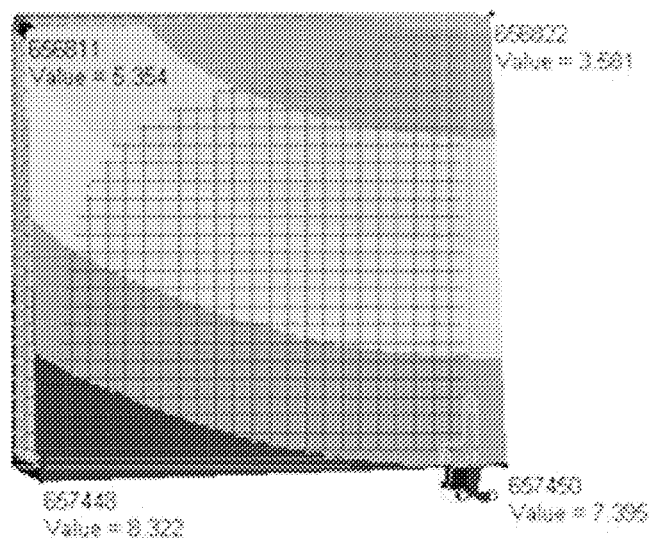

[Fig. 40]
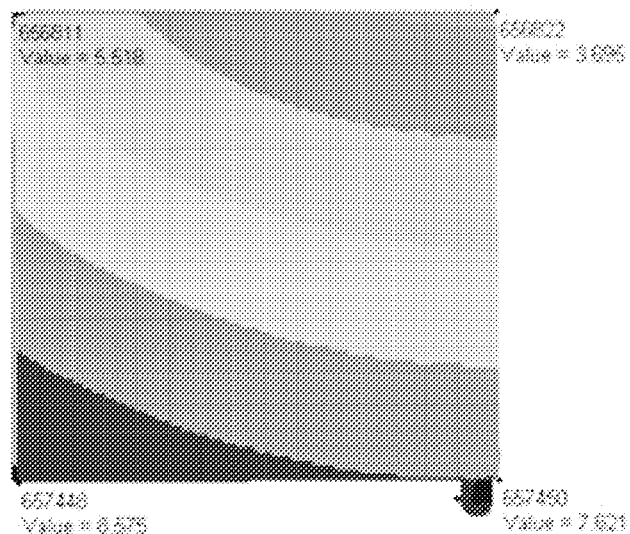

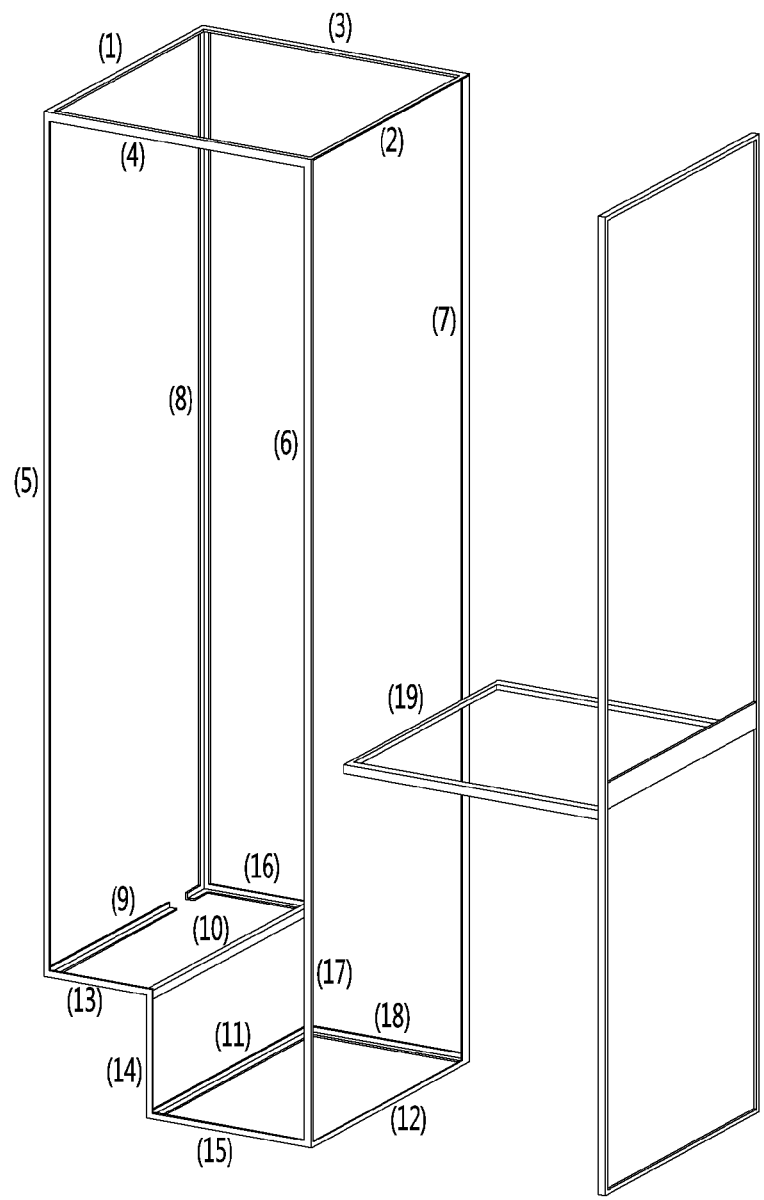
[Fig. 41]

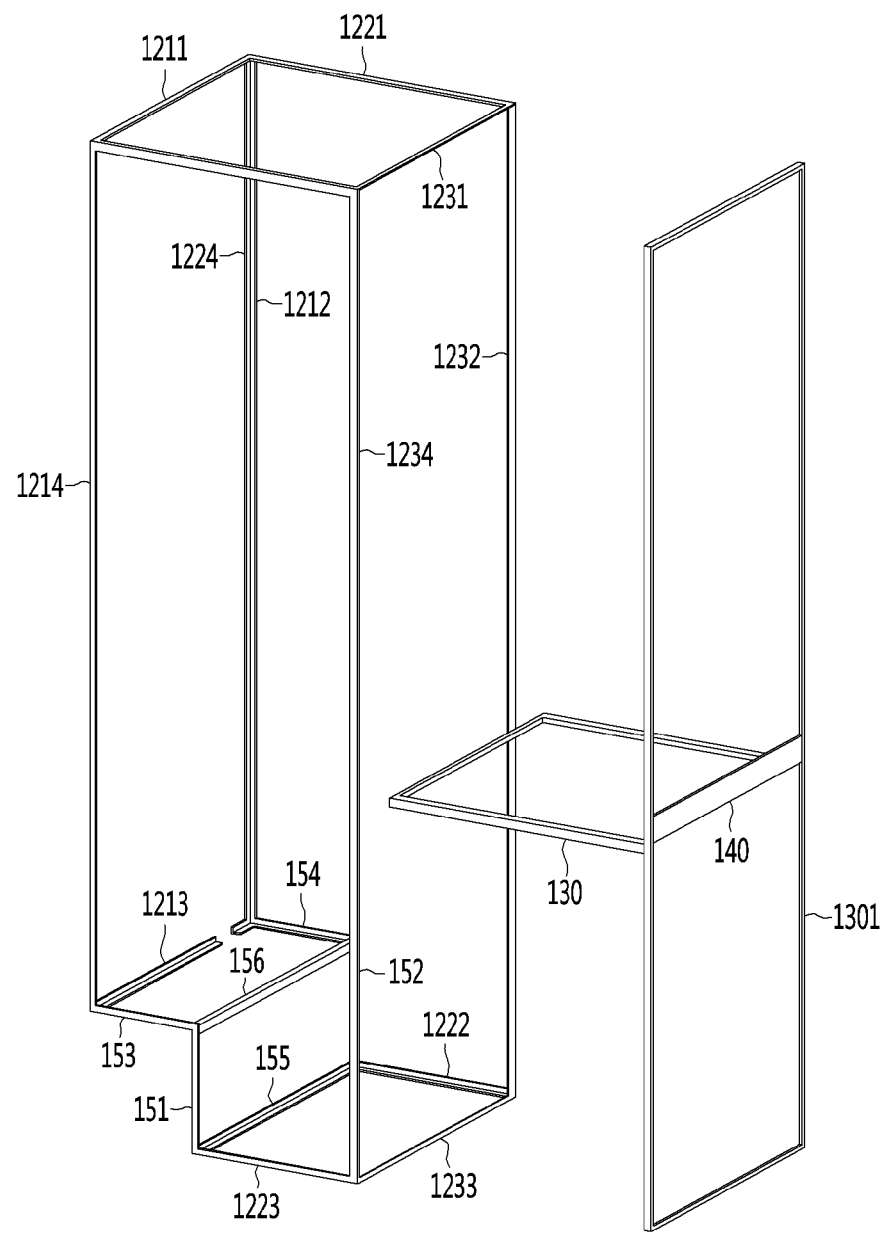
[Fig. 42]

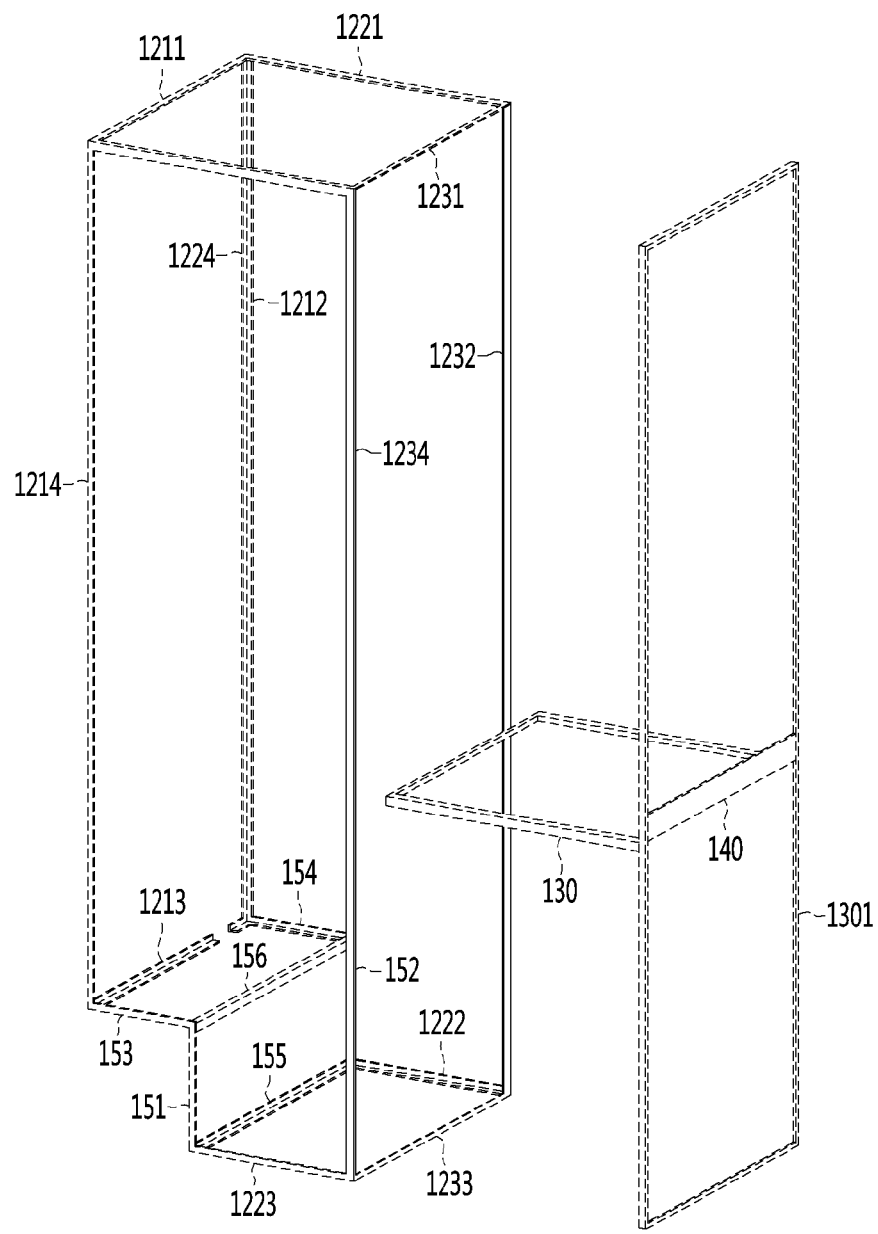
[Fig. 43]

[Fig. 44]
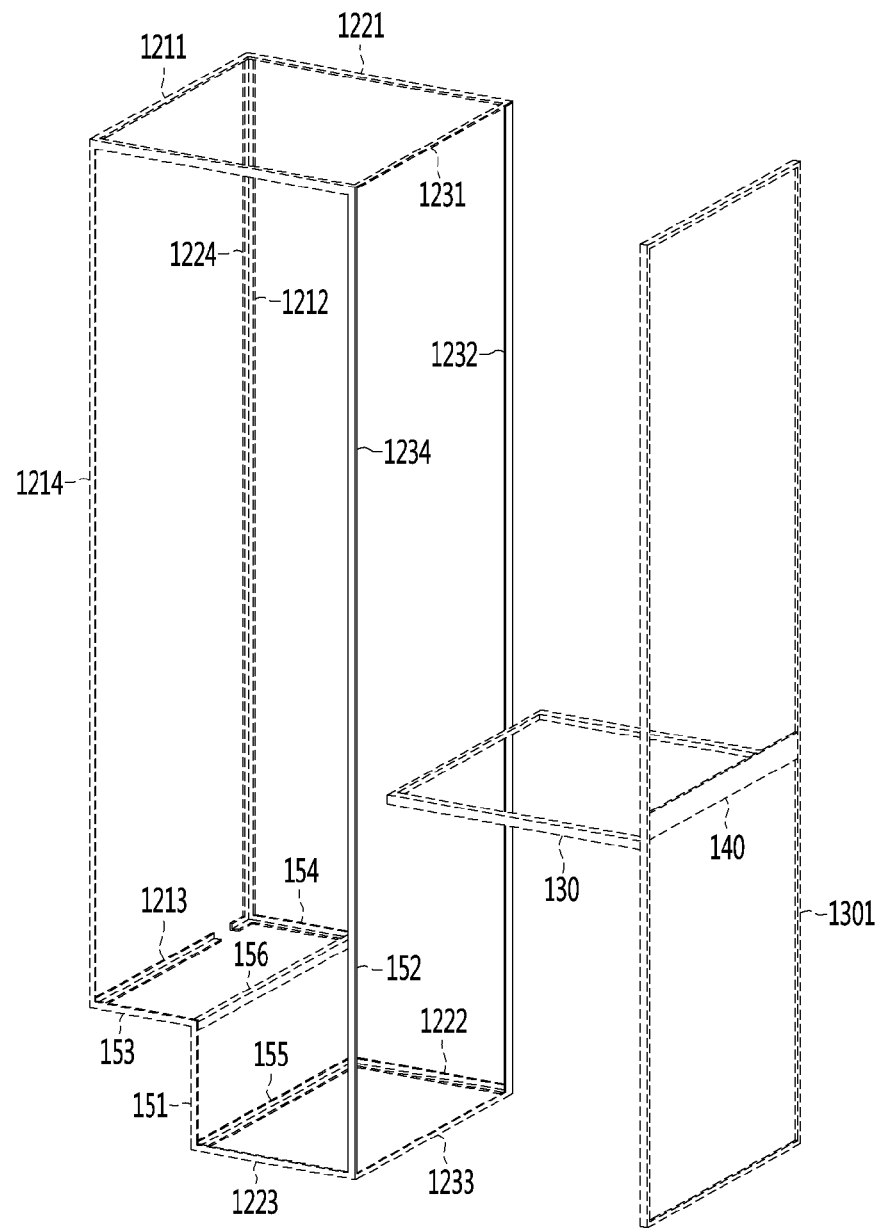

[Fig. 45]
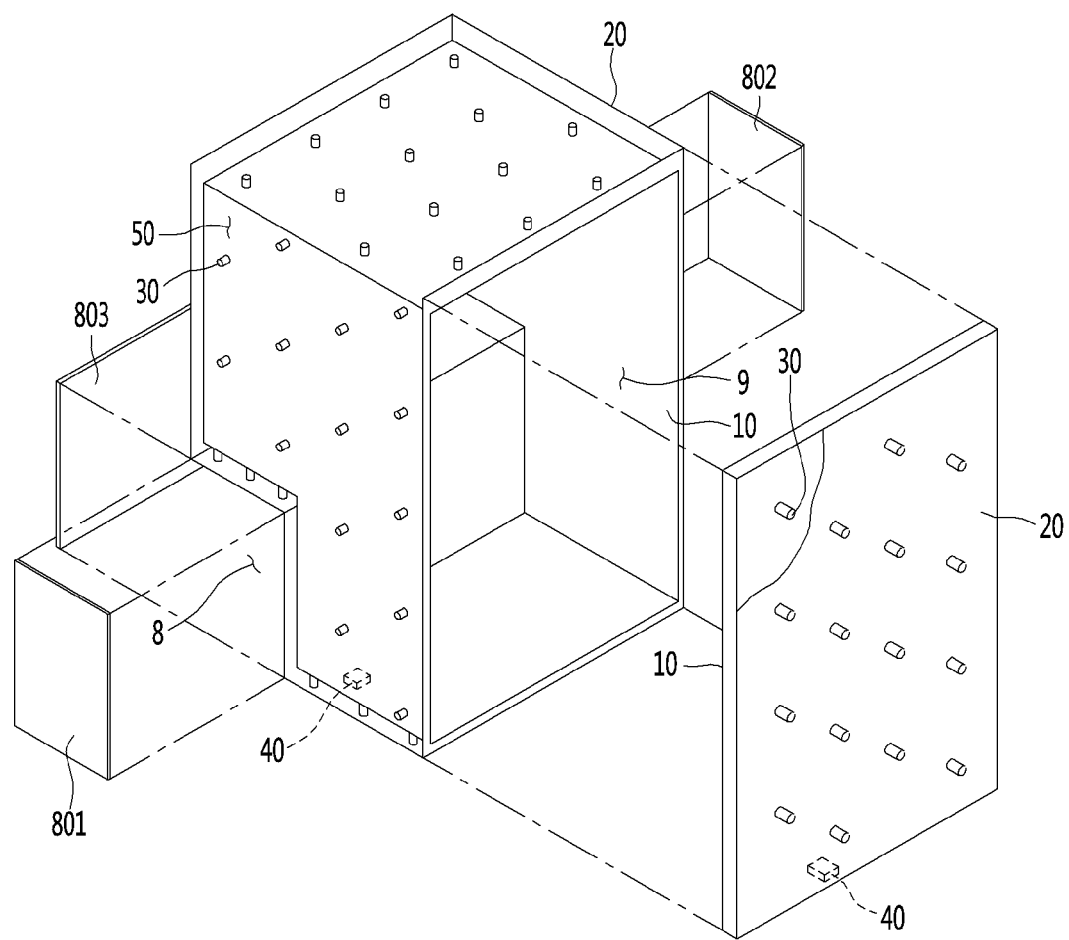

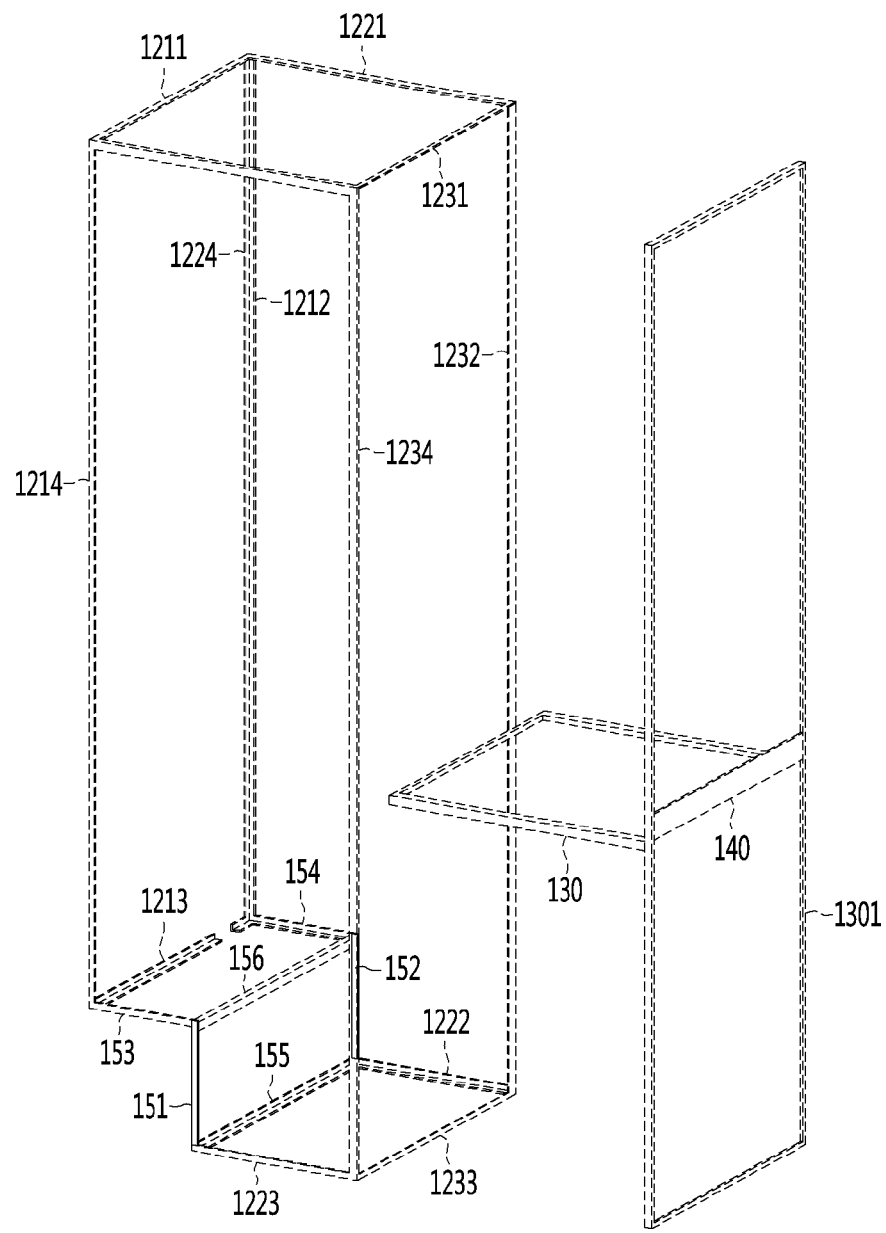
[Fig. 46]

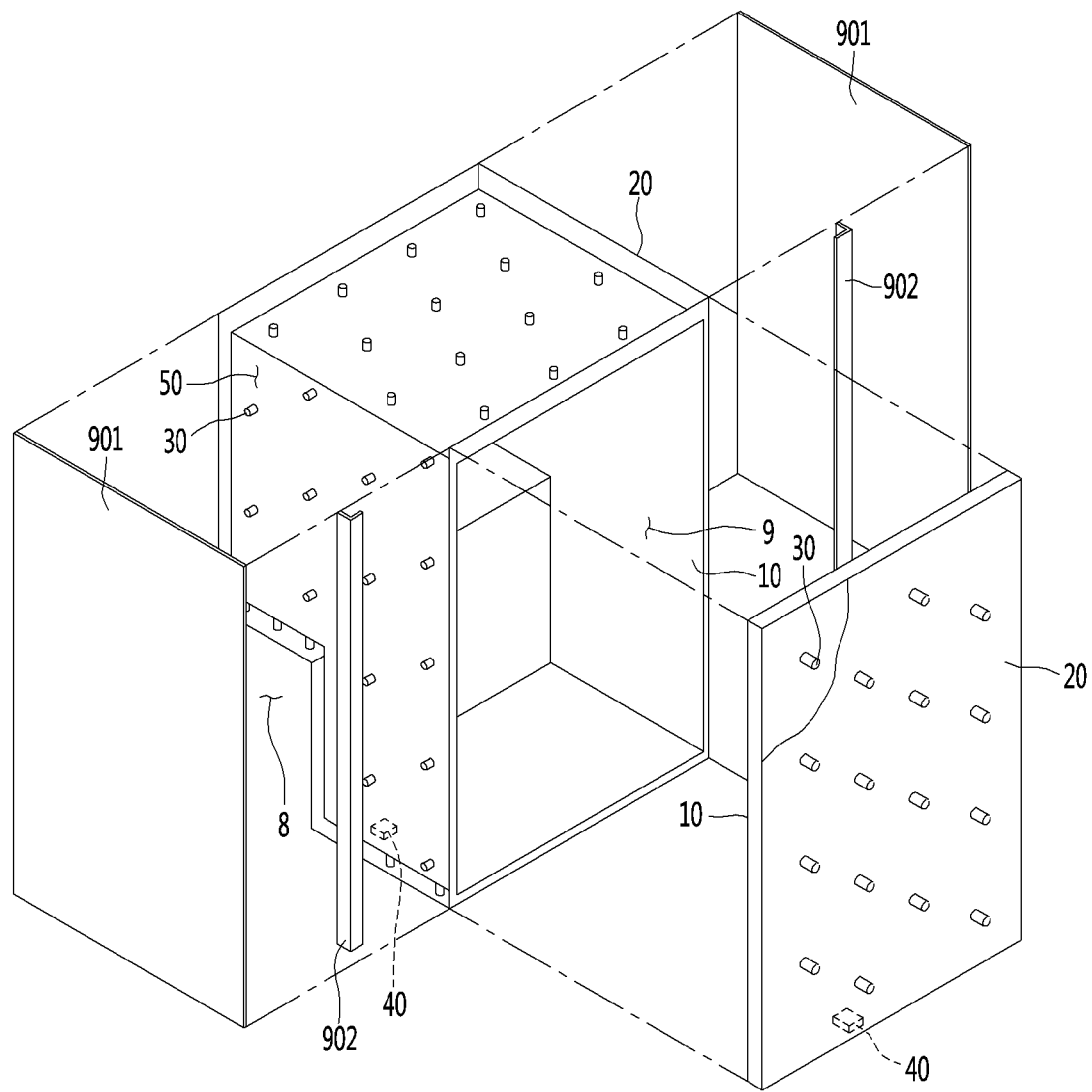
[Fig. 47]

VACUUM ADIABATIC BODY AND REFRIGERATOR

CROSS-REFERENCE TO RELATED PATENT APPLICATIONS

This application is a U.S. National Stage Application under 35 U.S.C. § 371 of PCT Application No. PCT/KR2019/017327, filed Dec. 9, 2019, which claims priority to Korean Patent Application No. 10-2018-0160236, filed Dec. 12, 2018, whose entire disclosures are hereby incorporated by reference.

TECHNICAL FIELD

The present invention relates to a vacuum adiabatic body and a refrigerator.

BACKGROUND ART

A vacuum adiabatic body is a product for suppressing heat transfer by vacuuming the interior of a body thereof. The vacuum adiabatic body can reduce heat transfer by convection and conduction, and hence is applied to heating apparatuses and refrigerating apparatuses. In a typical adiabatic method applied to a refrigerator, although it is differently applied in refrigeration and freezing, a foam urethane adiabatic wall having a thickness of about 30 cm or more is generally provided. However, the internal volume of the refrigerator is therefore reduced.

In order to increase the internal volume of a refrigerator, there is an attempt to apply a vacuum adiabatic body to the refrigerator.

First, Korean Patent No. 10-0343719 (Reference Document 1) of the present applicant has been disclosed. According to Reference Document 1, there is disclosed a method in which a vacuum adiabatic panel is prepared and then built in walls of a refrigerator, and the exterior of the vacuum adiabatic panel is finished with a separate molding as Styrofoam (polystyrene). According to the method, additional foaming is not required, and the adiabatic performance of the refrigerator is improved. However, fabrication cost is increased, and a fabrication method is complicated. As another example, a technique of providing walls using a vacuum adiabatic material and additionally providing adiabatic walls using a foam filling material has been disclosed in Korean Patent Publication No. 10-2015-0012712 (Reference Document 2). According to Reference Document 2, fabrication cost is increased, and a fabrication method is complicated.

As another example, there is an attempt to fabricate all walls of a refrigerator using a vacuum adiabatic body that is a single product. For example, a technique of providing an adiabatic structure of a refrigerator to be in a vacuum state has been disclosed in U.S. Patent Laid-Open Publication No. US2004/0226956A1 (Reference Document 3). However, it is difficult to obtain an adiabatic effect of a practical level by providing the walls of the refrigerator to be in a sufficient vacuum state. Specifically, it is difficult to prevent heat transfer at a contact portion between external and internal cases having different temperatures. Further, it is difficult to maintain a stable vacuum state. Furthermore, it is difficult to prevent deformation of the cases due to a sound pressure in the vacuum state. Due to these problems, the technique of Reference Document 3 is limited to cryogenic refrigerating apparatuses, and is not applied to refrigerating apparatuses used in general households.

As a further alternative, the applicant of the present invention has applied Korean Patent Application Publication No. 10-2017-0016187, a vacuum adiabatic body and a refrigerator. In the present invention, both the door and the main body of the refrigerator are provided as vacuum adiabatic bodies, and, particularly, a large adiabatic material is added to the peripheral portion of the door in order to block cold air leaking from a contact part between the peripheral portion of the main body and the door. However, there is a problem in that the manufacturing thereof is complicated and the internal volume of the refrigerator is greatly reduced. In addition, since the internal space of the vacuum adiabatic body is empty in a vacuum, the strength of the vacuum adiabatic body is weaker than that of the product of the related art filled with a resin material such as polyurethane, which causes a problem that the deformation such as bending or buckling is generated.

In order to solve this problem, the applicant of the present invention has filed a vacuum adiabatic body and a refrigerator as a Korean Patent Application No. 10-2017-0171596. In the present invention, a technical idea of reinforcing insufficient strength by installing a reinforcing frame along a corner inside the vacuum adiabatic body is disclosed.

However, there is a problem that too much work is required and unnecessary material costs are required so as to provide a reinforcing frame in all the vacuum spaces inside the vacuum adiabatic body.

DISCLOSURE OF INVENTION

Technical Problem

The present invention has been made in view of the background described above, and an objective of the present invention is to reinforce the structural strength against various load conditions to prevent breakage of the vacuum adiabatic body.

An objective of the present invention is to reinforce the structural strength of a refrigerator without adversely affecting the internal volume of the refrigerator which can be obtained by application to a vacuum adiabatic body.

An objective of the present invention is to enable a worker to conveniently produce a refrigerator using a vacuum adiabatic body.

An objective of the present invention is to propose an optimal reinforcing frame.

Solution to Problem

A vacuum adiabatic body according to the present disclosure includes at least one reinforcing frame which is installed on at least one of the first plate member and the second plate member to reinforce strength of a vacuum space portion, in which the reinforcement frame includes at least one of at least one of a pair of front frames extending at left and right end portions of the opening in a vertical direction, and at least one of a pair of upper and lower frames of a machine chamber extending in the third space in the vertical direction.

The front frame and the upper and lower frame of the machine chamber are the most necessary frames for strength reinforcement among all corners of the vacuum adiabatic body and are preferably installed in at least one of the two frames.

It is most preferable to include both at least one of the pair of front frames extending at the left and right end portions of the opening in the vertical direction and at least one of the pair of upper and lower frames of the machine chamber extending in the third space in the vertical direction. Thereby, it is possible to apply optimally not only for the purpose of heat insulation which has a machine chamber but also as a structural member of a refrigerator.

The thickness of the second plate member is larger than the thickness of the first plate member, and when then at least any one of the pair of front frames extending at the left and right end portions of the opening in the vertical direction is included. According to this, the structural strength of the refrigerator can be maintained by the reinforcing action between the reinforcing frame and the plate member.

The front frame may extend along an extending direction of the conductive resistance sheet, the front frame being adjacent to the conductive resistance sheet. According to this, it is possible to reinforce the weak opening portion with low strength.

The vacuum adiabatic body may further include an external cover which is fastened to an outer surface of the second plate member; and at least one of the pair of front frames extending at the left and right end portions of the opening in the vertical direction. According to this, not only the strength is reinforced by the external cover provided separately at the outer portion, but also the plate member can be shielded by the external cover.

The front frame may be provided in the third space to increase the space utilization of the outer portion of the vacuum adiabatic body and to enlarge the receiving space of the goods.

It is most preferable for manufacture of the refrigerator that the vacuum adiabatic body further includes both a pair of upper and lower frames of the machine chamber extending in the third space in the vertical direction and a pair of outer front frames extending from the outside of the left and right end portions of the opening in the vertical direction.

A vacuum adiabatic body according to the present disclosure includes a main body having a vacuum space, a machine chamber which is provided on a lower portion of a rear side of the main body, a door which opens and closes the opening of the main body, at least one reinforcing frame which reinforces the strength of the main body so that an upper end portion of the main body is capable of being prevented from being obliquely deformed, in which the reinforcement frame includes upper and lower frames of the machine chamber which is provided in the vacuum space and extend at the front of the machine chamber in a vertical direction, and a front frame which extends along the conductive resistance sheet in the vertical direction and is provided in the vacuum space.

According to this, by installing the upper and lower frames of the machine chamber in the vertical direction of the machine chamber for the largest strength reinforcement, and by reinforcing the strength of the opening portion of the vacuum space portion by the front frame, the effect of the maximum strength reinforcement can be obtained as a minimum member.

The refrigerator further includes side frames which connect the upper and lower frames of the machine chamber and the lower end portions of the pair of front frames to each other in the front and rear direction, respectively, and thus strength reinforcing effect by structure coupling can be maximized.

A pair of front frames are provided, and thus strength reinforcing effect can be obtained in both left and right directions.

The refrigerator further includes at least one of the other front frames which connect the pair of upper ends and lower ends of the front frame to each other, respectively, and thus the strength reinforcing effect on the opening can be maximized.

A vacuum adiabatic body according to the present disclosure includes a main body having a vacuum space, a machine chamber which is provided on a lower portion of a rear side of the main body, a door which opens and closes the opening of the main body, and at least one reinforcing frame which reinforces the strength of the main body so that an upper end portion of the main body is capable of being prevented from being obliquely deformed, in which the reinforcement frame may further include a pair of front frames which extend along the conductive resistance sheet in the vertical direction and may be provided in the third space, and the thickness of the second plate member is larger than the thickness of the first plate member.

According to this, the protection of the opening portion and the strength reinforcing action by the outer plate member cause synergy to each other, whereby a suitable strength reinforcing action of the refrigerator can be obtained as the minimum member. In addition, by removing the bending of the outer plate member, the action of eliminating a bent portion can be obtained together.

The refrigerator further includes upper and lower frames of the machine chamber which are provided in the third space and extends at the front of the machine chamber in the vertical direction, and thus reinforcing effect can be obtained for the machine chamber subjected to high external forces.

A vacuum adiabatic body according to the present disclosure includes a main body having a vacuum space, a machine chamber which is provided on a lower portion of a rear side of the main body, a door which opens and closes the opening of the main body, and at least one reinforcing frame which reinforces the strength of the main body so that an upper end portion of the main body is capable of being prevented from being obliquely deformed, in which the reinforcement frame includes a pair of front frames which extend along the conductive resistance sheet in the vertical direction and are provided in the vacuum space; and a side frame of the machine chamber which is provided on at least one of both side surfaces of the machine chamber and fastened to the second plate member. According to this, a sufficient strength reinforcing effect can be obtained while reducing the number of members used in the vacuum space.

The side frames of the machine chamber are provided on both side surfaces of the machine chamber, and thus the balance of force for strength reinforcement of left and right can be obtained.

The refrigerator further includes a rear frame of the machine chamber which is provided at the rear surface of the machine chamber and fastened to the second plate member, and thus strengthening effect on the rear side can be obtained.

The side frame of the machine chamber is made of material thicker or stronger than the plate member, and thus strength reinforcing effect on the plate member can be performed.

A vacuum adiabatic body according to the present disclosure includes a main body having a vacuum space, a machine chamber which is provided on a lower portion of a rear side of the main body, a door which opens and closes the opening of the main body, and at least one reinforcing frame which reinforces the strength of the main body so that an upper end portion of the main body is capable of being prevented from being obliquely deformed, in which the reinforcement frame includes upper and lower frames of the machine chamber which are provided inside the vacuum space and extend at the front of the machine chamber in the vertical direction, and at least one of front frames extending along upper and lower sides of an end portion of the opening in the vertical direction. According to this, it is possible to reduce the material cost, save resources, simplify the production, and obtain member strength that can cope with the use of the refrigerator.

The refrigerator further includes an external cover which is fastened to an outer surface of the second plate member, and thus it can be made to withstand the strength it may lack.

At least one of the upper and lower frames of the machine chamber and the front frame are provided in pairs, and thus strength can be reinforced by balancing the left and right directions.

Advantageous Effects of Invention

According to the present invention, it is possible to maintain the shape of the vacuum adiabatic body firmly and to prevent breakage of the refrigerator.

According to the present invention, it is possible to increase the strength of the vacuum adiabatic body while increasing the space inside the refrigerator.

According to the present invention, the manufacture of the refrigerator can be facilitated and the productivity can be improved.

According to the present invention, it is possible to prevent refrigeration of resources and to produce refrigerators at low cost.

BRIEF DESCRIPTION OF DRAWINGS

FIG. 1 is a perspective view of a refrigerator according to an embodiment.

FIG. 2 is a view schematically showing a vacuum adiabatic body used in a main body and a door of the refrigerator.

FIG. 3 is a view showing various embodiments of an internal configuration of a vacuum space part.

FIG. 4 is a view showing various embodiments of conductive resistance sheets and peripheral portions thereof.

FIG. 5 illustrates graphs showing changes in adiabatic performance and changes in gas conductivity with respect to vacuum pressures by applying a simulation.

FIG. 6 illustrates graphs obtained by observing, over time and pressure, a process of exhausting the interior of the vacuum adiabatic body when a supporting unit is used.

FIG. 7 illustrates graphs obtained by comparing vacuum pressures and gas conductivities.

FIG. 8 is a modeling diagram illustrating various loading conditions given to an upright vacuum adiabatic body.

FIGS. 9 to 11 are views for explaining deformation of the vacuum adiabatic body.

FIG. 12 is an exploded perspective view illustrating a refrigerator according to an embodiment.

FIG. 13 is a partially cutaway sectional view of a rear corner portion of the vacuum adiabatic body.

FIG. 14 is a sectional view of a vacuum adiabatic body illustrating a rear frame according to another embodiment.

FIG. 15 is a sectional view of a vacuum adiabatic body illustrating a rear frame according to another embodiment.

FIG. 16 is a sectional view of a vacuum adiabatic body illustrating a rear frame according to another embodiment.

FIG. 17 is a view illustrating a heat exchange pipeline in a vacuum adiabatic body in which a reinforcing frame is installed.

FIG. 18 is an enlarged view illustrating portion A in FIG. 17.

FIG. 19 is a sectional perspective view of a vacuum adiabatic body illustrating a reinforcing frame according to another embodiment.

FIG. 20 is a sectional perspective view of a vacuum adiabatic body illustrating a reinforcing frame according to another embodiment.

FIG. 21 is a sectional view of a vacuum adiabatic body illustrating a reinforcing frame according to another embodiment.

FIG. 22 is a sectional view of a vacuum adiabatic body illustrating a reinforcing frame according to another embodiment.

FIGS. 23 and 24 are perspective views illustrating a certain vertex portion of the vacuum adiabatic body, FIG. 23 is a view illustrating a state before a door hinge is installed, and FIG. 24 is a view illustrating a state where the door hinge is installed.

FIGS. 25 and 26 are diagrams for explaining the door hinge provided in the mullion portion. FIG. 25 is a view illustrating a state where the door hinge is installed, and FIG. 25 is a view illustrating a state before the door hinge is installed.

FIG. 27 is a perspective view illustrating a mullion support frame.

FIG. 28 is a cutaway perspective view for explaining the action of the mullion seating frame.

FIG. 29 is an enlarged sectional view of portion A of FIG. 28.

FIG. 30 is an enlarged sectional view of portion B in FIG. 28.

FIG. 31 is a sectional view for explaining a mullion seating frame according to another embodiment.

FIG. 32 is an enlarged view of portion D in FIG. 31.

FIG. 33 is a view illustrating simulation conditions for a reinforcing frame.

FIGS. 34 to 38 are views illustrating the results of the simulation, FIG. 34 is a view illustrating a simulation result of the conventional polyurethane-filled refrigerator is filled, FIG. 35 is a view illustrating a simulation result of a case where the reinforcing frame is not used in the refrigerator to which the vacuum adiabatic body according to the embodiment is applied, FIG. 36 is a view illustrating a simulation result of a case where only the inner reinforcing frame of the reinforcing frames is used in the refrigerator to which the vacuum adiabatic body according to the embodiment is applied, FIG. 37 is a view illustrating a simulation result of a case where only the outer reinforcing frame of the reinforcing frames is used in the refrigerator to which the vacuum adiabatic body according to the embodiment is applied, and FIG. 38 is a view illustrating a simulation result of a case where both the inner reinforcing frame and the outer reinforcing frame of the reinforcing frames are used in the refrigerator to which the vacuum adiabatic body according to the embodiment are applied.

FIG. 39 is a view illustrating a simulation result when the thickness of the reinforcing frame is 1.25 mm.

FIG. 40 is a view illustrating a simulation result when the thickness of the reinforcing frame is 1.2 mm.

FIG. 41 is a view illustrating each member of the reinforcing frame.

FIG. 42 is a view illustrating a member of a reinforcing frame according to one embodiment.

FIG. 43 is a view illustrating a member of a reinforcing frame according to another embodiment.

FIGS. 44 and 45 are views illustrating a member of a reinforcing frame according to yet another embodiment.

FIGS. 46 and 47 are views illustrating a member of a reinforcing frame according to

BEST MODE FOR CARRYING OUT THE INVENTION

Hereinafter, specific embodiments of the present invention are proposed with reference to the drawings. However, there is no intention to limit the idea of the invention to the embodiments described below, a person skilled in the art which understands the idea of the present invention can easily propose other embodiments included within the scope of the same idea by adding, changing, deleting, and the like, constituent elements, but it will be understood that other embodiments are also included within the scope of the present invention.

Hereinafter, the drawings presented for the explanation of the embodiments may differ from the actual products, be exaggerated, simple, or detailed parts may be simply displayed, however, this is to facilitate the understanding of the technical idea of the present invention, and should not be construed as being limited to sizes, structures, and shapes illustrated in the drawings. However, the actual shape may be illustrated as much as possible.

In the following embodiments, unless the embodiments do not collide with each other, the description of any one embodiment may be applied to the description of another embodiment, and some configurations of any one embodiment may be applied to another configuration in a state where only a specific part thereof is modified.

In the following description, the term 'vacuum pressure' means a certain pressure state lower than atmospheric pressure. In addition, the expression that a vacuum degree of A is higher than that of B means that a vacuum pressure of A is lower than that of B.

In the following description of the embodiment, the meaning of being preferentially installed may mean that the member which is not preferentially installed is included in the scope of an embodiment of the present invention even when the member is not provided.

FIG. 1 is a perspective view of a refrigerator according to an embodiment.

Referring to FIG. 1, the refrigerator 1 includes a main body 2 provided with a cavity 9 capable of storing storage goods and a door 3 provided to open/close the main body 2. The door 3 may be rotatably or movably disposed to open/close the cavity 9. The cavity 9 may provide at least one of a refrigerating chamber and a freezing chamber.

Parts constituting a freezing cycle in which cold air is supplied into the cavity 9. Specifically, the parts include a compressor 4 for compressing a refrigerant, a condenser 5 for condensing the compressed refrigerant, an expander 6 for expanding the condensed refrigerant, and an evaporator 7 for evaporating the expanded refrigerant to take heat. As a typical structure, a fan may be installed at a position adjacent to the evaporator 7, and a fluid blown from the fan may pass through the evaporator 7 and then be blown into the cavity 9. A freezing load is controlled by adjusting the blowing amount and blowing direction by the fan, adjusting the amount of a circulated refrigerant, or adjusting the compression rate of the compressor, so that it is possible to control a refrigerating space or a freezing space.

FIG. 2 is a view schematically showing a vacuum adiabatic body used in the main body and the door of the refrigerator. In FIG. 2, a main body-side vacuum adiabatic body is illustrated in a state in which top and side walls are removed, and a door-side vacuum adiabatic body is illustrated in a state in which a portion of a front wall is removed. In addition, sections of portions at conductive resistance sheets are provided are schematically illustrated for convenience of understanding.

Referring to FIG. 2, the vacuum adiabatic body includes a first plate member 10 for providing a wall of a low-temperature space, a second plate member 20 for providing a wall of a high-temperature space, a vacuum space part 50 defined as a gap part between the first and second plate members 10 and 20. Also, the vacuum adiabatic body includes the conductive resistance sheets 60 and 63 for preventing heat conduction between the first and second plate members 10 and 20. A sealing part 61 for sealing the first and second plate members 10 and 20 is provided such that the vacuum space part 50 is in a sealing state. When the vacuum adiabatic body is applied to a refrigerating or heating cabinet, the first plate member 10 may be referred to as an inner case, and the second plate member 20 may be referred to as an outer case. A machine chamber 8 in which parts providing a freezing cycle are accommodated is placed at a lower rear side of the main body-side vacuum adiabatic body, and an exhaust port 40 for forming a vacuum state by exhausting air in the vacuum space part 50 is provided at any one side of the vacuum adiabatic body. In addition, a pipeline 64 passing through the vacuum space part 50 may be further installed so as to install a defrosting water line and electric lines.

The first plate member 10 may define at least one portion of a wall for a first space provided thereto. The second plate member 20 may define at least one portion of a wall for a second space provided thereto. The first space and the second space may be defined as spaces having different temperatures. Here, the wall for each space may serve as not only a wall directly contacting the space but also a wall not contacting the space. For example, the vacuum adiabatic body of the embodiment may also be applied to a product further having a separate wall contacting each space.

Factors of heat transfer, which cause loss of the adiabatic effect of the vacuum adiabatic body, are heat conduction between the first and second plate members 10 and 20, heat radiation between the first and second plate members 10 and 20, and gas conduction of the vacuum space part 50.

Hereinafter, a heat resistance unit provided to reduce adiabatic loss related to the factors of the heat transfer will be provided. Meanwhile, the vacuum adiabatic body and the refrigerator of the embodiment do not exclude that another adiabatic means is further provided to at least one side of the vacuum adiabatic body. Therefore, an adiabatic means using foaming or the like may be further provided to another side of the vacuum adiabatic body.

FIG. 3 is a view showing various embodiments of an internal configuration of the vacuum space part.

First, referring to FIG. 3 (part a), the vacuum space part 50 is provided in a third space having a different pressure from the first and second spaces, preferably, a vacuum state, thereby reducing adiabatic loss. The third space may be provided at a temperature between the temperature of the first space and the temperature of the second space. Since the third space is provided as a space in the vacuum state, the first and second plate members 10 and 20 receive a force contracting in a direction in which they approach each other due to a force corresponding to a pressure difference between the first and second spaces. Therefore, the vacuum space part 50 may be deformed in a direction in which it is reduced. In this case, adiabatic loss may be caused due to an increase in amount of heat radiation, caused by the contraction of the vacuum space part 50, and an increase in amount of heat conduction, caused by contact between the plate members 10 and 20.

A supporting unit 30 may be provided to reduce the deformation of the vacuum space part 50. The supporting unit 30 includes bars 31. The bars 31 may extend in a direction substantially vertical to the first and second plate members 10 and 20 so as to support a distance between the first and second plate members 10 and 20. A support plate 35 may be additionally provided to at least one end of the bar 31. The support plate 35 connects at least two bars 31 to each other, and may extend in a direction horizontal to the first and second plate members 10 and 20. The support plate 35 may be provided in a plate shape, or may be provided in a lattice shape such that its area contacting the first or second plate member 10 or 20 is decreased, thereby reducing heat transfer. The bars 31 and the support plate 35 are fixed to each other at least one portion, to be inserted together between the first and second plate members 10 and 20. The support plate 35 contacts at least one of the first and second plate members 10 and 20, thereby preventing deformation of the first and second plate members 10 and 20. In addition, based on the extending direction of the bars 31, a total sectional area of the support plate 35 is provided to be greater than that of the bars 31, so that heat transferred through the bars 31 can be diffused through the support plate 35.

A material of the supporting unit 30 may include a resin selected from the group consisting of PC, glass fiber PC, low outgassing PC, PPS, and LCP so as to obtain high compressive strength, low outgassing and water absorptance, low thermal conductivity, high compressive strength at high temperature, and excellent machinability.

A radiation resistance sheet 32 for reducing heat radiation between the first and second plate members 10 and 20 through the vacuum space part 50 will be described. The first and second plate members 10 and 20 may be made of a stainless material capable of preventing corrosion and providing a sufficient strength. The stainless material has a relatively high emissivity of 0.16, and hence a large amount of radiation heat may be transferred. In addition, the supporting unit 30 made of the resin has a lower emissivity than the plate members, and is not entirely provided to inner surfaces of the first and second plate members 10 and 20. Hence, the supporting unit 30 does not have great influence on radiation heat. Therefore, the radiation resistance sheet 32 may be provided in a plate shape over a majority of the area of the vacuum space part 50 so as to concentrate on reduction of radiation heat transferred between the first and second plate members 10 and 20. A product having a low emissivity may be preferably used as the material of the radiation resistance sheet 32. In an embodiment, an aluminum foil having an emissivity of 0.02 may be used as the radiation resistance sheet 32. Since the transfer of radiation heat cannot be sufficiently blocked using one radiation resistance sheet, at least two radiation resistance sheets 32 may be provided at a certain distance so as not to contact each other. In addition, at least one radiation resistance sheet may be provided in a state in which it contacts the inner surface of the first or second plate member 10 or 20.

Referring to FIG. 3 (part b), the distance between the plate members is maintained by the supporting unit 30, and a porous substance 33 may be filled in the vacuum space part 50. The porous substance 33 may have a higher emissivity than the stainless material of the first and second plate members 10 and 20. However, since the porous substance 33 is filled in the vacuum space part 50, the porous substance 33 has a high efficiency for resisting the radiation heat transfer.

In this embodiment, the vacuum adiabatic body can be fabricated without using the radiation resistance sheet 32.

Referring to FIG. 3 (part c), the supporting unit 30 maintaining the vacuum space part 50 is not provided. Instead of the supporting unit 30, the porous substance 33 is provided in a state in which it is surrounded by a film 34. In this case, the porous substance 33 may be provided in a state in which it is compressed so as to maintain the gap of the vacuum space part 50. The film 34 is made of, for example, a PE material, and may be provided in a state in which holes are formed therein.

In this embodiment, the vacuum adiabatic body can be fabricated without using the supporting unit 30. In other words, the porous substance 33 can simultaneously serve as the radiation resistance sheet 32 and the supporting unit 30.

A case where the porous substance 33 is filled in the vacuum space part 50 will be described in detail later.

FIG. 4 is a view showing various embodiments of the conductive resistance sheets and peripheral portions thereof. Structures of the conductive resistance sheets are briefly illustrated in FIG. 2, but will be understood in detail with reference to FIG. 4.

First, a conductive resistance sheet proposed in FIG. 4 (part a) may be preferably applied to the main body-side vacuum adiabatic body. Specifically, the first and second plate members 10 and 20 are to be sealed so as to vacuum the interior of the vacuum adiabatic body. In this case, since the two plate members have different temperatures from each other, heat transfer may occur between the two plate members. A conductive resistance sheet 60 is provided to prevent heat conduction between two different kinds of plate members.

The conductive resistance sheet 60 may be provided with sealing parts 61 at which both ends of the conductive resistance sheet 60 are sealed to define at least one portion of the wall for the third space and maintain the vacuum state. The conductive resistance sheet 60 may be provided as a thin foil in unit of micrometer so as to reduce the amount of heat conducted along the wall for the third space. The sealing parts may be provided as welding parts. That is, the conductive resistance sheet 60 and the plate members 10 and 20 may be fused to each other. In order to cause a fusing action between the conductive resistance sheet 60 and the plate members 10 and 20, the conductive resistance sheet 60 and the plate members 10 and 20 may be made of the same material, and a stainless material may be used as the material. The sealing parts 61 are not limited to the welding parts, and may be provided through a process such as cocking. The conductive resistance sheet 60 may be provided in a curved shape. Thus, a heat conduction distance of the conductive resistance sheet 60 is provided longer than the linear distance of each plate member, so that the amount of heat conduction can be further reduced.

A change in temperature occurs along the conductive resistance sheet 60. Therefore, in order to block heat transfer to the exterior of the conductive resistance sheet 60, a shielding part 62 may be provided at the exterior of the conductive resistance sheet 60 such that an adiabatic action occurs. In other words, in the refrigerator, the second plate member 20 has a high temperature and the first plate member 10 has a low temperature. In addition, heat conduction from high temperature to low temperature occurs in the conductive resistance sheet 60, and hence the temperature of the conductive resistance sheet 60 is suddenly changed. Therefore, when the conductive resistance sheet 60 is opened to the exterior thereof, heat transfer through the opened place may seriously occur. So as to reduce heat loss, the shielding part 62 is provided at the exterior of the conductive resistance sheet 60. For example, when the conductive resistance sheet 60 is exposed to any one of the low-temperature space and the high-temperature space, the conductive resistance sheet 60 does not serve as a conductive resistor as well as the exposed portion thereof, which is not preferable.

The shielding part 62 may be provided as a porous substance contacting an outer surface of the conductive resistance sheet 60. The shielding part 62 may be provided as an adiabatic structure, e.g., a separate gasket, which is placed at the exterior of the conductive resistance sheet 60. The shielding part 62 may be provided as a portion of the vacuum adiabatic body, which is provided at a position facing a corresponding conductive resistance sheet 60 when the main body-side vacuum adiabatic body is closed with respect to the door-side vacuum adiabatic body. In order to reduce heat loss even when the main body and the door are opened, the shielding part 62 may be preferably provided as a porous substance or a separate adiabatic structure.

The gasket may be provided between the door and the main body so as to perform a sealing action on the contact portion between the shielding part and the conductive resistance sheet. The gasket may be provided on the door or the main body.

A conductive resistance sheet proposed in FIG. 4 (part b) may be preferably applied to the door-side vacuum adiabatic body. In FIG. 4*b*, portions different from those of FIG. 4 (part a) are described in detail, and the same description is applied to portions identical to those of FIG. 4 (part a). A side frame 70 is further provided at an outside of the conductive resistance sheet 60. A part for sealing between the door and the main body, an exhaust port necessary for an exhaust process, a getter port for vacuum maintenance, and the like may be placed on the side frame 70. This is because the mounting of parts is convenient in the main body-side vacuum adiabatic body, but the mounting positions of parts are limited in the door-side vacuum adiabatic body.

In the door-side vacuum adiabatic body, it is difficult to place the conductive resistance sheet 60 at a front end part of the vacuum space part, i.e., a corner side part of the vacuum space part. This is because, unlike the main body, a corner edge portion of the door is exposed to the exterior. More specifically, if the conductive resistance sheet 60 is placed at the front end part of the vacuum space part, the corner edge portion of the door is exposed to the exterior, and hence there is a disadvantage in that a separate adiabatic part should be configured so as to heat-insulate the conductive resistance sheet 60.

A conductive resistance sheet proposed in FIG. 4 (part c) may be preferably installed in the pipeline passing through the vacuum space part. In FIG. 4 (part c), portions different from those of FIGS. 4 (part a) and 4 (part b) are described in detail, and the same description is applied to portions identical to those of FIGS. 4 (part a) and 4 (part b). A conductive resistance sheet having the same shape as that of FIG. 4 (part a), preferably, a wrinkled conductive resistance sheet 63 may be provided at a peripheral portion of the pipeline 64. Accordingly, a heat transfer path can be lengthened, and deformation caused by a pressure difference can be prevented. In addition, a separate shielding part may be provided to improve the adiabatic performance of the conductive resistance sheet.

A heat transfer path between the first and second plate members 10 and 20 will be described with reference back to FIG. 4 (part a). Heat passing through the vacuum adiabatic body may be divided into surface conduction heat ①conducted along a surface of the vacuum adiabatic body, more specifically, the conductive resistance sheet 60, supporter conduction heat ② conducted along the supporting unit 30 provided inside the vacuum adiabatic body, gas conduction heat ③ conducted through an internal gas in the vacuum space part, and radiation transfer heat ④ transferred through the vacuum space part.

The transfer heat may be changed depending on various design dimensions. For example, the supporting unit may be changed such that the first and second plate members 10 and 20 can endure a vacuum pressure without being deformed, the vacuum pressure may be changed, the distance between the plate members may be changed, and the length of the conductive resistance sheet may be changed. The transfer heat may be changed depending on a difference in temperature between the spaces (the first and second spaces) respectively provided by the plate members. In the embodiment, a preferred configuration of the vacuum adiabatic body has been found by considering that its total heat transfer amount is smaller than that of a typical adiabatic structure formed by foaming polyurethane. In a typical refrigerator including the adiabatic structure formed by foaming the polyurethane, an effective heat transfer coefficient may be proposed as 19.6 mW/mK.

By performing a relative analysis on heat transfer amounts of the vacuum adiabatic body of the embodiment, a heat transfer amount by the gas conduction heat ③ can become smallest. For example, the heat transfer amount by the gas conduction heat ③ may be controlled to be equal to or smaller than 4% of the total heat transfer amount. A heat transfer amount by solid conduction heat defined as a sum of the surface conduction heat ① and the supporter conduction heat ② is largest. For example, the heat transfer amount by the solid conduction heat may reach 75% of the total heat transfer amount. A heat transfer amount by the radiation transfer heat ④ is smaller than the heat transfer amount by the solid conduction heat but larger than the heat transfer amount of the gas conduction heat ③. For example, the heat transfer amount by the radiation transfer heat ④ may occupy about 20% of the total heat transfer amount.

According to such a heat transfer distribution, effective heat transfer coefficients (eK: effective K) (W/mK) of the surface conduction heat ①, the supporter conduction heat ②, the gas conduction heat ③, and the radiation transfer heat ④ may have an order of Math FIG. 1.

$$eK_{solid\ conduction\ heat} > eK_{radiation\ transfer\ heat} > eK_{gas\ conduction\ heat} \quad [\text{Math. 1}]$$

Here, the effective heat transfer coefficient (eK) is a value that can be measured using a shape and temperature differences of a target product. The effective heat transfer coefficient (eK) is a value that can be obtained by measuring a total heat transfer amount and a temperature at least one portion at which heat is transferred. For example, a calorific value (W) is measured using a heating source that can be quantitatively measured in the refrigerator, a temperature distribution (K) of the door is measured using heats respectively transferred through a main body and an edge of the door of the refrigerator, and a path through which heat is transferred is calculated as a conversion value (m), thereby evaluating an effective heat transfer coefficient.

The effective heat transfer coefficient (eK) of the entire vacuum adiabatic body is a value given by k=QL/AΔT.

Here, Q denotes a calorific value (W) and may be obtained using a calorific value of a heater. A denotes a sectional area (m$^2$) of the vacuum adiabatic body, L denotes a thickness (m) of the vacuum adiabatic body, and ΔT denotes a temperature difference.

For the surface conduction heat, a conductive calorific value may be obtained through a temperature difference (ΔT) between an entrance and an exit of the conductive resistance sheet 60 or 63, a sectional area (A) of the conductive resistance sheet, a length (L) of the conductive resistance sheet, and a thermal conductivity (k) of the conductive resistance sheet (the thermal conductivity of the conductive resistance sheet is a material property of a material and can be obtained in advance). For the supporter conduction heat, a conductive calorific value may be obtained through a temperature difference (ΔT) between an entrance and an exit of the supporting unit 30, a sectional area (A) of the supporting unit, a length (L) of the supporting unit, and a thermal conductivity (k) of the supporting unit. Here, the thermal conductivity of the supporting unit is a material property of a material and can be obtained in advance. The sum of the gas conduction heat ③, and the radiation transfer heat ④ may be obtained by subtracting the surface conduction heat and the supporter conduction heat from the heat transfer amount of the entire vacuum adiabatic body. A ratio of the gas conduction heat ③, and the radiation transfer heat ④ may be obtained by evaluating radiation transfer heat when no gas conduction heat exists by remarkably lowering a vacuum degree of the vacuum space part 50.

When a porous substance is provided inside the vacuum space part 50, porous substance conduction heat ⑤ may be a sum of the supporter conduction heat ② and the radiation transfer heat ①. The porous substance conduction heat ⑤ may be changed depending on various variables including a kind, an amount, and the like of the porous substance.

According to an embodiment, a temperature difference $\Delta T_1$ between a geometric center formed by adjacent bars 31 and a point at which each of the bars 31 is positioned may be preferably provided to be less than 0.5° C. Also, a temperature difference $\Delta T_2$ between the geometric center formed by the adjacent bars 31 and an edge portion of the vacuum adiabatic body may be preferably provided to be less than 0.5° C. In the second plate member 20, a temperature difference between an average temperature of the second plate and a temperature at a point at which a heat transfer path passing through the conductive resistance sheet 60 or 63 meets the second plate may be largest. For example, when the second space is a region hotter than the first space, the temperature at the point at which the heat transfer path passing through the conductive resistance sheet meets the second plate member becomes lowest. Similarly, when the second space is a region colder than the first space, the temperature at the point at which the heat transfer path passing through the conductive resistance sheet meets the second plate member becomes highest.

This means that the amount of heat transferred through other points except the surface conduction heat passing through the conductive resistance sheet should be controlled, and the entire heat transfer amount satisfying the vacuum adiabatic body can be achieved only when the surface conduction heat occupies the largest heat transfer amount. To this end, a temperature variation of the conductive resistance sheet may be controlled to be larger than that of the plate member.

Physical characteristics of the parts constituting the vacuum adiabatic body will be described. In the vacuum adiabatic body, a force by vacuum pressure is applied to all of the parts. Therefore, a material having a strength (N/m$^2$) of a certain level may be preferably used.

Under such circumferences, the plate members 10 and 20 and the side frame 70 may be preferably made of a material having a sufficient strength with which they are not damaged by even vacuum pressure. For example, when the number of bars 31 is decreased so as to limit the support conduction heat, deformation of the plate member occurs due to the vacuum pressure, which may bad influence on the external appearance of refrigerator. The radiation resistance sheet 32 may be preferably made of a material that has a low emissivity and can be easily subjected to thin film processing. Also, the radiation resistance sheet 32 is to ensure a strength enough not to be deformed by an external impact. The supporting unit 30 is provided with a strength enough to support the force by the vacuum pressure and endure an external impact, and is to have machinability. The conductive resistance sheet 60 may be preferably made of a material that has a thin plate shape and can endure the vacuum pressure.

In an embodiment, the plate member, the side frame, and the conductive resistance sheet may be made of stainless materials having the same strength. The radiation resistance sheet may be made of aluminum having a weaker strength that the stainless materials. The supporting unit may be made of resin having a weaker strength than the aluminum.

Unlike the strength from the point of view of materials, analysis from the point of view of stiffness is required. The stiffness (N/m) is a property that would not be easily deformed. Although the same material is used, its stiffness may be changed depending on its shape. The conductive resistance sheets 60 or 63 may be made of a material having a strength, but the stiffness of the material is preferably low so as to increase heat resistance and minimize radiation heat as the conductive resistance sheet is uniformly spread without any roughness when the vacuum pressure is applied. The radiation resistance sheet 32 requires a stiffness of a certain level so as not to contact another part due to deformation. Particularly, an edge portion of the radiation resistance sheet may generate conduction heat due to drooping caused by the self-load of the radiation resistance sheet. Therefore, a stiffness of a certain level is required. The supporting unit 30 requires a stiffness enough to endure a compressive stress from the plate member and an external impact.

In an embodiment, the plate member and the side frame may preferably have the highest stiffness so as to prevent deformation caused by the vacuum pressure. The supporting unit, particularly, the bar may preferably have the second highest stiffness. The radiation resistance sheet may preferably have a stiffness that is lower than that of the supporting unit but higher than that of the conductive resistance sheet. The conductive resistance sheet may be preferably made of a material that is easily deformed by the vacuum pressure and has the lowest stiffness.

Even when the porous substance 33 is filled in the vacuum space part 50, the conductive resistance sheet may preferably have the lowest stiffness, and the plate member and the side frame may preferably have the highest stiffness.

Hereinafter, a vacuum pressure preferably determined depending on an internal state of the vacuum adiabatic body. As already described above, a vacuum pressure is to be maintained inside the vacuum adiabatic body so as to reduce heat transfer. At this time, it will be easily expected that the vacuum pressure is preferably maintained as low as possible so as to reduce the heat transfer.

The vacuum space part may resist the heat transfer by applying only the supporting unit 30. Alternatively, the porous substance 33 may be filled together with the supporting unit in the vacuum space part 50 to resist the heat transfer. Alternatively, the vacuum space part may resist the heat transfer not by applying the supporting unit but by applying the porous substance 33.

The case where only the supporting unit is applied will be described.

FIG. 5 illustrates graphs showing changes in adiabatic performance and changes in gas conductivity with respect to vacuum pressures by applying a simulation.

Referring to FIG. 5, it can be seen that, as the vacuum pressure is decreased, i.e., as the vacuum degree is increased, a heat load in the case of only the main body (Graph 1) or in the case where the main body and the door are joined together (Graph 2) is decreased as compared with that in the case of the typical product formed by foaming polyurethane, thereby improving the adiabatic performance. However, it can be seen that the degree of improvement of the adiabatic performance is gradually lowered. Also, it can be seen that, as the vacuum pressure is decreased, the gas conductivity (Graph 3) is decreased. However, it can be seen that, although the vacuum pressure is decreased, the ratio at which the adiabatic performance and the gas conductivity are improved is gradually lowered. Therefore, it is preferable that the vacuum pressure is decreased as low as possible. However, it takes long time to obtain excessive vacuum pressure, and much cost is consumed due to excessive use of a getter. In the embodiment, an optimal vacuum pressure is proposed from the above-described point of view.

FIG. 6 illustrates graphs obtained by observing, over time and pressure, a process of exhausting the interior of the vacuum adiabatic body when the supporting unit is used.

Referring to FIG. 6, in order to create the vacuum space part 50 to be in the vacuum state, a gas in the vacuum space part 50 is exhausted by a vacuum pump while evaporating a latent gas remaining in the parts of the vacuum space part 50 through baking. However, if the vacuum pressure reaches a certain level or more, there exists a point at which the level of the vacuum pressure is not increased any more ($\Delta t1$). After that, the getter is activated by disconnecting the vacuum space part 50 from the vacuum pump and applying heat to the vacuum space part 50 ($\Delta t2$). If the getter is activated, the pressure in the vacuum space part 50 is decreased for a certain period of time, but then normalized to maintain a vacuum pressure of a certain level. The vacuum pressure that maintains the certain level after the activation of the getter is approximately $1.8 \times 10^{-6}$ Torr.

In the embodiment, a point at which the vacuum pressure is not substantially decreased any more even though the gas is exhausted by operating the vacuum pump is set to the lowest limit of the vacuum pressure used in the vacuum adiabatic body, thereby setting the minimum internal pressure of the vacuum space part 50 to $1.8 \times 10^{-6}$ Torr.

FIG. 7 illustrates graphs obtained by comparing vacuum pressures and gas conductivities.

Referring to FIG. 7, gas conductivities with respect to vacuum pressures depending on sizes of a gap in the vacuum space part 50 are represented as graphs of effective heat transfer coefficients (eK). Effective heat transfer coefficients (eK) were measured when the gap in the vacuum space part 50 has three sizes of 2.76 mm, 6.5 mm, and 12.5 mm. When the gap in the vacuum space part 50 is defined as follows. When the radiation resistance sheet 32 exists inside vacuum space part 50, the gap is a distance between the radiation resistance sheet 32 and the plate member adjacent thereto. When the radiation resistance sheet 32 does not exist inside vacuum space part 50, the gap is a distance between the first and second plate members.

It can be seen that, since the size of the gap is small at a point corresponding to a typical effective heat transfer coefficient of 0.0196 W/mK, which is provided to an adiabatic material formed by foaming polyurethane, the vacuum pressure is $2.65 \times 10^{-1}$ Torr even when the size of the gap is 2.76 mm. Meanwhile, it can be seen that the point at which reduction in adiabatic effect caused by gas conduction heat is saturated even though the vacuum pressure is decreased is a point at which the vacuum pressure is approximately $4.5 \times 10^{-3}$ Torr. The vacuum pressure of $4.5 \times 10^{-3}$ Torr can be defined as the point at which the reduction in adiabatic effect caused by gas conduction heat is saturated. Also, when the effective heat transfer coefficient is 0.1 W/mK, the vacuum pressure is $1.2 \times 10^{-2}$ Torr.

When the vacuum space part 50 is not provided with the supporting unit but provided with the porous substance, the size of the gap ranges from a few micrometers to a few hundreds of micrometers. In this case, the amount of radiation heat transfer is small due to the porous substance even when the vacuum pressure is relatively high, i.e., when the vacuum degree is low. Therefore, an appropriate vacuum pump is used to adjust the vacuum pressure. The vacuum pressure appropriate to the corresponding vacuum pump is approximately $2.0 \times 10^{-4}$ Torr. Also, the vacuum pressure at the point at which the reduction in adiabatic effect caused by gas conduction heat is saturated is approximately $4.7 \times 10^{-2}$ Torr. Also, the pressure where the reduction in adiabatic effect caused by gas conduction heat reaches the typical effective heat transfer coefficient of 0.0196 W/mK is 730 Torr.

When the supporting unit and the porous substance are provided together in the vacuum space part, a vacuum pressure may be created and used, which is middle between the vacuum pressure when only the supporting unit is used and the vacuum pressure when only the porous substance is used. In a case where only the porous substance is used, the lowest vacuum pressure can be created and used.

As described above, since the thickness of the wall of the vacuum adiabatic body according to the embodiment is thin, there is a problem that the vacuum adiabatic body is weak against the external load. These problems can cause various deformations of various structures and cause difficulties in the application of the products.

FIG. 8 is a modeling diagram illustrating various loading conditions given to an upright vacuum adiabatic body.

Referring to FIG. 8, A is a modeling when both the upper and lower sides are free ends, B is modeling when the lower side is a fixed end and the upper side is a free end in the up and down direction, C is modeling when the lower side is a fixed end and the upper side is a free end in the left and right direction, D is the modeling when the lower side is the rotation free end and the upper side is a free end in the up and down direction, E is the modeling when the lower side is the fixed end and the upper side is the free end in the forward direction, and F is modeling when the lower side is a rotation free end and the upper side is a free end in the left and right direction.

The inventors have carried out a review of various loads to analyze the effect of various loads of FIG. 8 on the upright vacuum adiabatic body, in particular, the refrigerator.

The load may have the effect of microscopically approach of the plate members 10 and 20 of the vacuum adiabatic body, but this is the portion that can be controlled by the supporting unit. The inventor has reviewed bending, deformation, buckling, and the like, which may affect the structure of the vacuum adiabatic body macroscopically, and confirmed that the vacuum adiabatic body can be deformed as illustrated in FIGS. 9 to 11. These drawings are schematic views illustrating all a main body-side vacuum adiabatic body viewed from the front.

Referring to FIG. 9, this drawing illustrates a case where a load is generated on one flat surface of a vacuum adiabatic body. In this case, any one surface of the vacuum adiabatic body can be convexly or concavely deformed. Such a deformation may occur in a case where a relatively large vertical load is generated on any one surface.

Referring to FIG. 10, this drawing illustrates a case where an external force is generated in the horizontal direction at the upper end of the vacuum adiabatic body and in this case, the upper end part of the vacuum adiabatic body can be generally deformed in an inclined manner in one direction. Such deformation may occur when the product is moved or unidirectionally pushed.

Referring to FIG. 11, the present invention is applied to a product in which a vacuum adiabatic body has an opening, such as a refrigerator, and a case where the product is subjected to a vertical load. At this time, the peripheral portion of the open portion of the vacuum adiabatic body can be deformed concavely or convexly.

An embodiment for preventing the deformation caused by the load described above acting on the vacuum adiabatic body is illustrated below. Hereinafter, a refrigerator will be described as a main embodiment to explain about a configuration which prevents deformation of the vacuum adiabatic body, but the application of the embodiment is not limited to a refrigerator and can be applied to various products.

FIG. 12 is an exploded perspective view of a refrigerator according to an embodiment.

Referring to FIG. 12, since the plate members 10 and 20, the supporting unit 30 introduced into the gap part between the plate members, the conductive resistance sheet 60, and the door 3 are illustrated as already described, a detailed description can refer to the above description.

In addition to the supporting unit 30, a reinforcing frame 120 for reinforcing the strength of the vacuum adiabatic body can be inserted into the internal space of the plate members 10 and 20, that is, in the vacuum space part 50. In order to protect the conductive resistance sheet 60 from the outside, the sealing frame 200 may further be interposed at the interface contacting the main body 2 and the door 3 each other. The space inside the refrigerator of the first plate member 10 is separated so that the mullion 300 can be inserted to maintain the temperature according to the purpose of refrigerating and freezing.

The sealing frame may be in contact with the gasket and may be placed between the third space and the door.

The reinforcing frame 120 will be described in more detail.

The reinforcing frame 120 may be installed at a corner portion of the vacuum space part 50. In other words, it can be provided at all corners corresponding to all the boundaries where different planes from each other meet. Specifically, the reinforcing frame may include a rear frame 121 which is provided at a rear corner portion of the vacuum adiabatic body, a front frame 123 which is provided at a front corner portion of the vacuum adiabatic body, and a side frame 122 which is provided in a lateral direction connecting the front frames 123 and the rear frame 121.

The reinforcing frame 120 may be made of a thick or strong material as compared with the plate member and may be in contact with the plate member.

The front frame 123, the rear frame 121, and the side frame 122 may be fastened to each other and provide as one body to reinforce the strength of an appliance.

As illustrated in FIG. 11, in order to prevent the openings of the vacuum adiabatic body from being concavely or convexly deformed, a mullion seating frame 130 which seat the mullions 300 and a mullion front frame 140 may be further provided. The mullion seating frame 130 and the mullion front frame 140 may be provided on the inner surface of the first plate member 10, unlike the reinforcing frame 120. Thereby supporting and connecting operations of the mullion 300 can be performed.

The mullion front frame may be provided to prevent deformation of the opening portion of the vacuum adiabatic body in a case where the mullion 300 is not provided. In this case, the mullion front frame can be abbreviated as a front frame.

It will be appreciated that the mullion seating frame 130 and the mullion front frame 140 serve to place the mullion 300 at a predetermined position in the refrigerator. In addition, it is possible to reinforce the strength of a pair of adjacent frames among the four rear frames 121 and the front frame 123 extending in the up and down direction. For example, the mullion front frame 140 may support a pair of front frames 123 extending in the up and down direction to prevent deformation of the opening portion of the vacuum adiabatic body as described with reference to FIG. 11.

The mullion seating frame 130 and the mullion front frame 140 are directly separated from the reinforcing frame 120 and indirectly connected to each other by another separate member to reinforce the strength.

For the action of strength reinforcement, the reinforcing frame 120, the mullion seating frame 130, and the mullion front frame 140 are made of a material having a predetermined strength, and when being compared with the plate members 10 and 20, solid materials may be applied or thick materials may be used.

Accordingly, in addition to the rear frame 121, the front frame 123, and the side frame 122, which are provided as a portion of the reinforcing frame 120, the mullion seating frame 130 and the mullion front frame 140 can also be performed as a reinforcing frame. Accordingly, the rear frame 121 may be referred to as a first reinforcing frame, and the front frame 123 may be referred to as a second reinforcing frame. Further, the side frame 122 which connects the first reinforcing frame and the second reinforcing frame and is provided in the lateral direction may be referred to as a third reinforcing frame. In addition, The mullion seating frame 130 and the mullion front frame 140 may be referred to as a fourth reinforcing frame. In a case where the mullion seating frame 130 is not provided, the mullion front frame 140 may be referred to as a fourth reinforcing frame.

The first reinforcing frame and the second reinforcing frame can prevent the upper end of the vacuum adiabatic body from being generally deformed in an inclined manner in any direction. For this purpose, as illustrated, the first and second reinforcing frames may extend along the vertically-formed corner of the vacuum adiabatic body formed in the up and down direction and be positioned near the corner. Here, the corner can be regarded as a boundary line where different planes of the vacuum adiabatic body from each other meet.

The first and second reinforcing frames may be provided on at least one of the first plate member and the second plate member.

The second reinforcing frame can not only prevent the overall inclination of the upper part of the vacuum adiabatic material but also prevent the peripheral portion of the opened portion of the vacuum adiabatic body from being deformed concavely or convexly. To this end, the second reinforcing frame may extend along the peripheral portion of the vacuum adiabatic body and be positioned near the peripheral portion.

The fourth reinforcing frame may extend in a direction which traverses the opening so as to prevent deformation of the peripheral portion of the opened portion.

Meanwhile, the mullion 300 may be provided with a mullion cold air flow path 310 to allow cool air to pass through the two storage spaces divided by the mullion 300, as will be described in detail later.

FIG. 13 is a partial cutaway sectional view of the rear corner portion of the vacuum adiabatic body.

Referring to FIG. 13, the rear frame 121 is provided to have a bent shape according to a sectional shape of a bent corner of the second plate member 20. The rear frame 121 supports the rear surface part and the side surface part of the second plate member 20 together so that the strength of each surface can be reinforced. In addition, the rear frame 121 can reinforce strength against bending and buckling of the vacuum adiabatic body with high inertia.

The respective surfaces of the rear frame 121 may be integrally welded or mechanically fastened to respective surfaces of the corresponding second plate member 20.

Since the rear frame 121 is mounted on the inner surface of the vacuum space part 50, there is no portion exposed to the outside, so that there is no problem such as interference in the manufacturing process of the appliance.

Although the rear frame 121 is illustrated as an example in the drawing, other reinforcing frames 120 may be also provided in the same sectional shape and may extend along the corner at the same position of the vacuum adiabatic body. Other reinforcement frames can also perform the same strength reinforcement action as the rear frame 121. Optionally, the reinforcement frame 120 may be directly connected to all the frames to each other to further enhance the reliability with respect to the strength reinforcement. This can be similarly applied to the reinforcing frame 120 of another drawing.

FIG. 14 is a sectional view of a vacuum adiabatic body illustrating a rear frame according to another embodiment.

Referring to FIG. 14, the rear frame 121 is mounted on the inner surface of the first plate member 10. Other reinforcement frames 120 may be provided as well.

Specifically, in a case of the present embodiment, the rear frame 121 may be provided in a shape of a bent section in the same shape as the bent corner of the inner surface of the first plate member 10. The rear frame 121 supports both the rear surface part and the side surface part of the inner surface of the first plate member 10 so that the strength of each surface can be reinforced. In addition, the rear frame 121 can reinforce strength against bending and buckling of the vacuum adiabatic body with high inertia.

The respective surfaces of the rear frame 121 may be integrally welded or mechanically fastened to respective surfaces of the corresponding first plate member 10.

Since the rear frame 121 can be integrated with the mullion seating frame 130 and the mullion front frame 140, the stability of the overall strength reinforcing action can be enhanced.

Since the rear frame is mounted on the outer surface of the vacuum space part 50, no problem such as interference occurs when the supporting unit 30 is installed. Therefore, microscopic change of the vacuum adiabatic body can be prevented.

Although the rear frame 121 is illustrated as an example in the drawing, other reinforcing frames 120 may be provided in the same sectional shape and may extend along corners at the same position of the vacuum adiabatic body. Other reinforcement frames can perform the same strength reinforcement action as the rear frame 121.

FIG. 15 is a sectional view of a vacuum adiabatic body illustrating a rear frame according to another embodiment.

Referring to FIG. 15, the rear frame 121 is mounted on the outer surface of the first plate member 10. Other reinforcement frames 120 may be provided as well.

Specifically, in a case of the present embodiment, the rear frame 121 may be provided in a bent shape in section as the same shape as the bent corner of the outer surface of the first plate member 10. The rear frame 121 supports both the rear surface part and the side surface part of the outer surface of the first plate member 10 so that the strength of each surface can be reinforced. In addition, the rear frame 121 can reinforce strength against bending and buckling of the vacuum adiabatic body with high inertia.

The respective surfaces of the rear frame 121 may be integrally welded or mechanically fastened to respective surfaces of the outer surfaces of the corresponding first plate member 10.

Since the rear frame is mounted on the inner surface of the vacuum space part 50, there is no part exposed to the outside of the appliance, so there is no problem such as interference in the manufacturing process of the appliance.

Although the rear frame 121 is illustrated as an example in the drawing, the other reinforcing frames 120 are also provided in the same sectional shape, and the other reinforcing frames 120 and the vacuum adiabatic body can be integrated with each other by extending along the corners at the same position with respect to the vacuum adiabatic body. Other reinforcement frames can also perform the same strength reinforcement action as the rear frame 121.

FIG. 16 is a sectional view of a vacuum adiabatic body illustrating a rear frame according to another embodiment.

Referring to FIG. 16, the rear frame 121 is mounted on the outer surface of the second plate member 20. Other reinforcement frames 120 may be provided as well.

Specifically, in a case of the present embodiment, the rear frame 121 may be provided in a shape of a bent section in the same shape as the bent corner of the outer surface of the second plate member 20. The rear frame 121 supports both the rear surface part and the side surface part of the outer surface of the second plate member 20 so that the strength of each surface can be reinforced. In addition, the rear frame 121 can reinforce strength against bending and buckling of the vacuum adiabatic body with high inertia.

The respective surfaces of the rear frame 121 may be integrally welded or mechanically fastened to respective surfaces of the outer surfaces of the corresponding second plate member 20.

The rear frame is mounted on the outer surface of the vacuum space part 50 so that it can be manufactured without complication in the manufacturing process and then fastened to the outer surface of the second plate member 20 in the last step of the vacuum adiabatic body. Accordingly, the manufacturing process can be simplified.

Although the rear frame 121 is illustrated as an example in the drawing, the other reinforcing frames 120 are also provided in the same sectional shape and can be integrated with each other by extending along the corners at the same position with respect to the vacuum adiabatic body. Other reinforcement frames can perform the same strength reinforcement action as the rear frame 121.

In a case of the present embodiment, it can be integrated with the mullion seating frame 130 and the mullion front frame 140 through the outside of the vacuum adiabatic body, specifically, through the opening of the main body 2. Accordingly, there is an advantage that the stability of the overall strength reinforcing action is enhanced.

Referring to FIGS. 14 to 16, the reinforcing frame 120 may be thicker than the plate member to reinforce the strength of the vacuum adiabatic body. The reinforcing frame 120 is extended to be long in one direction along the corner of the vacuum insulation body of the reinforcing frame 120. the reinforcing frame 120 can function as a beam to resist bending with respect to the extending direction of the reinforcing frame 120.

To this end, sectional length L of the reinforcing frame 120 is provided to be longer than the thickness W of the vacuum space part in order to obtain a sufficient moment of inertia when observing the section of the reinforcing frame. In other words, in the section of the reinforcing frame 120 illustrated in FIGS. 14 to 16, the sectional length L of the reinforcing frame 120 extending in any one direction is larger than the thickness W of the vacuum space part. Accordingly, it is possible to obtain a sufficient moment of inertia against the sufficient bending.

In addition, the sectional length of the reinforcing frame 120 may be smaller than the length of the reinforcing frame 120 in the extending direction. In other words, the sectional length of the reinforcing frame can be provided smaller than the entire length of the reinforcing frame 120 extending along the corner of the vacuum adiabatic body in FIGS. 14 to 16.

FIG. 17 is a view illustrating a heat exchange pipeline in a vacuum adiabatic body to which a reinforcing frame is installed.

Referring to FIG. 17, in the refrigeration system, the refrigerant pipelines before and after the evaporator perform heat-exchange with each other in order to improve the thermal efficiency of the refrigeration cycle. The pipeline through which the refrigerant performs heat-exchange may be called a heat exchange pipeline 170. Since the heat exchange pipeline 170 occupies a space that is not necessary in a case of being installed in the inside or outside of the refrigerator, the heat exchange pipeline 170 can be provided with a predetermined length in the inside of the vacuum adiabatic body, that is, in the inside of the vacuum space part 50.

Among the reinforcing frame 120, the rear frame 121 is provided in the path of the heat exchange pipeline 170 which is drawn in and out the machine chamber 8. Therefore, the heat exchange pipeline 170 must pass through the rear frame 121 while exiting the vacuum space part 50. The rear frame 121 is provided not only with a predetermined thickness but also with a predetermined area and length in order to reinforce the strength. Therefore, when the heat exchange pipeline 170 is in direct contact with the rear frame 121, heat exchange occurs between the heat exchange pipeline 170 and the rear frame 121 to generate heat loss.

In order to solve the above problem, in the embodiment, a part of the rear frame 121 may be removed from the portion where the heat exchange pipeline 70 passes. The portion of the rear frame 121 to be removed may be completely cut on the planar structure and the thickness of the rear frame 121 may be thinner than the other portions to be cut, and thus a part thereof may remove on the vertical structure. In both cases, the amount of heat transfer between the heat exchange pipeline 170 and the rear frame 121 is reduced, thereby reducing the heat loss.

FIG. 18 is an enlarged view of portion A in FIG. 17 in which a rear frame is cut.

Referring to FIG. 18, it can check that the horizontal portion of the rear frame 121 is cut to form a rear frame cutout part 1211. Since the heat exchange pipeline 70 passes without contacting the rear frame 121, heat loss does not occur. It is also fully contemplated that a frame cutout part may be provided on another reinforcement frame 120 when the heat exchange pipeline 170 passes through another reinforcement frame 120.

The area provided with the rear frame cutout part 1211 may be applied a sealing scheme that is variously illustrated in FIG. 4 for sealing, and sealing may be performed by welding between the heat exchange pipeline 170 and the plate member.

It is also easily understood that a frame cutout part may be further provided on the reinforcement frame 120 placed on the path through which various pipelines causing heat loss are passed in addition to the heat exchange pipeline 170.

FIG. 19 is a sectional perspective view of the vacuum adiabatic body illustrating the reinforcing frame according to another embodiment, illustrating a front surface part of the vacuum adiabatic body.

Referring to FIG. 19, in the present embodiment, the vacuum space part 50 is provided with two spaced reinforcing frames, one of which is provided in a bent shape, and the other of which is provided in a straight shape in section. Accordingly configuration, it is possible to increase the strength of the vacuum adiabatic body and to prevent the interference between the two reinforcing members, thereby making it possible to obtain an advantage that the operation is simple at the time of manufacture.

A second front inner frame 1232 having a flat section may be provided on the outer surface of the first plate member 10 and a first front inner frame 1231 having a bent section may be provided on the inner surface of the second plate member 20. The position where the first front inner frame 1231 is bent is positioned inside the end part of the second plate member 20. Accordingly, when the conductive resistance sheet 60 is deformed into a curved surface by the vacuum pressure, the contact is prevented to prevent the loss of the cold air.

It is preferable that the second front inner frame 1232 and the first front inner frame 1231 are not allowed to contact and approach each other. Accordingly, the heat conduction and the thermal radiation between the reinforcing frames can be blocked, thereby preventing the loss of the cold air.

The reinforcing frame according to the present embodiment may be provided in the same form in the rear surface part and the side surface part of the vacuum adiabatic body as well as in the front surface part as illustrated and may be provided in connection with each other. In this case, it is important that the reinforcing frame fastened to each of the first and second plate members is prevented from coming into contact with and approaching the reinforcing frame of the other plate member, thereby preventing the loss of the cold air.

The first front inner frame 1231 or the second front inner frame 1232 may be provided alone. The first front inner frame 1231 is a bent type, and so as to reduce the conduction heat between the plate members, the length of the first front inner frame 1231 in the vertical direction extending to the plate member in the vertical direction may be provided to be smaller than the height of the third space.

FIG. 20 is a sectional perspective view of a vacuum adiabatic body illustrating a reinforcing frame according to another embodiment, illustrating a front surface part of the vacuum adiabatic body.

Referring to FIG. 20, in the present embodiment, one reinforcing frame is provided inside the vacuum space part 50, and one reinforcing frame is provided outside the vacuum space part 50. At this time, also one of the reinforcing frames may be provided in a bent shape, and the other may be provided in a straight shape in section. Accordingly configuration, it is possible to more reliably prevent the interference between the two reinforcing members, while enhancing the strength of the vacuum adiabatic body, thereby achieving an advantage that the work is easy at the time of manufacture.

A front bent frame 1234 having a bent shape in section is provided on the inner surface of the first plate member 10 and a front straight frame 1233 has a straight shape in section and is provided on the inner surface of the second plate member 20. The bent position of the front bent frame 1234 is positioned outside the end part of the second plate member 20. Accordingly, the inertia against the bending strength applied to the side of the main body of the refrigerator can be further increased. Since the front bent frame 1234 is placed outside the vacuum space part even when the conductive resistance sheet 60 is deformed to a curved surface, there is no possibility that the conductive resistance sheet 60 comes into contact with the front bent frame 1234.

The reinforcing frame according to the present embodiment may be provided in the same form in the rear surface part and the side surface part of the vacuum adiabatic body as well as in the front surface part as illustrated and may be provided in connection with each other. In this case, since the reinforcing frame fastened to each of the first and second plate members is not initially in contact with the reinforcing frame of the other plate member, heat loss due to contact and approach between the reinforcing frames does not occur.

FIG. 21 is a sectional view illustrating a vacuum adiabatic body illustrating a reinforcing frame according to another embodiment and illustrating a front surface part of a vacuum adiabatic body.

Referring to FIG. 21, in the present embodiment, one reinforcing frame is provided in the vacuum space part 50, and one reinforcing frame is provided inside the refrigerator of the outside of the vacuum space part 50. At this time, one reinforcing frame may be provided in a bent shape in section, and the other reinforcing frame may be provided in a straight shape in section. Accordingly configuration, it is possible to increase the strength of the vacuum adiabatic body and to prevent the interference between the two reinforcing members, thereby making it possible to obtain an advantage that the operation is simple at the time of manufacture.

A front straight frame 1233 having a flat section can be provided on the outer surface of the first plate member 10 and a front bent frame 1234 having a bent section can be provided on the inner surface of the first plate member 10. As in the embodiment illustrated in FIG. 20, the bent position of the front bent frame 1234 is positioned outside the end part of the first plate member 10. The action and effect Accordingly are same.

The reinforcing frame according to the present embodiment may be provided in the same form in the rear surface part and the side surface part of the vacuum adiabatic body as well as in the front surface part as illustrated and may be provided in connection with each other.

In a case of the present embodiment, only the first plate member 10 is provided with a reinforcing frame, and the second plate member 20 may not be provided with a reinforcing plate. Even in this case, the overall structural strength of the vacuum adiabatic body can be supported by the supporting action by the supporting unit 30.

In a case of the present embodiment, since the parts necessary for the operation of the appliance such as the refrigerator to which the vacuum adiabatic body is applied can be supported by the front bent frame 1234, the reinforcing frame has two functions of strength reinforcement and part support can be performed together.

FIG. 22 is a sectional view illustrating a vacuum adiabatic body illustrating a reinforcing frame according to another embodiment and illustrating a front surface part of the vacuum adiabatic body.

Referring to FIG. 21, the present embodiment is characterized in that the front straight frame 1233 is installed on the outer surface of the second plate member 1233, not on the inner surface thereof. The present embodiment can be preferably applied to a case where the curvature deformation of the conductive resistance sheet 60 due to the application of the vacuum pressure is large, a case where the supporting unit 30 needs to extend to the end part of the vacuum adiabatic body or a case where the interference by the reinforcing frame is avoided.

The front straight frame 1233 of the present embodiment can be proposed as a straight type without interference even if the front straight frame is placed on the outer surface of the second plate member 20. There is an advantage that the strength can be directly reinforced at the portion where the greatest bending load is generated, that is, at the outermost peripheral portion of the main body-side vacuum adiabatic body opening. Therefore, the force to resist the deformation of the opening of the refrigerator as described in FIG. 11 can be increased.

FIG. 23 and FIG. 24 are perspective views illustrating any one vertex portion of the vacuum adiabatic body, FIG. 23 is a view before the door hinge is installed, and FIG. 24 is a view illustrating a state where the door hinge is installed.

In a case of a refrigerator, a door hinge is provided at the connection portion so that the door-side vacuum adiabatic body can be fastened to the main body-side vacuum adiabatic body in a rotatable state. The door hinge has a predetermined strength by itself. The door hinge is preferably supported by the reinforcing frame 120 to prevent the door from being sagged by the door's own weight in a state where the door is fastened and to prevent the main body from being twisted. A plate member 20 may be interposed a boundary between the door hinge and the reinforcing frame 120.

Referring to FIG. 23, so as to fasten the door hinge 263, a door fastener 260 is provided on the main body-side vacuum adiabatic body. Three door fasteners 260 may be provided. The door fastener 260 can be directly or indirectly fixed to the second plate member 20, the reinforcing member 120, and/or a separate additional reinforcing member (for example, additional plate which is further provided to outer surface of second plate member). Here, direct fixing may be referred to as one by a fusion method such as welding, and indirect fixing may be referred to as a fastening method using an auxiliary fastening tool or the like instead of the method such as fusion or the like.

Since the door fastener 260 is required to have a high supporting strength, the door fastener 260 can be in contact with and fastened to the second plate member 20. To this end, the sealing frame 200 may be cut. The sealing frame 200 to be cut may have a cut surface 261 and the second plate member 20 may have a door fastener seating surface 262 to which the door fastener 260 is fastened. Accordingly, the door fastener seating surface 262 can be exposed to the outside by the cut of the sealing frame 200, and an additional plate member can be further interposed in the door fastening part seating surface 262.

The end part of the sealing frame 200 may not be entirely removed, but a portion of the sealing frame 200 may be removed only at a portion where the door fastener 260 is provided. However, it is more preferable to remove all the end parts of the sealing frame 200 in order to facilitate the manufacturing and to firmly support and fasten the door hinge 263 to the side of the vacuum adiabatic body.

Meanwhile, as described above, the reinforcing frame 120 is in surface contact with each of the two surfaces forming the corners of the refrigerator body to reinforce the strength. The reinforcing frame 120 may be in contact with at least one side of the first plate member 10 and the second plate member 10 on which the sealing frame 200 is seated. Accordingly, the door hinge 263 can be supported by the reinforcing frame 120.

FIG. 25 and FIG. 26 are diagrams for explaining the door hinge provided in the mullion portion. FIG. 25 illustrates a state where the door hinge is installed and FIG. 26 illustrates the state before the door hinge is installed.

In recent years, an upper-refrigerating and lower-freezing type of refrigerator have been spotlighted. In the upper-refrigerating and lower-freezing type of refrigerator, the door hinge is installed not only on the upper and lower ends of the vacuum adiabatic body but also on the mullion portions.

Referring to FIGS. 25 and 26, in order to fasten the door hinge to the mullion portion, there is provided a seating recess 1400 in which the mullion front frame 140 is provided with a predetermined depth cut off, The hinge fastening groove 1401 can be machined in the seating recess. The sealing frame 200 may be provided with a seating cutout part 264.

A door hinge 263 may be seated on the seating recess 1400 and the seating cutout part 264. With this structure, the door hinge 263 can be placed in the correct position. In a state where the door hinge 263 is seated, a fastener such as a screw is fitted into the hinge fastening groove 1401 so that the door hinge 263 can be fastened. At this time, the fastener may extend to the reinforcing frame to strengthen the fastening force. Of course, a welding method or the like may be applied instead of the fastening method using the fastener.

FIG. 27 is a perspective view of the mullion support frame.

Referring to FIG. 27, a mullion seating frame 130 may be provided along the peripheral portion on which the mullion 300 is placed so that the mullion 300 can be positioned in the correct position of the interior of the vacuum adiabatic body. At least a portion of a section of the mullion seating frame 130 is provided in a bent shape so that the mullion 300 placed in a predetermined position can be prevented from moving. The section of all the portions of the mullion seating frame 130 is provided in a bent shape so that the inertia becomes larger and can withstand a greater bending stress and buckling stress.

The mullion seating frame 130 may be fastened to the inner surface of the first plate member 10 by a welding method or the like and, in some cases, may be also fastened to the reinforcing frame 120 to strengthen the fastening force thereof.

In the drawings, the mullion seating frames 130 are provided on all the four corner portions of the inner surface of the vacuum adiabatic body, but it is preferable that the mullion seating frames are all provided for strength reinforcement although any one of the mullion seating frames may not be provided.

The mullion seating frame 130 can prevent the deformation of the opening side of the vacuum adiabatic body as illustrated in FIG. 11, in particular, the deformation in the extending direction. In addition to the mullion seating frame 130, the mullion front frame 140 can prevent deformation of the opening side of the vacuum adiabatic body, particularly deformation in the reduced direction. Of course, in a case where the mullion front frame 140 is fastened to the mullion seating frame 130, both expansion and contraction as deformation of the opening side of the vacuum adiabatic body may correspond.

Meanwhile, the auxiliary frame 1301 may be further installed along the peripheral portion of the opening side of the vacuum adiabatic body. The auxiliary frame 1301 may be installed on the inner surface side of the first plate member 10 so as to be integral with the mullion seating frame 130. In a case of FIGS. 14, 20, 21, and 22 in which the reinforcing frame 120 is provided on the inner surface side of the first plate member 10, each corresponding frame serves as the auxiliary frame 1301 and a separate auxiliary frame 1301 may not be needed.

The auxiliary frame 1301 has an advantage that the auxiliary frame can more firmly resist deformation of the opening side of the vacuum adiabatic body. In particular, the auxiliary frame 1301 may be provided on the mullion seating frame 130 and the mullion front frame 140 to increase the strength of each member.

FIG. 28 is a cutout perspective view for explaining the action of the mullion seating frame, FIG. 29 is an enlarged sectional view of portion A of FIG. 28, and FIG. 30 is an enlarged sectional view of portion B of FIG. 28.

Referring to FIGS. 28 to 30, the mullion seating frame 130 may be provided in a bent sectional shape.

Portions of the mullion seating frame 130 that are in contact with the first plate member 10 are fastened in a welding method or the like and the other portions thereof can serve as a portion supporting the mullion 300.

Portions of the mullion seating frame 130 that are not in contact with the first plate member 10, that is, the mullion seating frame 130 which is placed on the opened portion of the vacuum adiabatic body, can act as elements which supports not only the lower surface of the mullion and but also restricts forward extraction of the mullion.

The operator can complete the assembly of the mullion 300 only by simply placing the mullion 300 in alignment with the mullion seating frame 130 at the production site.

The mullion front frame 140 is not illustrated in the drawing, but may be separately provided, and the mullion seating frame 130 and mullion front frame 140 may be fastened to each other.

The mullion 300 may serve as the reinforcing frame. In this case, a separate frame can be provided on the outer portion of the mullion in the mullion. In particular, in a case where the main body is long in the longitudinal direction, the action of the reinforcing frame due to the mullion can be more significantly exposed.

FIG. 31 is a sectional view illustrating a mullion seating frame according to another embodiment.

Referring to FIG. 31, the present embodiment discloses a mullion seating frame 130 that is capable of blocking heat transfer between a refrigerating chamber and a freezing chamber that are divided in the upper-refrigerating and lower-freezing refrigerator by the mullion.

The rear mullion seating frame 1310 placed on the rear surface of the mullion seating frames differs from the embodiment illustrated in FIG. 28 in the bent position. Specifically, a support surface 1311 is provided which is bent in the inside direction of the refrigerator at the upper end of the fixing surface 1312 fixed to the inner surface of the first plate member 10. Therefore, it is possible to prevent the cool air in the freezing chamber from being conducted to the gap where the mullion 300 is installed through the rear mullion seating frame 1310. This can also be applied to other mullion seating frame 130 as well.

The mullion 300 has an adiabatic member 3001 such as polyurethane provided therein and an outer portion surrounding the adiabatic member 3001 may be provided as a case member 3002 provided with ABS resin as an example. The case member 3002 is divided into upper and lower portions so that the upper and lower portions of the case member 3002 can be fastened to each other in a state where the adiabatic member 3001 is inserted. A mullion cold air flow path 310 may be provided so that the cold air can selectively flow the freezing chamber and the freezing chamber through the mullion 300 alternately. As can be seen, the mullions 300 are fitted to one another in a product separate from the first plate member 10. Therefore, a sealing member 3004 for sealing the contact part between the mullion 300 and the inner surface of the first plate member 10 may be further provided. The sealing member 3004 may be provided on both the rear surface and the side surfaces, that is, three surfaces of the vacuum adiabatic body.

The front surface part of the mullion 300 can be supported by the mullion front frame 140. The lower end of the mullion front frame 140 is bent, the bent portion can support the mullion 300, an end part of the case member 3002 is engaged with and supported by the upper end of the mullion front frame 140. The mullion front frame 140 may be provided as a member detachable from the plate member and the reinforcing frame. In this case, the mullion 300 may be separated from the installation position.

The mullion front frame 140 may be made of a metal material and heat exchange may occur between the refrigerating chamber and the freezing chamber. In order to solve this problem, it is possible to provide the front seating frames 133 and 132 individually in the refrigerating chamber and the freezing chamber in place of the mullion front frame 140. Specifically, a first front mullion seating frame 132 supporting a lower side of a front surface part of the mullion 300 and a second front mullion seating frame 133 supporting an upper side of a front surface part of the mullion 300. The two members may be made of a metal, and the right and left sides of the opening may be connected to each other to prevent the opening part of the vacuum adiabatic body from shrinking. It is possible to provide both the mullion front frame 140 and the mullion seating frames 132 and 133 in some cases. In this case, it is possible to obtain an effect that the strength reinforcement to the opening portion of the vacuum adiabatic body is further enhanced.

Meanwhile, the first plate member 10 of the vacuum adiabatic body is made of a metal. In this case, the cold air in the freezing chamber can be moved to the refrigerating chamber along the first plate member 10. The position where the heat transfer between the refrigerating chamber and the freezing chamber is greatest is the position on the first plate member 10 corresponding to the mullion 300. A conductive resistance sheet 60 may be provided at the position of the first plate member 10 corresponding to the mullion 300 in order to solve the problem of the heat conduction.

FIG. 32 is an enlarged view illustrating portion D in FIG. 31.

Referring to FIG. 32, the first plate member 10 aligned with the mullion in the front and rear direction is provided with a conductive resistance sheet 60. The conductive resistance sheet may be provided in a path through which the cold air in the freezing chamber is transferred to the refrigerating chamber to block cold air that is conducted.

The conductive resistance sheet 60 may be provided in the same material, construction, and manner as the other conductive resistance sheets used on the main body side.

The reinforcing frame reinforces the strength of the vacuum adiabatic body and the refrigerator, and an objective thereof is to prevent breakage and deformation of the device itself. The reinforcing frame takes a lot of material costs and takes a lot of effort and effort in processing and manufacturing. Therefore, it is an important assignment that which method and structure are provided as the reinforcing frame. In order to achieve this objective, a preferable configuration of the reinforcing frame is proposed below.

FIG. 33 illustrates a simulation for the reinforcing frame.

Referring to FIG. 33, in order to test the strength of the refrigerator, an experiment is performed in which a vertex of the upper end of the refrigerator is pushed with a lateral force while an approximately rectangular parallelepiped refrigerator is placed in an environment to which gravity force is applied. The result of this experiment is to measure the displacement of every point in the refrigerator. In particular, the displacement of each vertex of the upper end portion of the refrigerator may be measured so that the displacement represents the structural strength of the refrigerator.

More specifically, the three vertices of the lower surface given as a rectangle of the refrigerator are respectively supported by the free end. In this case, the free end is represented by a triangle in the drawing. Meanwhile, although four points may be modeled to be supported, the remaining one free end is not affected by the lateral force so that three points are supported for the simplicity of analysis.

The lateral force may be applied to a point placed vertically above the middle of the three vertices supporting the refrigerator. The direction of the lateral force may be applied to the right side based on the front opening of the refrigerator.

The point where the lateral force is applied may be selected as a vertex that is far from the free end and that can create the greatest moment in the structure of the refrigerator among the front openings that can be easily deformed by external deformation force.

The direction in which the lateral force is applied may be set in a direction parallel to the front opening. This is to allow a large force to be applied to the front that is not reinforced by the front opening, compared to the rear part of the refrigerator, which is relatively thick and protected by many reinforcement materials.

The lateral force is illustrated as 25 Kgf and the gravity load is set to 9.81 m/s$^2$.

The simulation illustrated in FIG. 33 was performed in various cases for the verification of the reinforcing frame. Unless otherwise noted, all simulation subjects are equipped with all components of the refrigerator, and all other components are configured identically, except for some of the reinforcing frames that vary to reinforce the strength of the vacuum adiabatic body and the refrigerator. The other component may include a member such as a supporting unit, a plate member, and a conductive resistance sheet.

The division of the vacuum adiabatic body and the refrigerator for the simulation will be described.

First, the reinforcing frame 120 may be divided into an internal reinforcing frame placed inside the vacuum adiabatic body and an external reinforcing frame placed outside the vacuum adiabatic body. The inner reinforcing frame may include the rear frame 121, the front frame 123, and the side frame 122. The outer reinforcing frame may include the mullion seating frame 130, the mullion front frame 140, and an auxiliary frame 1301.

The outer reinforcing frame is illustrated in FIG. 27, the inner reinforcing frame is illustrated in FIG. 12, and the cross-section of the inner reinforcing frame is preferably applicable to the structures illustrated in FIGS. 13 and 19. However, the present invention is not limited thereto, and various configurations and shapes presented in various embodiments may be applied.

The outer reinforcing frame and the inner reinforcing frame may be fastened to each other via plate members 10 and 20 without a direct connection between the rigid bodies. Therefore, the outer reinforcing frame and the inner reinforcing frame may be a configuration which is connected to each other for strength reinforcement.

In the simulation, the thickness of each reinforcing frame is 2.0 mm. When viewed from the cross-section of each reinforcing frame, the length of one side was 15 mm, the length of the other side was 10 mm, the short side may be a thickness direction of the vacuum adiabatic body and the long side may be the extension direction of the vacuum adiabatic body.

The result of the simulation is explained.

FIGS. 34 to 38 are views illustrating the results of the simulation.

Specifically, FIG. 34 is a simulation result of the conventional polyurethane-filled refrigerator, FIG. 35 illustrates a simulation result of a case where the reinforcing frame is not used in the refrigerator to which the vacuum adiabatic body according to the embodiment is applied, FIG. 36 illustrates a simulation result of a case where only the inner reinforcing frame of the reinforcing frames is used in the refrigerator to which the vacuum adiabatic body according to the embodiment is applied, FIG. 37 illustrates a simulation result of a case where only the outer reinforcing frame of the reinforcing frames is used in the refrigerator to which the vacuum adiabatic body according to the embodiment is applied and FIG. 38 illustrates a simulation result of a case where both the inner reinforcing frame and the outer reinforcing frame of the reinforcing frames are used in the refrigerator to which the vacuum adiabatic body according to the embodiment are applied.

Each figure is divided into three portions: the top is a plan view, the center is the front view, and the bottom is the displacement degree of the four vertices of the plan view. The front perspective view is added to the front view from FIG. 35 to FIG. 38.

Comparing FIGS. 34 and 35, it can be seen that the refrigerator in which the reinforcing frame is not provided at all causes deformation of 2.5 times or more as compared to the conventional polyurethane-filled refrigerator. Excessively large displacements cause a collapse of the refrigerator structure, and small displacements can accumulate fatigue and damage the product. As a result of this comparison, it can be confirmed that the reinforcing frame is required.

Comparing FIG. 34 with FIG. 36, it can be seen that strength can be reinforced at all points by the internal reinforcing frame, and causes a low displacement compared to the conventional polyurethane-filled refrigerator.

Comparing FIG. 36 with FIG. 37, in a case of the refrigerator having only the outer reinforcing frame, the effect of the strength reinforcement is larger than that of the refrigerator having only the inner reinforcing frame.

However, a case where only the external reinforcing frame is installed for the rear right point of the refrigerator, which is one point, is further deformed. This result is expected to be due to the fact that no reinforcing frame is installed at the rear of the refrigerator at all. Since many wirings and refrigerant lines pass through the rear of the refrigerator, excessive displacement of the rear of the refrigerator may cause problems later.

As a result of the above-described review, it can be confirmed that the inner reinforcing frame and the outer reinforcing frame are preferably provided respectively.

Comparing FIG. 34 with FIG. 38, it can be seen that the refrigerator in which both the inner reinforcing frame and the outer reinforcing frame are installed is displaced to one-quarter level compared to the conventional polyurethane-filled refrigerator.

This level of displacement can be determined as the fact that excessive strength reinforcement has actually been carried out, and there is a problem of increased cost and useless resource waste due to excessive use of raw materials. As a way of solving this problem, the inventors have additionally carried out various reviews.

The inventors conducted additional experiments with different material thicknesses of the reinforcing frames. FIG. 39 illustrates the result of the simulation when the thickness of the reinforcing frame is 1.25 mm, and FIG. 40 illustrates the result of the simulation when the thickness of the reinforcing frame is 1.2 mm. In this case, it is assumed that both the inner reinforcing frame and the outer reinforcing frame are provided.

Comparing the simulation result of the 2.0 mm thick reinforcing frame of FIG. 38 and the simulation result of the 1.25 mm thick reinforcing frame of FIG. 39, it can be seen that an increase in displacement of about 20% occurs. Nevertheless, it can be seen that sufficient performance can be obtained compared to a refrigerator filled with polyurethane.

Specifically, comparing the simulation results of the polyurethane-filled refrigerator illustrated in FIG. 34 and the reinforcing frame of 1.25 mm illustrated in FIG. 39, an effect of reducing displacement more than twice can be obtained.

Meanwhile, the 1.25 mm thickness is a non-standardized material, and the inventors conducted additional experiments so as to apply the 1.2 mm steel plate material.

FIG. 40 illustrates the result of a simulation experiment by applying a 1.2 mm reinforcing frame to the inside and outside of the vacuum adiabatic body.

Referring to FIG. 40, it can be seen that the displacement is slightly increased as compared with the 1.25 mm steel plate, but the effect of sufficient displacement reduction compared to the conventional polyurethane-filled refrigerator can be confirmed.

With this background, the inventors could confirm that a member made of 1.2 mm of steel is preferred as the material of the reinforcing frame.

Even when using a 1.2 mm thick steel plate as the material of the reinforcing frame, according to the results of the experiment, it could be confirmed that the strength is excessively reinforced compared to a case where the conventional polyurethane is filled, ane thus unnecessary material is wasted and the cost is increased.

The inventor carried out a further review.

In order to evaluate the importance of each member constituting the reinforcing frame, the inventors grasp the increase rate of displacement when removing each member constituting the reinforcing frame, and obtain the sensitivity ratio of the corresponding member. The results are illustrated in Table 1.

TABLE 1

| | | | | | Model | | | | | |
|---|---|---|---|---|---|---|---|---|---|---|
| | Optimum (10 mm-1.2t) | (1) | (2) | (3) | (4) | (5) | (6) | (7) | (8) | (9) |
| Deform sensitivity Ratio | 8.575 — | 8.584 0.10% | 8.807 2.71% | 8.63 0.64% | 8.572 0.03% | 8.554 0.24% | 9.054 5.59% | 9.178 7.03% | 8.638 0.73% | 8.591 0.19% |

| | | | | Model | | | | | |
|---|---|---|---|---|---|---|---|---|---|
| | (10) | (11) | (12) | (13) | (14) | (15) | (16) | (17) | (18) | (19) |
| Deform sensitivity Ratio | 8.578 0.03% | 8.596 0.24% | 8.82 2.86% | 8.597 0.26% | 9.822 14.54% | 9.022 5.21% | 8.634 0.69% | 8.572 −0.03% | 8.796 2.58% | 8.581 0.07% |

Referring to Table 1, the two rows are parallel up and down, Model represents the serial number of the reinforcing frame member to be removed, Deform represents the amount of deformation and Sensitivity Ratio represents sensitivity that affects by the specific member of the reinforcing frame from which the amount of deformation is removed.

The number of the model (that is, the number in parentheses) may match the number in parentheses attached to each member of the figures of the inner and outer reinforcing frames illustrated in FIG. 41. Hereinafter, with reference to Table 1 and FIG. 41, the importance of each member of a reinforcing frame is demonstrated.

Referring to Table 1, the deformation amount is the portion illustrating the largest displacement value in each plan view illustrating the displacement and represents the displacement value when the selected member is removed as compared with a case where no member is removed. The sensitivity ratio represented by a negative number may be interpreted as a positive value close to zero as a numerical value that may appear in statistical analysis.

The member of the place illustrating a value of 0.1% or less in Table 1 may indicate a little effect on the action of the reinforcing frame even if the reinforcing frame is provided. In other words, even when the member is removed, there is no great influence on the operation of the reinforcing frame. On the contrary, the member illustrating a value of 5% or more may indicate that the operation of the reinforcing frame is greatly affected when the reinforcing frame is provided. In other words, a state where the member is removed greatly affects the operation of the reinforcement frame.

In addition, the experiment of the drawing of FIG. 33 assumes that the lateral force is applied to one side (right), and on the contrary, it should be also considered that the lateral force is applied to the other side (left side). Therefore, in a case of the member which has the left-right orientation as a result of the experiment of Table 1, it can be interpreted that the said sensitive ratio is large.

For example, in Table 1, the 14th member has a sensitivity of 14.54%, and the 17th member in the mirror position of the 14th member has a sensitivity of −0.03%. In this case, the sensitivity of the 17th member can also be regarded as 14.54%. As described above, in a case where the direction of the lateral force is opposite, this is because the 14th member and the 17th member may have opposite values to each other.

However, in a case of the refrigerator type illustrated in the embodiment, the refrigerator door is installed on the right side with reference to the drawings. Therefore, the member on the left side may be more important when there are paired members on the left and right sides.

The sensitivity of the members may be distinguished by referring to the sensitivity of each member of the reinforcing frame under the background.

The sensitivity is highest a pair of 14th and 17th members. Of the pair of 14th and 17th members, the 14th member is more important. This is because the door of the refrigerator is installed on the right side. In addition, the pair of 14th and 17th member is the member extending in the vertical direction and are most important for supporting the load. Furthermore, the pair of 14th and 17th member is the most important members as the members that receive the greatest load in the central portion of the refrigerator.

A pair of 6th member and the 7th member has the next heighest sensitivity. Of the pair of 6th and 7th members, the 7th member is more important. Likewise, this is because the door of the refrigerator is installed on the right side. Although the pair of 6th and 7th members receive loads in a state of extending in the vertical direction, the pair of 6th and 7th members are not as important as the pair of 14th and 7th members because the pair of 6th and 7th members are biased forward from the center of gravity of the refrigerator.

The member next to the 6th and 7th members regarding the highest sensitivity is the 12th member and the member next to the 12th member regarding the highest sensitivity is the 2nd member. Although the 12th member and the 2rd member are not paired with each other, the 12th member has high importance with respect to the 2rd member. This is because the 12th member must support its own weight on the lower side. It is important that the pair of 12th and 2rd members are a member that greatly resists the lateral force exerted on the left and right direction and serves to support the force applied to the door.

The group of members described above may be referred to as the first member group having the highest importance. The member of the first member group can resist deformation in the vertical direction and the left and right direction of the refrigerator.

In addition, a pair of the 15th member and the 18th member IS of high importance. The pair of the 15th member and the 18th member are members having a meaning capable of resisting deformation in the front and rear direction. Of the 15 and 18, the 15th member is more important. This is because the door is mainly installed on the right side. This group may be referred to as a second member group which is of high importance secondly. The second member group may resist deformation in the front and rear direction of the refrigerator.

Otherwise, since the remaining members, except the 19th member, are of high importance, the remaining members can be referred to as a third member group. The third member group may elicit an interlocking action of each member of the reinforcing frame.

Finally, the 19th member is a member placed on the outside of the vacuum adiabatic body and has the lowest sensitivity and importance, and thus may be provided as a fourth group member. As already discussed, however, when the external reinforcing frame and the internal reinforcing frame work together, problems such as the expansion of the opening portion of a refrigerator may be improved, and as described above, the mullions may be mounted.

As a result of the above-described studies, various embodiments for providing the reinforcing frame can be proposed.

FIG. 42 illustrates reinforcing members according to one embodiment.

Referring to FIG. 42, in order to identify each member of the reinforcing frame, the member numbers illustrated in FIG. 41 and the number numbers illustrated in FIG. 42 are matched as follows.

Numerical identifier 1 may correspond to a first rear frame 1211, 8 may correspond to a second rear frame 1212, 9 may correspond to a third rear frame 1213, 5 may correspond to a fourth rear frame 1214, 2 may correspond to a first front frame 1231, 7 may correspond to a second front frame 1232, 12 may correspond to a third front frame 1233, 6 may correspond to a fourth front frame 1234, 3 may correspond to a first side frame 1221, 18 may correspond to a second side frame 1222, 15 may correspond to a third side frame 1223 (side frames 1222 and 1123 also be referred to as third segments), 4 may correspond to a fourth side frame 1224, 14 may correspond to a first upper and lower frame 151 of the machine chamber, 17 may correspond to a second upper and lower frame 152 of the machine chamber, 13 may correspond to a first front and rear frame 153 of the machine chamber, 16 may correspond to a second front and rear frame 154 of the machine chamber, 11 may correspond to a first front frame 155 of the machine chamber, and 10 may correspond to a second front frame 156 of the machine chamber.

According to one embodiment of the reinforcing frame, a first group member having high importance may be applied to the reinforcing frame 120.

Among the first group members, the first upper and lower frame 151 of the machine chamber and the second upper and lower frame 152 (also referred to as machine room segments or second segments) of the machine chamber may be preferentially applied as a reinforcing frame. This is because the two members have the highest sensitivity and preferentially support the load of the refrigerator. Among the two members, the second upper and lower frame 152 of the machine chamber may be provided with the highest priority because the door is installed on the right side.

A pair of the second front frame 1232 and the fourth front frame 1234 (also referred to as opening or first segments) may then be applied as a reinforcing frame. This is because the two members support the load of the refrigerator and the load of the door. Among the two members, the second front frame 1232 may be provided preferentially because the door is installed on the right side.

Thereafter, a third front frame 1233 and a second front frame 1231 (also referred to as first or additional segments) may be provided. The third front frame and the second front frame 1231 may be removed since the strength may be reinforced by other members lying outside of the corresponding position.

Thereafter, the second group member may be applied in a more preferable form. The second group member can be provided as a preferred embodiment since the second group member is a member that allows a pair of the first upper and lower frame 151 of the machine chamber and the second upper and lower frame 152 of the machine chamber and a pair of the second front frame 1232 and the fourth front frame 1234 to be fastened to each other.

External reinforcing frames can then be applied as the third group member, and finally as the fourth group member.

According to the present embodiment, as the need for strength reinforcement increases, each member of the reinforcing frame can be further provided for each group member having priority. According to this, according to the number of cases, the members applied as a reinforcing frame can be reduced. In addition, even if the member is reduced, there is no effect on the quality and an optimal reinforcing frame can be proposed.

FIG. 43 is an embodiment of the reinforcing frame according to another embodiment.

Referring to FIG. 43, a pair of the second front frame 1232 and the fourth front frame 1234 may be first applied as a reinforcing frame among a plurality of members constituting the reinforcing frame 120. According to this, the load of the refrigerator and the load of the door can be supported together.

However, in this case, the other member applied to the reinforcing frame may not be applied, so that a decrease in strength may occur, and in order to improve this, the thickness of the second plate member 20 constituting the out case may be provided thicker than that of the first plate member 10 constituting the inner case. As a result, the volume and material cost of the plate member as a whole can be reduced, and the bending occurring in the second plate member 20 as a portion that is exposed to the outside can be reduced. Of course, the strength of the refrigerator can be further increased as a whole through the second plate member 20 that is a member to which the reinforcing frame is integrated.

In this case, although there is a difficulty in increasing the consumption of the material of the plate member itself, it is possible to improve the inconvenience in the manufacturing process of providing the reinforcing frame through a complicated process. Of course, in the present embodiment, other members except for the second front frame 1232 and the fourth front frame 1234 are not excluded from being applied to the reinforcing frame. Nevertheless, there is an advantage that the strength can be improved through only the second front frame 1232, the fourth front frame 1234, and the plate member.

In this embodiment, the application of other reinforcing members constituting the reinforcing frame is not excluded. However, it cannot be said to be desirable in terms of waste of useless materials and cost increase.

FIGS. 44 and 45 are views illustrating embodiments of the reinforcing frames according to another embodiment.

Referring to FIGS. 44 and 45, the second front frame 1232 and the fourth front frame 1234 may be applied as reinforcing frames.

As a method of reinforcing the insufficient strength with the second front frame 1232 and the fourth front frame 1234, the side frames (or side frames plates) 801 and 802 of the machine chamber that cover the outer portion of the machine chamber 8 have a predetermined strength. Therefore, thicker or stronger materials than the plate member may be used to the side frames of the machine chamber.

Specifically, even if the second front frame 1232 and the fourth front frame 1234 are applied as a reinforcing frame, a pair of the first upper and lower frame 151 of the machine chamber and the second upper and lower frame 152 of the machine chamber are considered as a member of high importance to support the own weight of the entirety of the refrigerator. In order to replace the role of the pair of the first upper and lower frame 151 of the machine chamber and the second upper and lower frame 152 of the machine chamber, the side frames 801 and 802 of the machine chamber provided to the position of the pair of the first upper and lower frame 151 of the machine chamber and the second upper and lower frame 152 of the machine chamber may be fastened as a member having a predetermined strength.

The side frames 801 and 802 of the machine chamber, which can maintain the shape of both side portions of the machine chamber 8 and partition the machine chamber from the outside, are integrated with a vacuum adiabatic body, and thus there is an advantage that the role of the pair of the first upper and lower frame 151 of the machine chamber and the second upper and lower frame 152 of the machine chamber can be performed together.

Meanwhile, the rear frames 803 of the machine chamber may be provided at a predetermined thickness to reinforce strength that may be lacking with the side frames 801 and 802 of the machine chamber.

The side frame of the machine chamber and the rear frame of the machine chamber may be provided at a thickness of 1 mm or more, preferably at the same thickness as the thickness of the reinforcing frame.

In the present embodiment, the application of the other reinforcement member which constitutes the reinforcing frame is not excluded. However, it is not desirable for cost increase and useless waste of resources.

FIGS. 46 and 47 are views for explaining a reinforcing frame according to another embodiment.

Referring to FIG. 46, a pair of the first upper and lower frame 151 of the machine chamber and the second upper and lower frame 152 of the machine chamber is applied, and other members constituting the reinforcing frame are not applied.

As described above, the first upper and lower frame 151 of the machine chamber and the second upper and lower frame 152 of the machine chamber are the most important members for preventing the deformation of the refrigerator.

In the present embodiment, the outer front frame 902 may be provided, as illustrated in FIG. 47, to reinforce the insufficient strength with only the two frames 151 and 152. The outer front frame 902 is a member extending along the direction of the pair of the second front frame 1232 and the fourth front frame 1234. However, the outer front frame 902 may be provided on the outer surface of the second plate member 20 forming the outer case, unlike the reinforcing frame.

In other words, the inner reinforcing frame is provided in the inner space of the vacuum adiabatic body, and the outer reinforcing frame is placed in the inner space of the refrigerator, although the inner space of the refrigerator is outside the vacuum adiabatic body. On the other hand, it is characterized in that the outer front frame 902 is provided in the outer space of the refrigerator, as an outer surface of the second plate member 20.

The outer front frame 902 may be provided on a position which is similar to a position providing a pair of the second front frame 1232 and the fourth front frame 1234. For example, the outer front frame 902 is a mirroring about the second plate member 20, and can also be located at an opposite side to the pair of the second front frame 1232 and the fourth front frame 1234.

As illustrated, it can be seen that the outer front frame 902 serves as the second and fourth front frames 1232 and 1234.

Meanwhile, the outer front frame 902 may further include an external cover 901 (or cover plate) to reinforce insufficient strength. The external cover 901 may be provided on the wall surface of the vacuum adiabatic body as a plate-like member. The external cover 901 may be provided on an outer surface of the second plate member 20, which preferably constitutes a vacuum adiabatic body. The external cover 901 may perform a function of visually covering the unevenness of the vacuum adiabatic body generated by the vacuum pressure. In this case, the unevenness of the vacuum adiabatic body may be caused by the uneven deformation of the plate member due to the vacuum pressure. The external cover 901 may visually cover the outer front frame 920. The external cover 901 may perform a cover of the unevenness and the cover of the outer front frame together.

The external cover 901 may cover the outer surface of the vacuum adiabatic body and perform a function of reinforcing the strength of the vacuum adiabatic body together with a visual cover function. For example, the external cover may be fastened at a predetermined position including an upper end and a lower end of the outer front frame 902 and may be fastened to a specific location on the outer surface of the vacuum adiabatic body. In this case, the external cover 901 can obtain the effect that the strength of the outer surface of the vacuum adiabatic body is reinforced.

The external cover may be fastened to respective locations requiring strength reinforcement and may be provided at positions of members constituting the reinforcing frame 120, respectively.

In the present embodiment, the application of the other reinforcement member which constitutes the said reinforcing frame is not excluded. However, it is not desirable for cost increase and useless waste of resources.

INDUSTRIAL APPLICABILITY

According to the present invention, it is possible to prevent bending and buckling caused by the insufficient strength of a vacuum adiabatic body in an appliance using a vacuum adiabatic body, thereby contributing to the commercialization of the appliance.

According to the present invention, in the apparatus to which the vacuum adiabatic body is applied, the optimum strength of the vacuum adiabatic body can be easily realized with the minimum material and the minimum price.

The invention claimed is:

1. A vacuum adiabatic body of an appliance including a machine chamber that is provided on a lower portion of a rear side of the appliance, the vacuum adiabatic body comprising:
   a first plate which defines at least a portion of a first wall for a first space;
   a second plate which defines at least a portion of a second wall for a second space;
   a support configured to maintain a distance between the first plate and second plate and disposed next to or adjacent to the first plate;
   a sheet configured to seal a third space between the first plate and the second plate such that the third space is in a vacuum state; and
   at least one reinforcing frame which is coupled to at least one of the first plate or the second plate to reinforce a strength of the vacuum adiabatic body,
   wherein the reinforcement frame includes first and second upper and lower frames of the machine chamber extending in the third space in a vertical direction to be adjacent to, respectively left and right sides of the machine chamber and defining edges of a side opening of the machine chamber,
   wherein the vacuum adiabatic body comprises a front edge that defines an opening to access the first space,
   wherein the vacuum adiabatic body further comprises:
      a pair of outer front frames coupled to the front edge at left and right of the front edge, the pair of outer front frames being provided separately from the first and second upper and lower frames of the machine chamber, and
      an external cover provided on an outer surface of the second plate and having a plane to shield the side opening of the machine chamber and one of the pair of outer front frames,
   wherein at least one of the pair of outer front frames includes a first part extending in the vertical direction and a second part bent from the first part and extending in a rear direction, the first part and the second part being disposed in the second space,
   wherein the external cover is fastened to the outer surface of the second plate and at least the one of the pair of outer front frames,
   wherein the reinforcement frame further includes a first frame provided in the third space, and a second frame provided in the first space, and
   wherein the first frame is attached to the second plate, and the second frame is attached to the first plate and has a bent shape.

2. The vacuum adiabatic body of claim 1,
   wherein a thickness of the second plate is greater than a thickness of the first plate.

3. The vacuum adiabatic body of claim 1,
   wherein the reinforcement frame further includes:
      a plurality of first segments including first and second front frames provided adjacent to, respectively, a left side and a right side of the opening and extending in the vertical direction, and third and fourth front frames that connect upper ends and lower ends of the first and second front frames to each other, and
   wherein each of the plurality of first segments extends along an extending direction of the sheet, and is provided adjacent to the sheet.

4. The vacuum adiabatic body of claim 1,
   wherein the reinforcement frame includes a plurality of second segments comprising,
      the first and second upper and lower frames of the machine chamber,
      first and second front and rear frames of the machine chamber provided at left and right sides of a top of the machine chamber, and
      first and second front frames of the machine chamber that connect upper ends and lower ends of the first and second upper and lower frames to each other and extend in a horizontal direction, and
   wherein the first front frame is coupled to the first and second upper and lower frames and the first and second front and rear frames.

5. The vacuum adiabatic body of claim 1,
   wherein the reinforcement frame further includes a rear frame having a cutout part through which a pipeline passes.

6. The vacuum adiabatic body of claim 1, further comprising:
   a mullion provided in the first space;
   a mullion seating frame provided along a peripheral portion of the mullion to prevent deformation of the opening in a first direction; and
   a second frame provided to cross the opening to prevent deformation of the opening in a second direction, which is different from the first direction.

7. The vacuum adiabatic body of claim 1, further comprising:
   a spacer extending in a first direction of the third space; and
   a support plate extending in a second direction of the third space to support the first plate or the second plate, the second direction being different from the first direction,
   wherein at least one of the pair of outer front frames is overlapped with the support plate such that at least one of the pair of outer front frames is disposed at a first side of the second plate, and the support plate is disposed at a second side of the second plate.

8. The vacuum adiabatic body of claim 1, further comprising:
   a spacer extending in a first direction of the third space; and
   a radiation resistance sheet extending in a second direction of the third space, the second direction being different from the first direction,
   wherein at least one of the pair of outer front frames is overlapped with the radiation resistance sheet such that at least one of the pair of outer front frames is disposed at a first side of the second plate, and the radiation resistance sheet is disposed at a second side of the second plate.

9. The vacuum adiabatic body of claim 3,
   wherein each of the plurality of first segments is provided in the third space, and
   wherein the each of the plurality of first segments comprises a first portion and a second portion bent from the first portion, the first portion and the second portion being attached to an edge of first plate or an edge of the second plate.

10. The vacuum adiabatic body of claim 3,
    wherein the reinforcement frame further includes:
       an additional segment which connects, respectively, a lower end portion of one of the first and second front frames to one of the first and second upper and lower frames of the machine chamber, and extends in a front and rear direction.

11. The vacuum adiabatic body of claim 3,
wherein the each of the plurality of first segments comprises a first portion and a second portion bent from the first portion, the first portion and the second portion being disposed in the first space and being attached to an edge of first plate.

12. The vacuum adiabatic body of claim 3,
wherein the each of the plurality of first segments includes a first portion and a second portion bent from the first portion, the first portion and the second portion being disposed in the second space and being attached to an edge of second plate.

13. The vacuum adiabatic body of claim 4,
wherein the first front frame of the machine chamber includes an end coupled to the ends of the first and second upper and lower frames and the first and second front and rear frames.

14. The vacuum adiabatic body of claim 4,
wherein a distance from the first front frame of the machine chamber to the second front frame defines a vertical height of the machine chamber.

15. A refrigerator comprising:
a main body, which includes a receiving space and an opening to access the receiving space, the main body having a first plate, a second plate, and a sheet configured to seal a space between the first plate and the second plate such that the space is in a vacuum state;
a machine chamber which is provided at a rear lower side of the main body;
a door which opens and closes the opening of the main body; and
at least one reinforcing frame which reinforces a strength of the main body,
wherein the reinforcement frame includes:
  a pair of first segments which extends adjacent to the sheet in a vertical direction and are provided in the space between the first plate and the second plate;
  a side frame plate which is provided at a side of the machine chamber and fastened to the second plate, the side frame plate including at least one first edge arranged along an edge of a side opening of the machine chamber, a second edge that connects to the first edge and a plane to shield the side opening of the machine chamber; and
  a rear frame plate which is provided at a rear surface of the machine chamber and fastened to the second plate, the rear frame plate including at least one third edge arranged along an edge of a rear opening of the machine chamber, a fourth edge that connects to the third edge and meets the second edge, and a plane to shield the rear opening of the machine chamber,
wherein each of the second edge of the side frame plate and the fourth edge of the rear frame plate has a length in the vertical direction that corresponds to a height of the machine chamber in the vertical direction,
wherein a top edge among edges of the rear opening of the machine chamber includes a free end that is spaced apart from a bottom of the machine chamber, and
wherein the at least one third edge of the rear frame plate is configured to support the free end.

16. The refrigerator of claim 15,
wherein the at least one first edge of the side frame plate includes:
  a portion extending along a vertical edge among edges of the side opening of the machine chamber; and
  another portion extending along a top edge among the edges of the side opening of the machine chamber.

17. The refrigerator of claim 15, further comprising:
a door hinge that connects the main body and the door; and
a sealing frame configured to cover ends of the first plate and the second plate at the opening,
wherein the reinforcing frame is in surface contact with an end region of at least one of the first plate or the second plate on which the sealing frame is seated, and
wherein the door hinge is coupled to the door and the reinforcing frame.

* * * * *